(12) United States Patent
Ong

(10) Patent No.: US 8,605,239 B2
(45) Date of Patent: Dec. 10, 2013

(54) DISPLAY UNIT WITH INTERLEAVED PIXELS

(75) Inventor: Hiap L. Ong, Diamond Bar, CA (US)

(73) Assignees: Hiap L. Ong (TW); Kyoritsu Optronics Co., Ltd. (TW)

( * ) Notice: Subject to any disclaimer, the term of this patent is extended or adjusted under 35 U.S.C. 154(b) by 0 days.

(21) Appl. No.: 13/596,018

(22) Filed: Aug. 27, 2012

(65) Prior Publication Data

US 2012/0320321 A1    Dec. 20, 2012

Related U.S. Application Data

(63) Continuation of application No. 13/179,486, filed on Jul. 9, 2011, now Pat. No. 8,253,897, which is a continuation of application No. 11/751,539, filed on May 21, 2007, now Pat. No. 7,999,900, which is a continuation-in-part of application No. 11/227,595, filed on Sep. 15, 2005, now Pat. No. 7,630,033.

(51) Int. Cl.
*G02F 1/1335*    (2006.01)

(52) U.S. Cl.
USPC .............................................. 349/108; 349/37

(58) Field of Classification Search
USPC ........... 349/108, 106, 37, 139, 144, 145, 146; 345/87, 89
See application file for complete search history.

(56) References Cited

U.S. PATENT DOCUMENTS

2005/0253797 A1*  11/2005  Kamada et al. ................. 345/89
2007/0216619 A1*  9/2007   Hung .............................. 345/87

* cited by examiner

*Primary Examiner* — Thoi Duong
(74) *Attorney, Agent, or Firm* — Silicon Valley Patent Group, LLC.; Edward S. Mao

(57) ABSTRACT

A display unit with interleaved pixels is disclosed. A first pixel of the display unit includes a first first-pixel electrode that is adjacent to multiple color dots of a second pixel. By driving the polarity of the first first-pixel electrode to a first polarity and the color dots of the second pixel to a second polarity, the fringe fields of the color dots of the second pixel are enhanced.

17 Claims, 57 Drawing Sheets

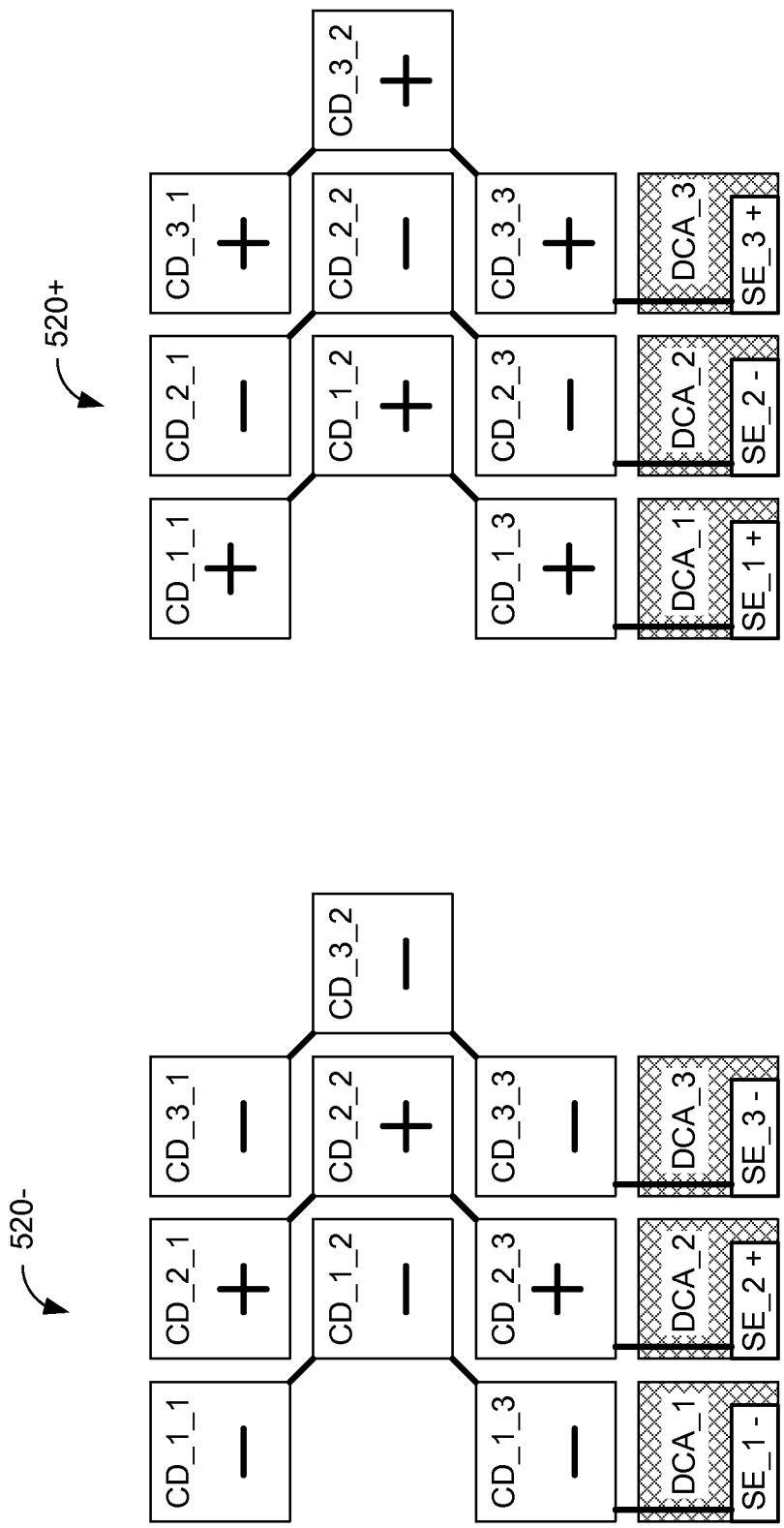

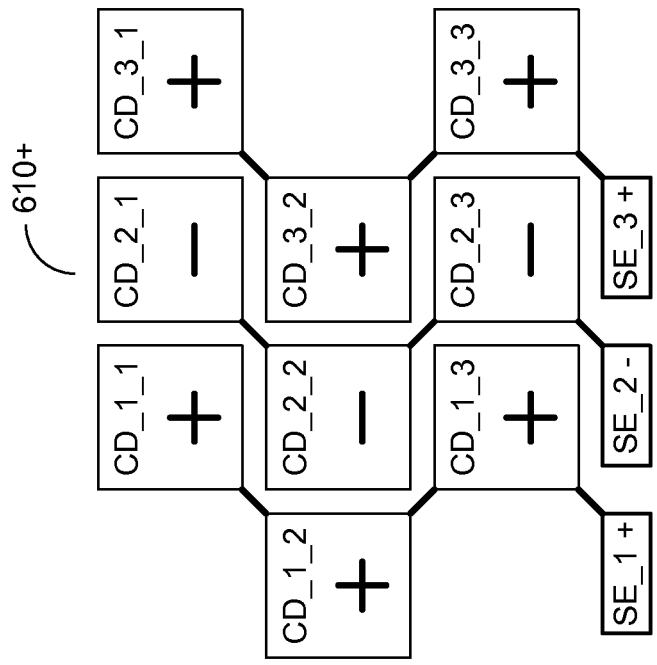
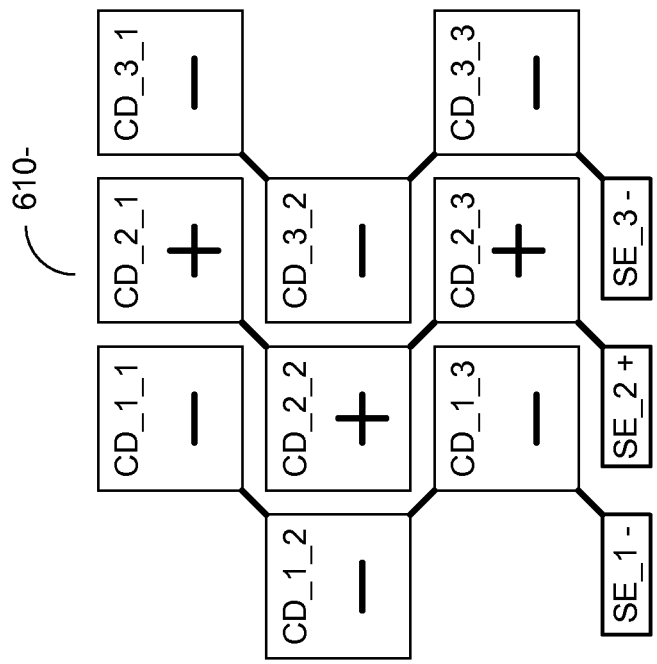
FIG. 6(b)
FIG. 6(a)

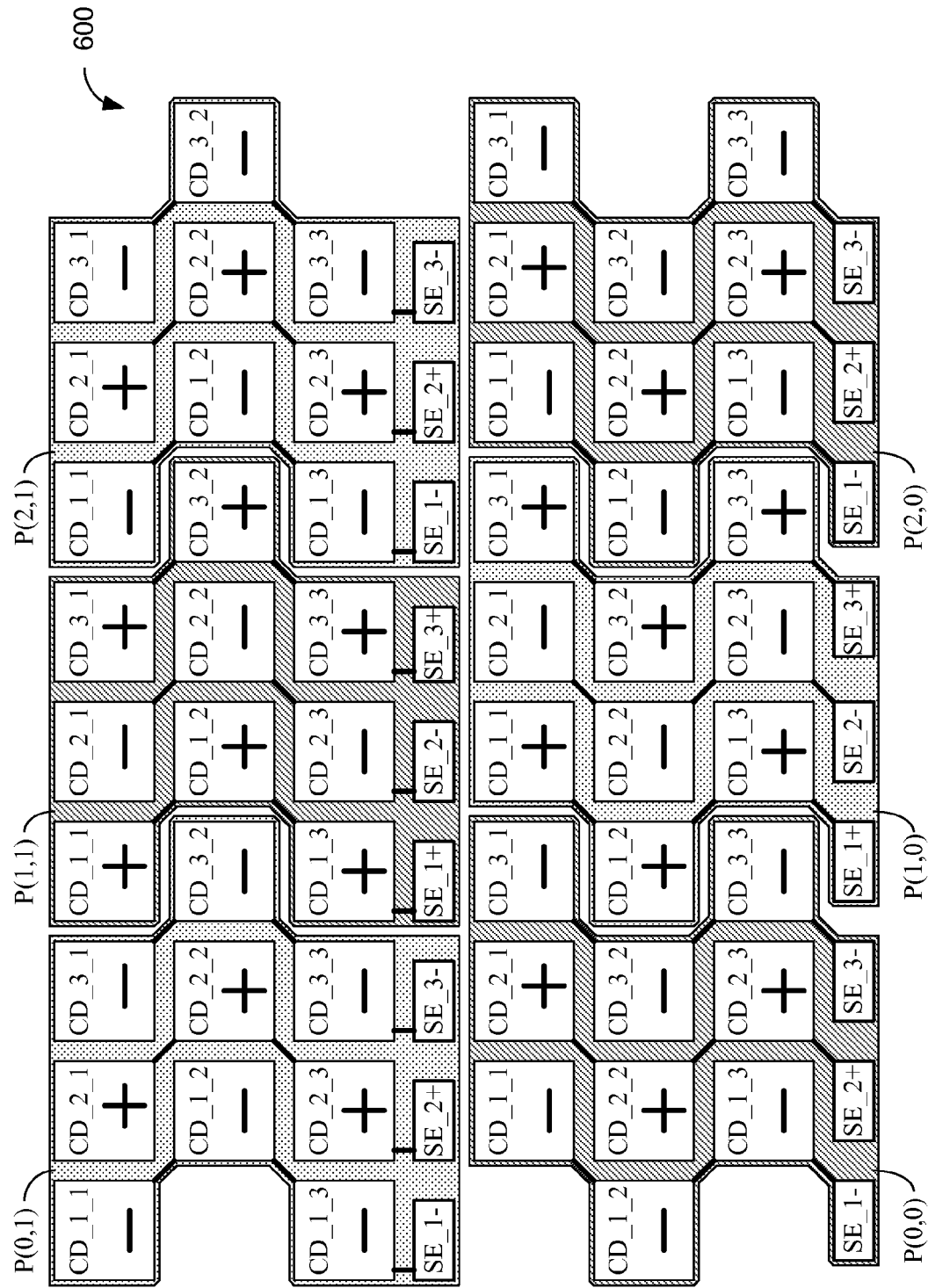

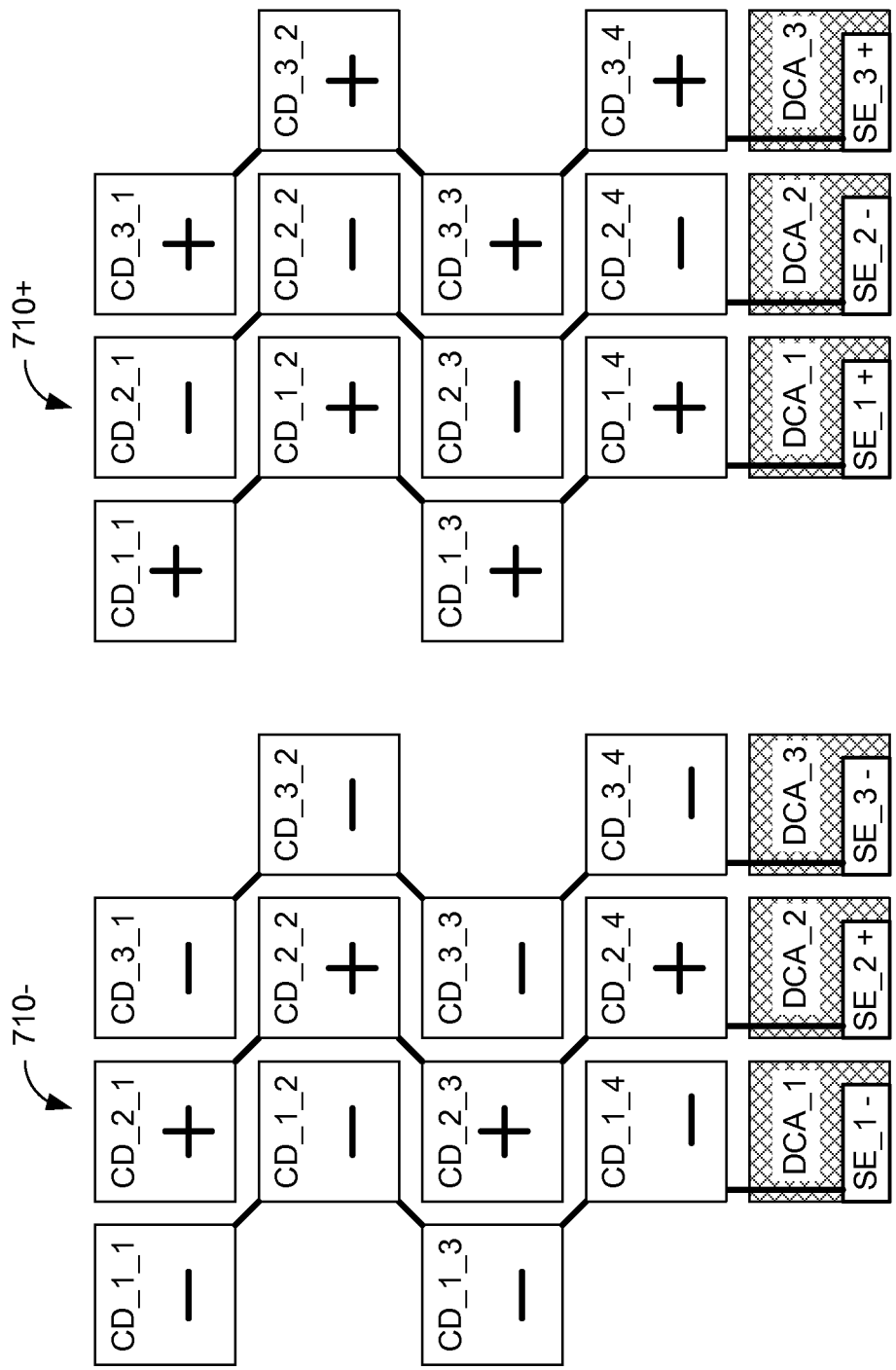

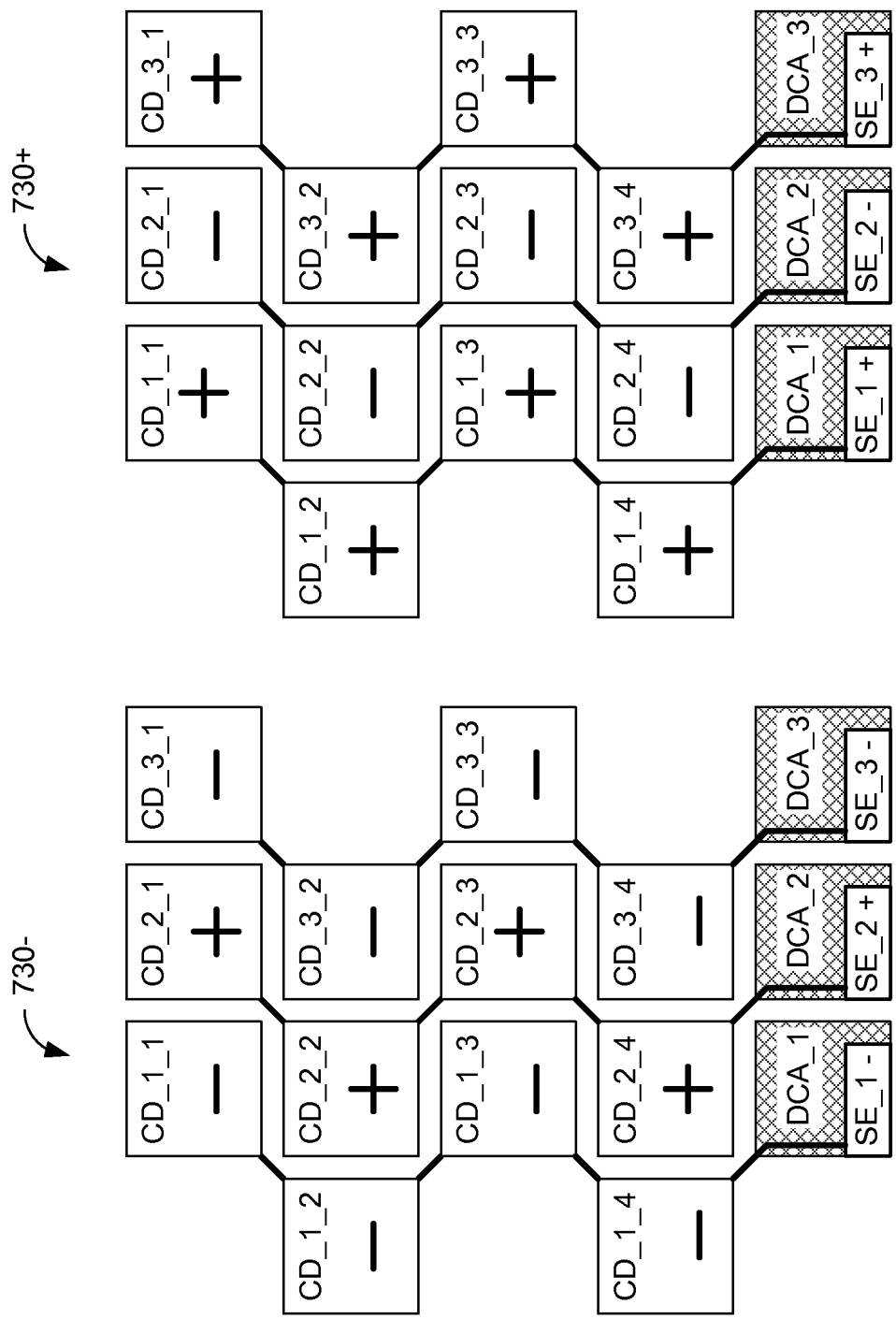

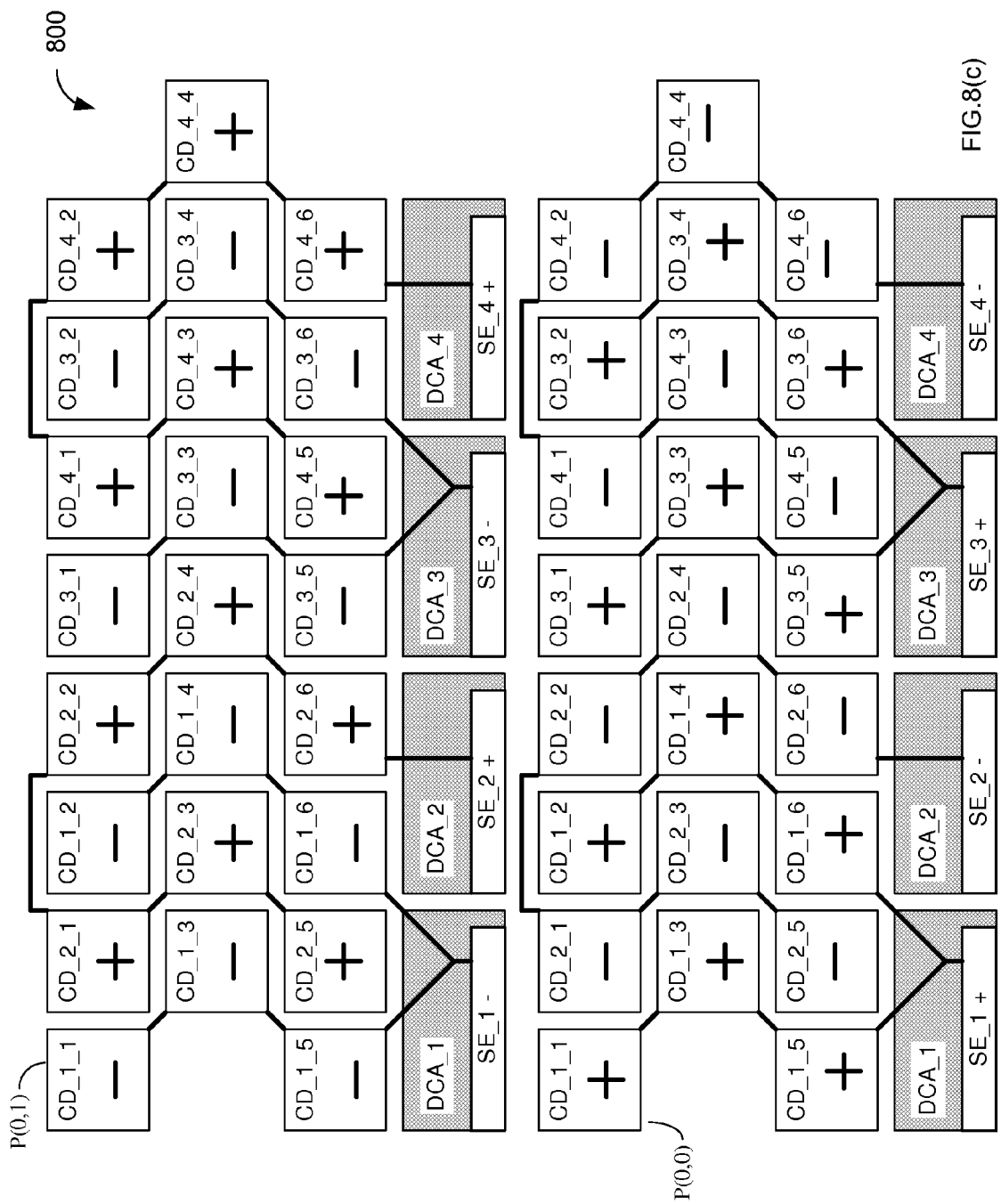

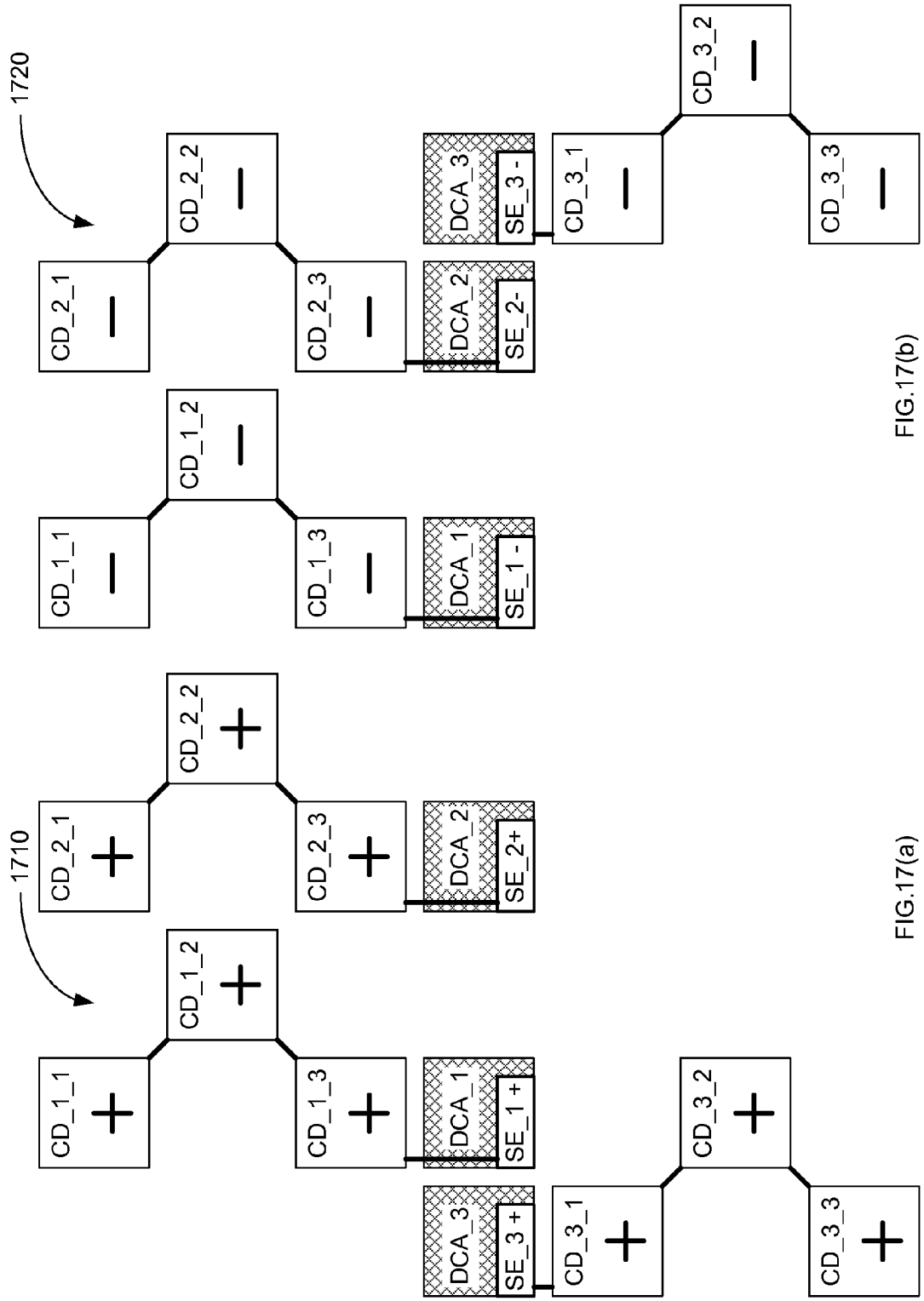

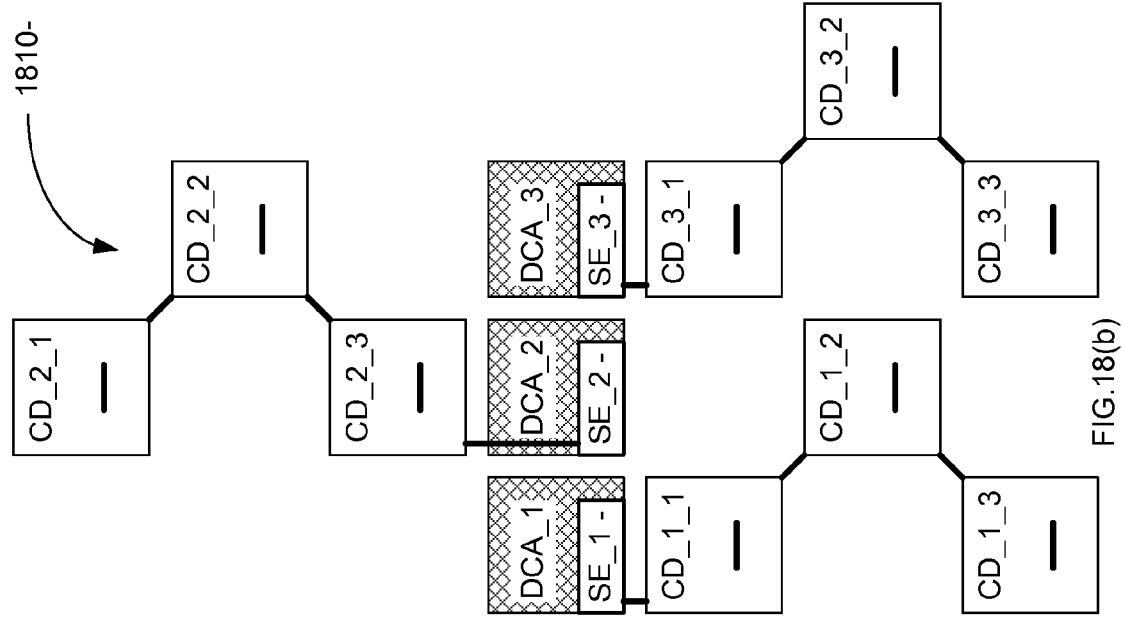
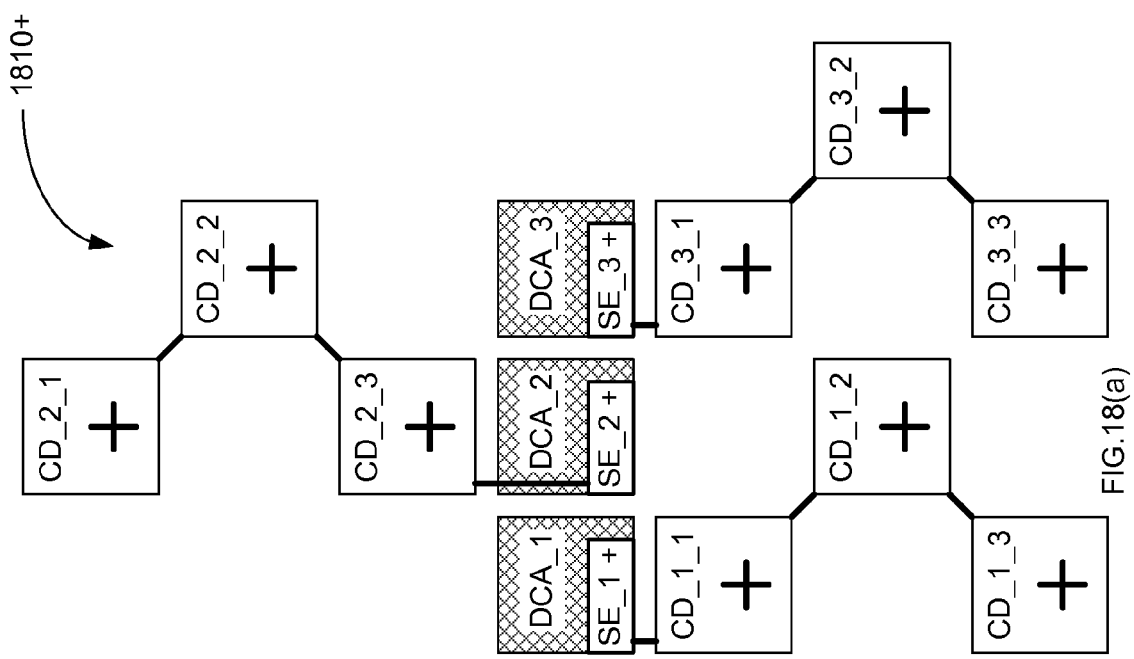

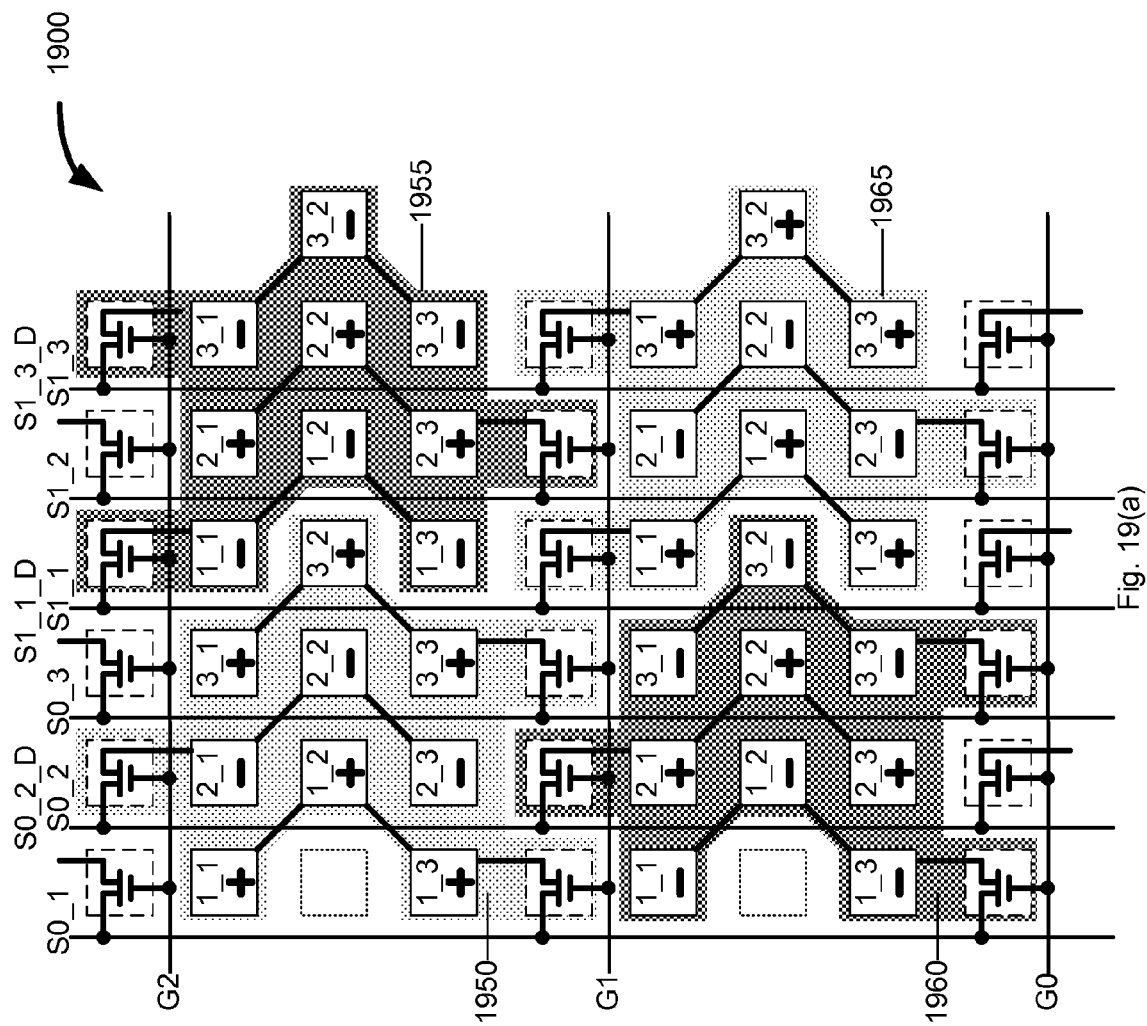

DISPLAY UNIT WITH INTERLEAVED PIXELS

RELATED APPLICATIONS

The present application is a Continuation of U.S. application Ser. No. 13/179,486 entitled "Spread Pixel Designs for Multi Domain LCD" filed by Hiap L. Ong on Jul. 9, 2011, which is a Continuation of U.S. application Ser. No. 11/751, 539 entitled "Display Unit with Interleaved Pixels" filed by Hiap L. Ong on May 21, 2007, which is a Continuation-In-Part of and claims the benefit of U.S. Utility patent application Ser. No. 11/227,595 (Publication serial number US 2007/0058122 A1), entitled "Large Pixel multi-domain vertical alignment liquid crystal display using fringe fields" by Hiap L. Ong, filed Sep. 15, 2005, and is incorporated herein in its entirety by reference.

U.S. application Ser. No. 11/751,539 is incorporated herein in their entirety by reference.

BACKGROUND OF THE INVENTION

1. Field of the Invention

The present invention relates to liquid crystal displays (LCDs). More specifically, the present invention relates large-pixel multi-domain vertical alignment LCDs, which can be manufactured with smooth substrates.

2. Discussion of Related Art

Liquid crystal displays (LCDs), which were first used for simple monochrome displays, such as calculators and digital watches, have become the dominant display technology. LCDs are used routinely in place of cathode ray tubes (CRTs) for both computer displays and television displays. Various drawbacks of LCDs have been overcome to improve the quality of LCDs. For example, active matrix displays, which have largely replaced passive matrix displays, reduce ghosting and improve resolution, color gradation, viewing angle, contrast ratios, and response time as compared to passive matrix displays.

However, the primary drawbacks of conventional LCDs are narrow viewing angle low contrast ratio. Even the viewing angle of active matrixes is much smaller than the viewing angle for CRT. Specifically, while a viewer directly in front of an LCD receives a high quality image, other viewers to the side of the LCD would not receive a high quality image. Multi-domain vertical alignment liquid crystal displays (MVA LCDs) were developed to improve the viewing angle and contrast ratio of LCDs. FIGS. 1(a)-1(c) illustrate the basic functionality of a pixel of a vertical alignment LCD 100. For clarity, the LCD of FIG. 1 uses only a single domain. Furthermore, for clarity, the LCDs of FIGS. 1(a)-1(c) (and FIG. 2) described in terms of gray scale operation.

LCD 100 has a first polarizer 105, a first substrate 110, a first electrode 120, a first alignment layer 125, liquid crystals 130, a second alignment layer 140, a second electrode 145, a second substrate 150, and a second polarizer 155. Generally, first substrate 110 and second substrate 150 are made of a transparent glass. First electrode 120 and second electrode 145 are made of a transparent conductive material such as ITO (Indium Tin Oxide). First alignment layer 125 and second alignment layer 140, which are typically made of a polyimide (PI) layer, align liquid crystals 130 vertically in a resting state. In operation, a light source (not shown) sends light from beneath first polarizer 105, which is attached to first substrate 110. First polarizer 105 is generally polarized in a first direction and second polarizer 155, which is attached to second substrate 150, is polarized perpendicularly to first polarizer 105. Thus, light from the light source would not pass through both first polarizer 105 and second polarizer 155 unless the light polarization were to be rotated by 90 degrees between first polarizer 105 and second polarizer 155. For clarity, very few liquid crystals are shown. In actual displays, liquid crystals are rod like molecules, which are approximately 5 angstroms in diameter and 20-25 angstroms in length. Thus, there are over 10 million liquid crystal molecules in a pixel that is 100 μm width by 300 μm length by 3 μm height.

In FIG. 1(a), liquid crystals 130 are vertically aligned. In the vertical alignment, liquid crystals 130 would not rotate light polarization from the light source. Thus, light from the light source would not pass through LCD 100. However, as illustrated in FIG. 1(b), when an electric field is applied between first electrode 120 and second electrode 145, liquid crystals 130 reorientate to a tilted position. Liquid crystals in the tilted position rotate the polarization of the polarized light coming through first polarizer 105 by ninety degrees so that the light can then pass through second polarizer 155. The amount of tilting, which controls the amount of light passing through the LCD (i.e., brightness of the pixel), is proportional to the strength of the electric field. Generally, a single thin-film-transistor (TFT) is used for each pixel. However for color displays, a separate TFT is used for each color component (typically, Red, Green, and Blue)

However, the light passing through LCD 100 is not uniform to viewers at different viewing angles. As illustrated in FIG. 1(c), a viewer 210 that is left of center would see a bright pixel because the broad (light rotating) side of liquid crystals 130 face viewer 210. A viewer 220 that is centered on the pixel would see a gray pixel because the broad side of liquid crystals 130 is only partially facing viewer 220. A viewer 230 that is right of center would see a dark pixel because the broad side of liquid crystals 130 is barely facing viewer 230.

Multi-domain vertical alignment liquid crystal displays (MVA LCDs) were developed to improve the viewing angle problems of single-domain vertical alignment LCDs. FIG. 2 illustrates a pixel of a multi-domain vertical alignment liquid crystal display (MVA LCD) 200. MVA LCD 200 includes a first polarizer 205, a first substrate 210, a first electrode 220, a first alignment layer 225, liquid crystals 235, liquid crystals 237, protrusions 260s, a second alignment layer 240, a second electrode 245, a second substrate 250, and a second polarizer 255. Liquid crystals 235 form the first domain of the pixel and liquid crystals 237 form the second domain of the pixel. When an electric field is applied between first electrode 220 and second electrode 245, protrusions 260 cause liquid crystals 235 to tilt in a different direction than liquid crystals 237. Thus, a viewer 272 that is left of center would see the left domain (liquid crystals 235) as black and the right domain (liquid crystals 237) as white. A viewer 274 that is centered would see both domains as gray. A viewer 276 that is right of center would see the left domain as white and the right domain as black. However, because the individual pixels are small, all three viewers would perceive the pixel as being gray. As explained above, the amount of tilting of the liquid crystals is controlled by the strength of the electric field between electrodes 220 and 245. The level of grayness perceived by the viewer directly related to the amount of tilting of the liquid crystals. MVA LCDs can also be extended to use four domains so that a pixel is divided into 4 domains to provide wide symmetrical viewing angles both vertically and horizontally.

Thus, multi-domain vertical alignment liquid crystal displays, provide wide symmetrical viewing angles, however, the cost of manufacturing MVA LCDs are very high due to the difficulty of adding protrusions to the top and bottom substrates and the difficulty of properly aligning the protrusions on the top and bottom substrates. Specifically, a protrusion on the bottom substrate must be located at the center of two protrusions on the top substrate. Other techniques of using physical features to the substrates, such as ITO slits, which have been used in place of or in combination with the protrusions, are also very expensive to manufacture. Furthermore, the protrusions and ITO slits inhibit light transmission and thus reduce the brightness of the MVA LCDs. Hence, there is a need for a method or system that can provide multi-domain vertical alignment liquid crystal displays, without the need for difficult to manufacture physical features such as protrusions and ITO-slits, and without the need to have ultra precise alignment of the top and bottom substrates.

SUMMARY

Accordingly, the present invention provides a MVA LCD that does not require protrusions or ITO slits. Thus manufacturing of MVA LCDs in accordance with the present invention is less expensive than conventional MVA LCDs. Specifically, a MVA LCD in accordance with one embodiment of the present invention subdivides a pixel into color components, which are further subdivided into color dots. The dots are arranged so that the fringe field in each dot is amplified by adjacent dots having different electrical polarities. The fringe field in a dot causes the liquid crystals of that dot to tilt in different directions to form multiple domains.

For example, in some embodiments of the present invention, a pixel includes a first set of color dots having a first dot polarity and a second set of color dots having a second dot polarity. The color dots are arranged so to form a checkerboard pattern of color dots of the first dot polarity and color dots of the second dot polarity. The pixel includes multiple color components, for example in one embodiment of the present invention the first plurality of color dots include color dots from a first color component and a third color component. The second plurality of color dots includes color dots from a second color component.

In most embodiments of the present invention, the checkerboard pattern of dot polarities causes each color dot includes multiple liquid crystal domains. Specifically, fringe fields in each color dot are amplified by the different dot polarities of neighboring pixels. The amplified fringe field causes the liquid crystals inside the color dot to reorientate and tilt in different direction to form multiple crystal domains.

To create a checkerboard pattern of color dots across the entire display, different arrangement of pixel designs are used. For example in one embodiment of the present invention, a display includes a plurality of odd numbered rows of pixels and a plurality of even numbered rows of pixels. The pixels in the odd numbered rows are of a first pixel design and alternate between a first dot polarity pattern and a second dot polarity pattern. The pixels in the even numbered rows are of the first pixel design and also alternate between the first dot polarity pattern and the second dot polarity pattern. In another embodiment of the present invention, the pixels on the even numbered rows are of a second pixel design that alternates between a first dot polarity pattern and a second dot polarity pattern. In still other embodiments of the present invention, pixels on each row are of the same dot polarity pattern while pixels in each column alternate between dot polarity patterns. The various arrangements of pixels depend on the specific pixel design and are influenced by color distribution and electrical distribution.

The present invention will be more fully understood in view of the following description and drawings.

BRIEF DESCRIPTION OF THE DRAWINGS

FIGS. 5(d)-5(f) illustrate dot polarity patterns and a liquid crystal display in accordance with one embodiment of the present invention.

FIGS. 6(a)-6(c) illustrate dot polarity patterns and a liquid crystal display in accordance with one embodiment of the present invention.

FIGS. 7(a)-7(c) illustrate pixel designs, dot polarity patterns and liquid crystal displays in accordance with one embodiment of the present invention.

FIGS. 7(d)-7(f) illustrate pixel designs, dot polarity patterns and liquid crystal displays in accordance with one embodiment of the present invention.

FIGS. 8(a)-8(c) illustrate pixel designs, dot polarity patterns and liquid crystal displays in accordance with one embodiment of the present invention.

FIGS. 17(a)-17(d) illustrate spread pixel designs in accordance with different embodiments of the present invention.

FIGS. 18(a)-18(b) illustrate spread pixel designs in accordance with different embodiments of the present invention.

FIG. 19(a) illustrates the use of multiple spread pixel designs in a single display.

DETAILED DESCRIPTION

As explained above, conventional MVA LCDs are very expensive to manufacture due to the use of physical features, such as protrusions or ITO slits, for creating the multiple domains of each pixel. However, MVA LCDs in accordance with the principles of the present invention use fringe fields to create multiple-domains and do not require the use of physical features (such as protrusions or ITO slits) on the substrate. Furthermore, without the requirement of physical features the difficulty of high precision aligning the physical features of the top and bottom substrate is also eliminated. Thus, MVA LCDs in accordance with the present invention are higher yield and less expensive to manufacture than conventional MVA LCDs.

Figure 1B:
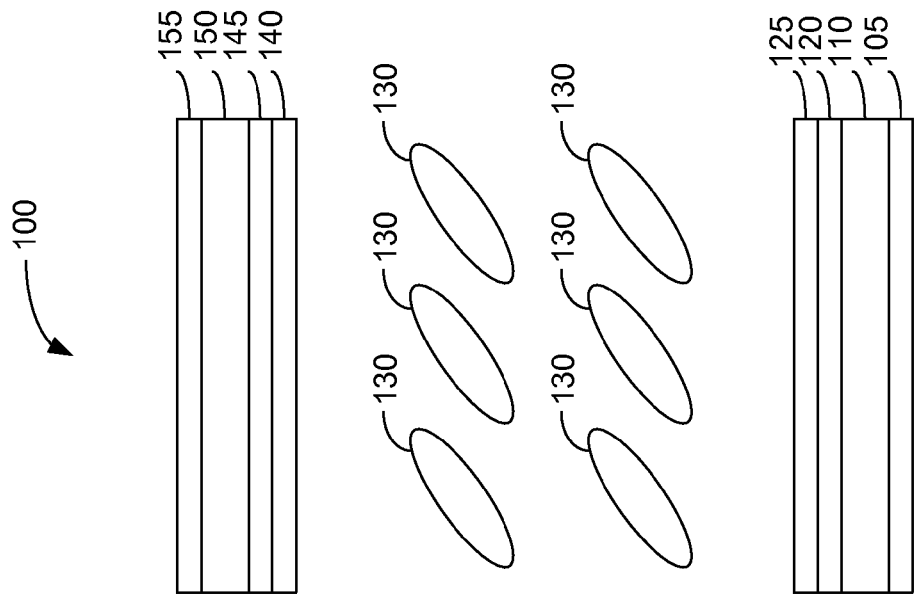
FIGS. 1(a)-1(c) are three illustrations of a pixel of a conventional single domain vertical alignment LCD.
Figure 1A:
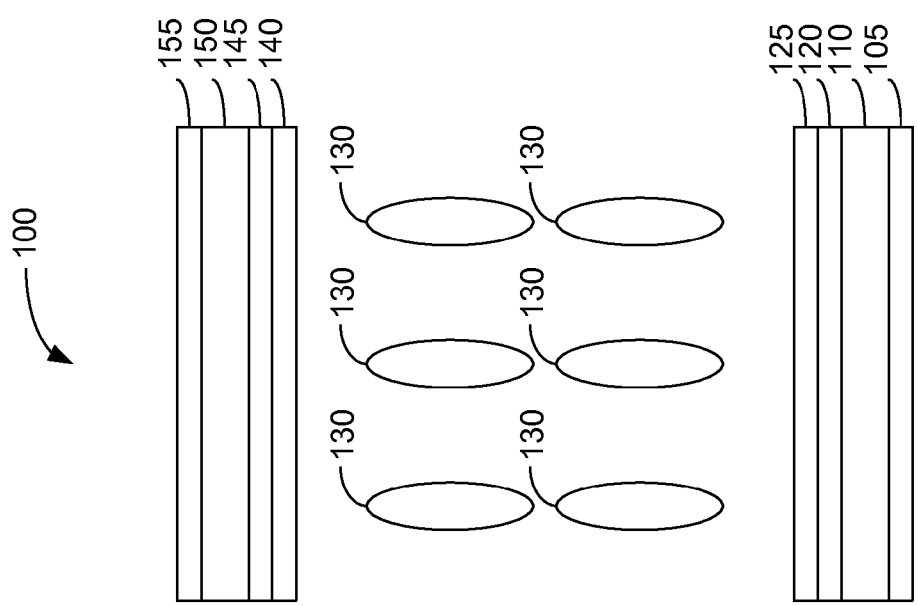
Figure 1C:
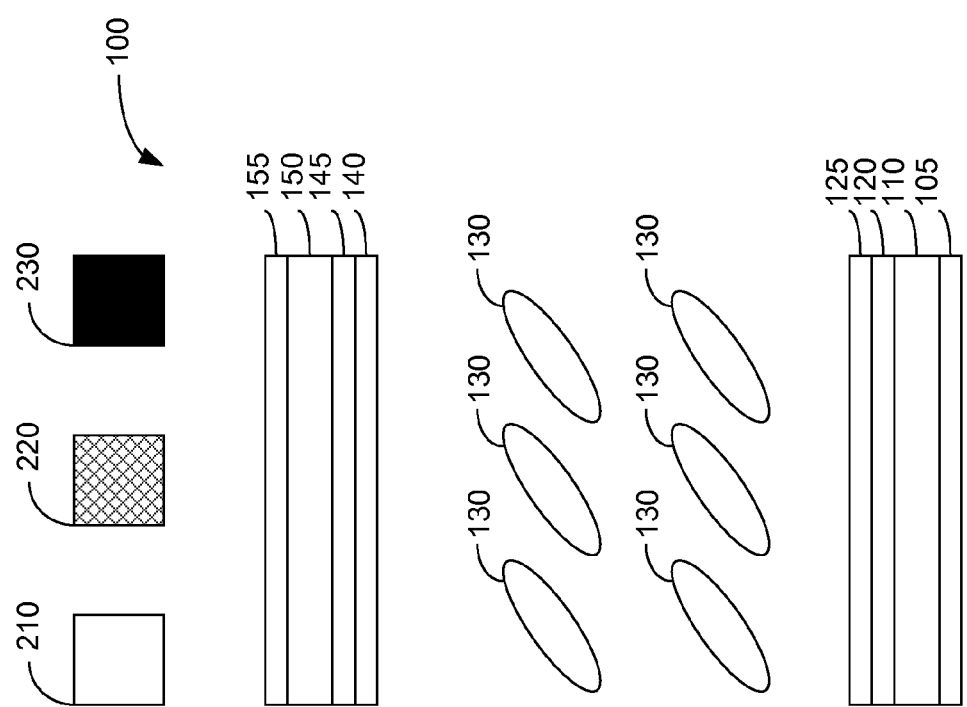
Figure 2:
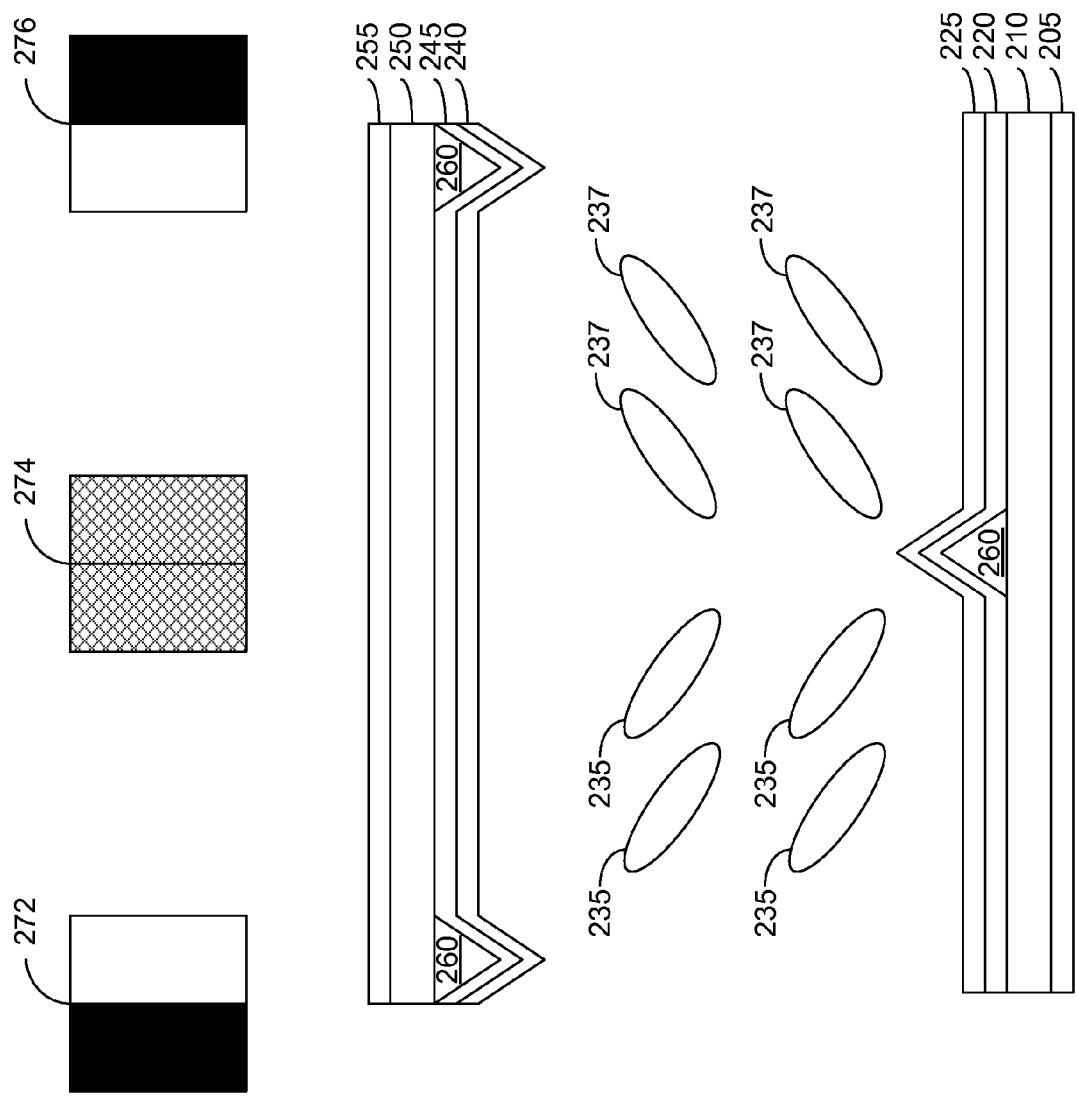
FIG. 2 is an illustration of a pixel of a conventional multi-domain vertical alignment LCD.
Figure 3A:
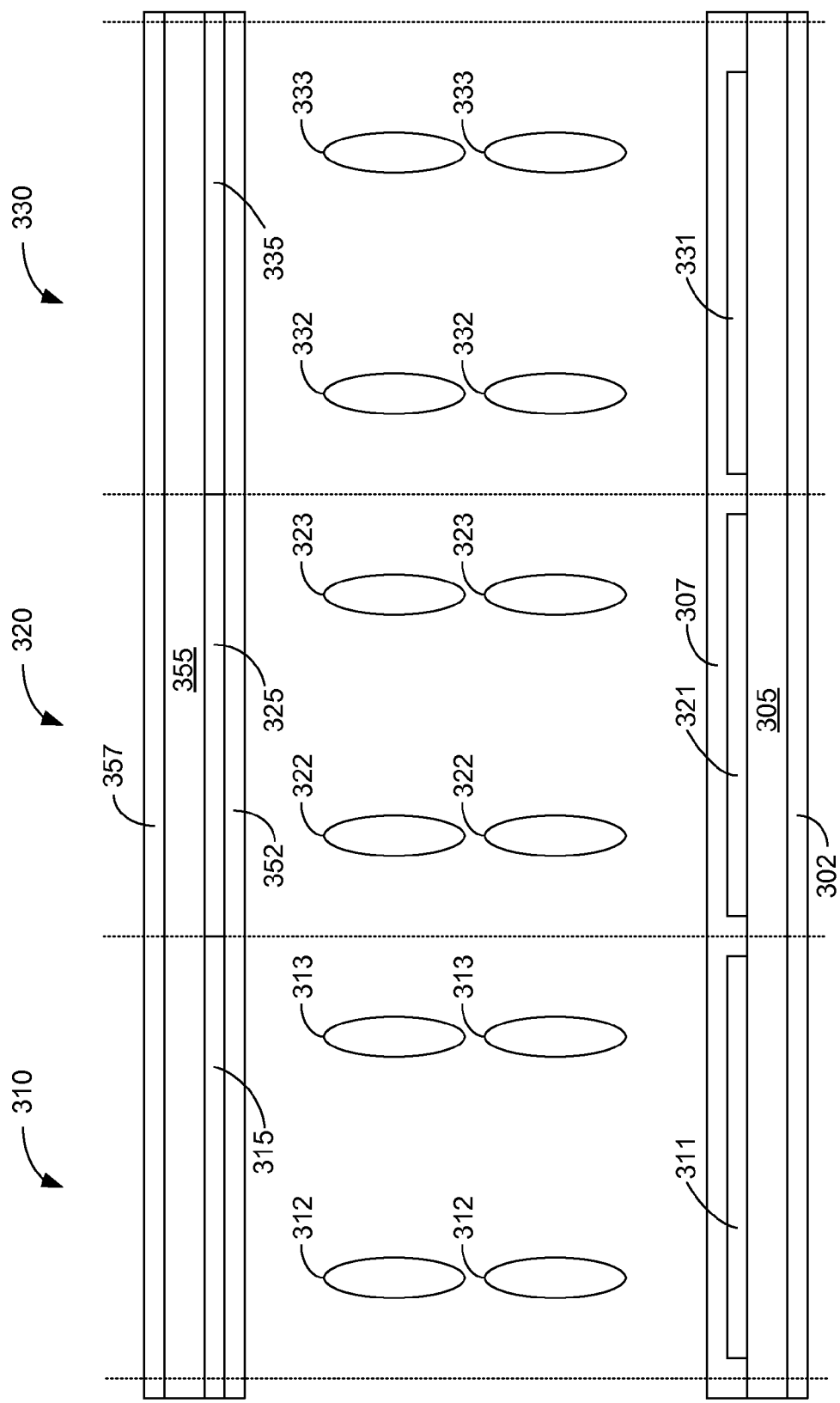
FIGS. 3(a)-3(b) illustrate a multi-domain vertical alignment liquid crystal display in accordance with one embodiment of the present invention.
Figure 3B:
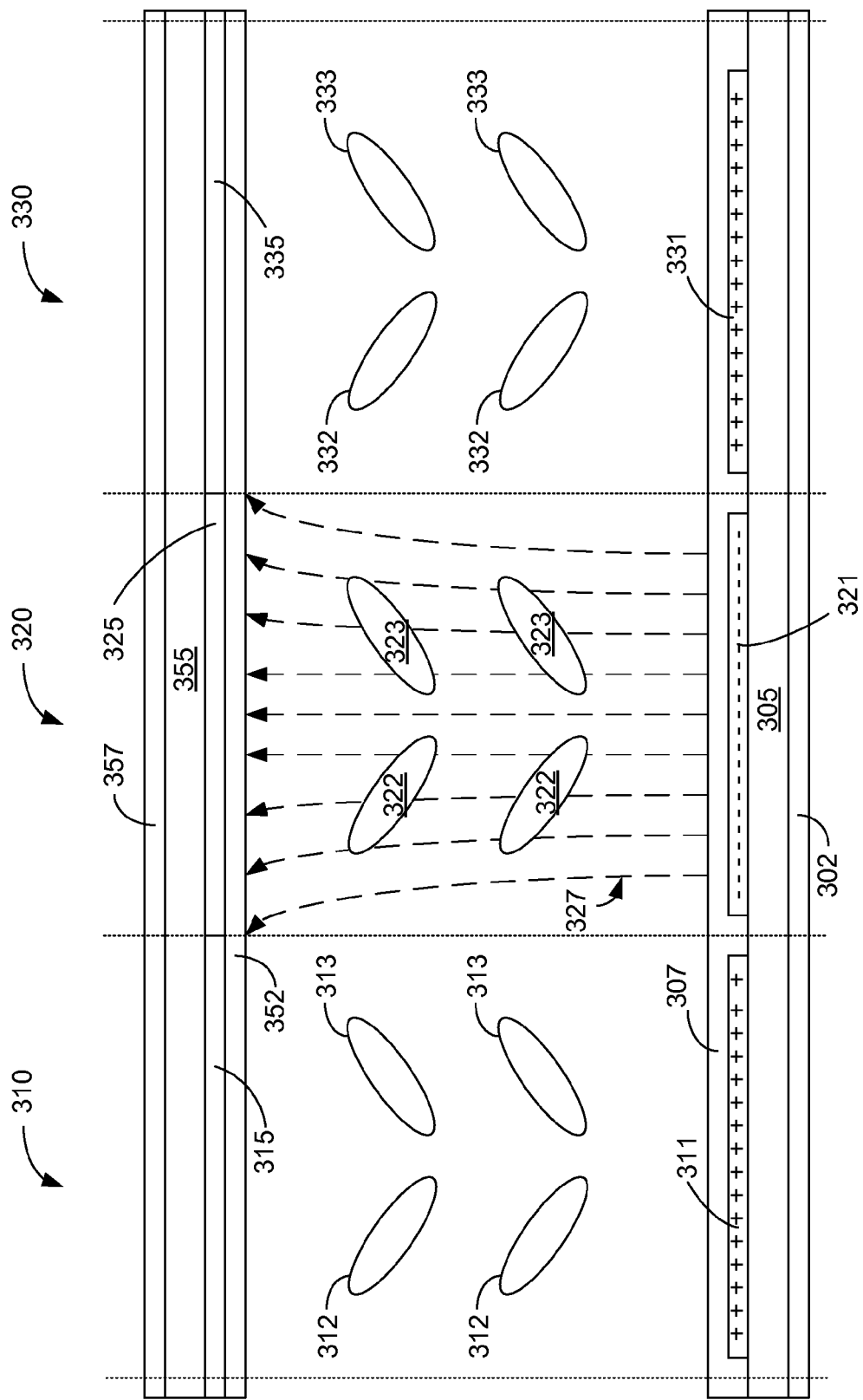

FIGS. 3(a) and 3(b) illustrate the basic concept used in accordance with the present invention to create a multi-domain vertical alignment liquid crystal display (MVA LCD) 300 without resorting to physical features on the substrates. Specifically FIG. 3 shows pixels 310, 320, and 330 in between a first substrate 305 and a second substrate 355. A first polarizer 302 is attached to first substrate 305 and a second polarizer 357 is attached to second substrate 355. Pixel 310 includes a first electrode 311, liquid crystals 312, liquid crystals 313 and a second electrode 315. Pixel 320 includes a first electrode 321, liquid crystals 322, liquid crystals 323 and a second electrode 325. Similarly, pixel 330 includes a first electrode 331, liquid crystals 332, liquid crystals 333 and a second electrode 335. The electrodes are typically constructed using a transparent conductive material such as ITO. Furthermore, a first alignment layer 307 covers the electrodes on first substrate 305. Similarly a second alignment layer 352 covers the electrodes on second substrate 355. Both LC alignment layers 307 and 352 provide a vertical LC alignment. As explained in more detail below, electrodes 315, 325, and 335 are held at a common voltage V_Com. Therefore, to ease manufacturing, electrodes 315, 325, and 335 are created as a single structure (as shown in FIGS. 3(a) and 3(b)). MVA LCD 300 operates pixels 310, 320, and 330 using alternating polarities. For example, if the polarities of pixels 310 and 330 are positive then the polarity of pixel 320 would be negative. Conversely, if the polarities of pixel 310 and 330 are negative then the polarity of pixel 320 would be positive. Generally, the polarity of each pixel would switch between frames, but the pattern of alternating polarities is maintained in each frame. In FIG. 3(a), pixels 310, 320, and 330 are in the "OFF" state, i.e. with the electric field between the first and second electrodes turned off. In the "OFF" state some residual electric field may be present between the first and second electrode. However, the residual electric field is generally too small to tilt the liquid crystals.

In FIG. 3(b), pixels 310, 320, and 330 are in the "ON" state. 3(b) uses "+" and "−" to denote the charge state of the electrodes. Thus, electrodes 311, and 331 are positively charged and electrodes 321 are negatively charged. The charge polarity is defined with respect to the V_com, where a positive polarity is obtained for voltage larger than V_com, and a negative polarity is obtained for voltage smaller than V_com, Substrate 355 and electrodes 315, 325, and 335 are kept at common voltage V_com. Electric field 327 (illustrated using field lines) between electrodes 321 and 325 causes liquid crystals 322 and liquid crystals 323 to tilt. In general, without protrusions or other features the tilting direction of the liquid crystals is not fixed for LCs with vertical LC alignment layers at 307 and 352. However, the fringe field at the edges of the pixel can influence the tilting direction of the liquid crystals. For example, electric field 327 between electrode 321 and electrode 325 is vertical around the center of pixel 320 but is tilted to the left in the left part of the pixel, and tiled to the right in the right part of the pixel. Thus, the fringe fields between electrode 321 and electrode 325 cause liquid crystals 323 to tilt to the right to form one domain and cause liquid crystals 322 to tilt to the left to from a second domain. Thus, pixel 320 is a multi-domain pixel with a wide symmetrical viewing angle Similarly, the electric field (not shown) between electrode 311 and electrode 315 would have fringe fields that cause liquid crystals 313 to reorientate and tilt to the right in the right side in pixel 310 and cause liquid crystals 312 to tilt to the left in the left side in pixel 310. Similarly, the electric field (not shown) between electrode 331 and electrode 335 would have fringe fields that cause liquid crystals 333 to tilt to the right in the right side in pixel 330 and cause liquid crystals 332 to tilt to the left in the left side in pixel 330.

Alternating polarity of adjacent pixels amplifies the fringe field effect in each pixel. Therefore, by repeating the alternating polarity pattern between rows of pixels (or columns of pixels), a multi domain vertical alignment LCD is achieved without physical features. Furthermore, an alternating polarity checkerboard pattern can be used to create four domains in each pixel.

However, fringe field effects are relatively small and weak, in general. Consequently, as pixels become larger, the fringe fields at the edge of the pixels would not reach all the liquid crystals within a pixel. Thus, in large pixels the direction of tilting for the liquid crystals not near the edge of the pixels would exhibit random behavior and would not produce a multi-domain pixel. Generally, fringe field effects of pixels would not be effective to control liquid crystal tilt when the pixels become larger than around 40-60 μm. Therefore, for large pixel LCDs a novel pixel division method is used to achieve multi-domain pixels.

Figure 4A:
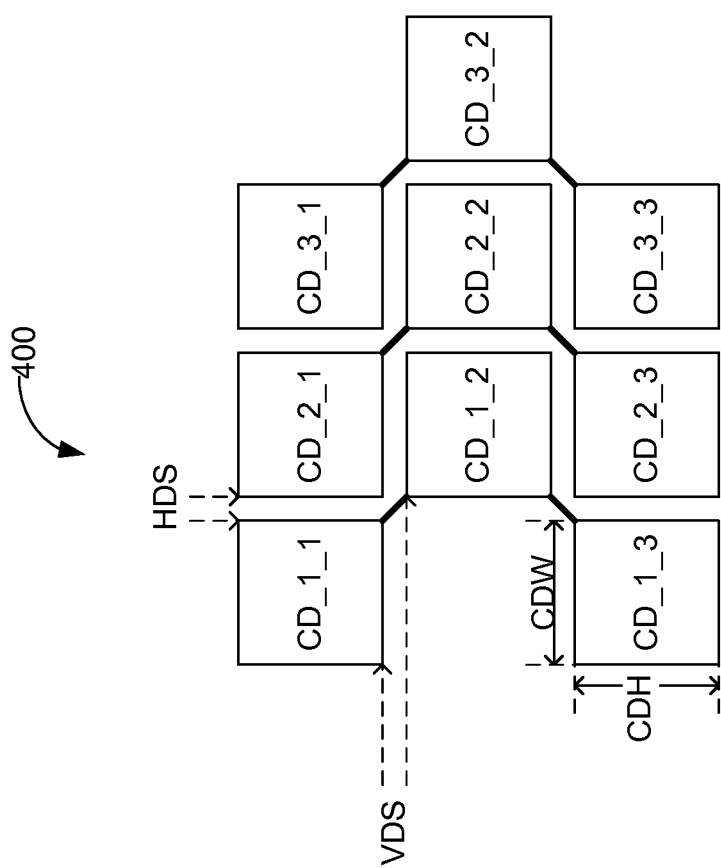
FIGS. 4(a)-4(c) illustrate a pixel design in accordance with one embodiment of the present invention.

Specifically, for color LCDs, pixels are divided into color components. Each color component is controlled by a separate switching element, such as a thin-film transistor (TFT). Generally, the color components are red, green, and blue. In accordance with the present invention, the color components of a pixel are further divided into color dots. FIG. 4(a) illustrates a novel pixel design in accordance with one embodiment of the present invention. Specifically, FIG. 4(a) shows a pixel 400 divided into three color components. Each of the three color components is further divided into three color dots. For clarity, the color dots are referenced as CD_X_Y, where X is a color component (from 1 to 3 for pixel 400) and Y is a dot number (from 1 to 3 for pixel 400). Specifically, pixel 400 is formed by nine color dots. Color dots CD_1_1 (i.e., the first color dot of color component 1), CD_2_1 (i.e., the first color dot of the second color component), and CD_3_1 (i.e., the first color dot of the third color component) form the first row of pixel 400. Horizontally adjacent color dots are separated by a horizontal dot spacing HDS. Generally horizontal dot spacing HDS is about 2 to 5 um depending on the process equipment accuracy. For example in one embodiment of the present invention, color dot width CDW is 40 um and horizontal dot spacing HDS is 2 um. Color dots CD_1_2, CD_2_2, and CD_3_2 form a second row of pixel 400. However the second row is offset from the first row so that color dot CD_1_2 is aligned horizontally with color dot CD_2_1. The color dots in the first row are separated from the color dots in the second row by a vertical dot spacing VDS. Thus, vertically adjacent color dots are separated by vertical dot spacing VDS. Generally vertical dot spacing VDS is about 2 to 5 um depending on the process equipment accuracy. For example in one embodiment of the present invention, color dot height CDH is 60 um and vertical dot spacing VDS is 3 um. Color dots CD_1_3, CD_2_3, and CD_3_3 form the third row of pixel 400. However the third row is aligned with the first row so that color dot CD_2_3 is horizontally aligned with color dot CD_1_2.

Figure 4B:
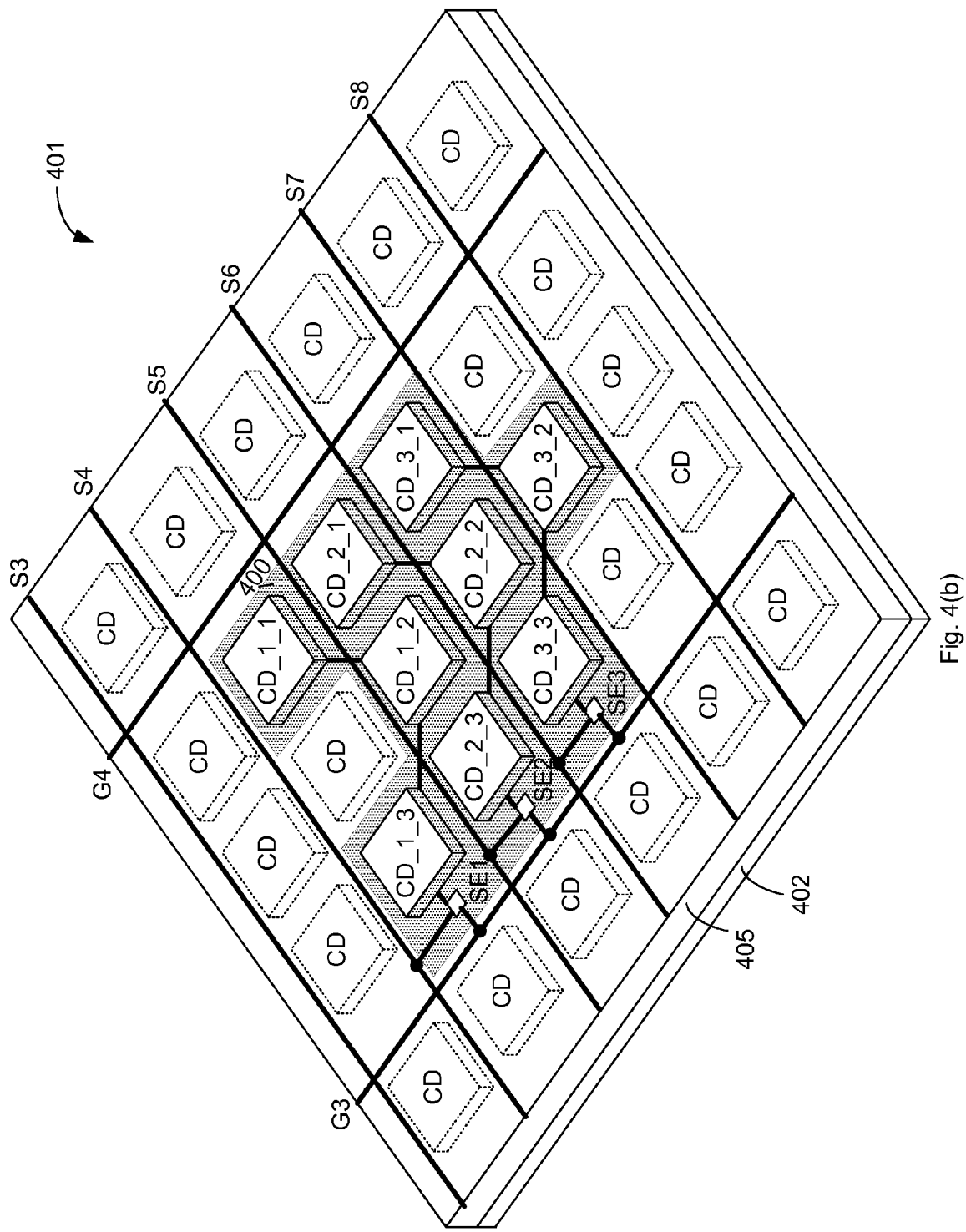
Figure 4C:
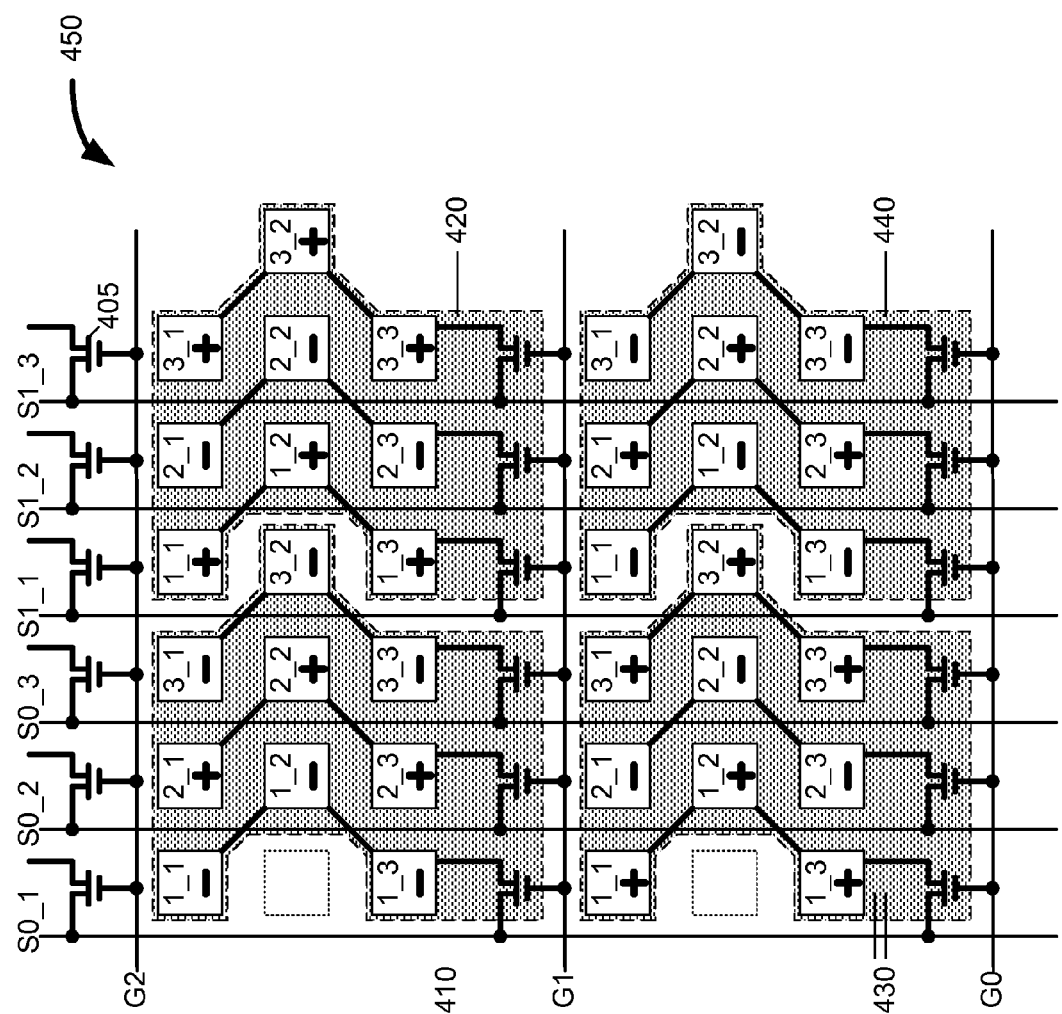

The color dots of a color component are controlled by a switching element, such as a thin-film transistor (TFT), thus the polarity of all the color dots of one color components are the same. Various designs can be used to make the electrical connections between the color dots of a color component. For example, some embodiments of the present invention use ITO connections, which are optically transparent, from the switching element to the color dots (shown as bold lines in FIG. 4(a)). FIG. 4(b) shows a perspective view of a portion of an LCD 401 using a pixel 400. In FIG. 4(b) the area of pixel 400 is shaded, this shading is only for illustrative purposes in FIG. 4(b) and has no functional significance. Specifically, FIG. 4(b) shows a first polarizer 402 attached to a substrate 405. The electrodes of color dots CD_1_1, CD_1_2, CD_1_3, CD_2_1, CD_2_2, CD_2_3, CD_3_1, CD_3_2, and CD_3_3 of pixel 400 are formed on the top surface of substrate 405. For clarity the electrodes are also labeled using the CD_X_Y format. The electrodes of other color dots (CD) of other pixels are also formed on substrate 405. For clarity, the color dots of other pixels are shown with dotted lines. An alignment layer (not shown) would cover the electrodes. Also shown in FIG. 4(b) are switching elements SE1, SE2, and SE3 of Pixel 400. In one embodiment of the present invention, the switching elements are n-channel Field Effect Transistors fabricated using thin film technology. For clarity the switching elements of other pixels are not shown in FIG. 4(b). As illustrated in FIG. 4(b) the color dots are arranged in a grid pattern, where each dot is separated from adjacent dots by horizontal dot spacing HDS and a vertical dot spacing VDS. FIG. 4(b) also demonstrates that rows of pixels are often separated by some space to allow room or the switching elements. Often the space for the switching elements is made to be the same as color dot height CDH to maintain a consistent grid pattern. Some embodiments of the present invention include device component areas (as described in detail below) to cover the switching elements and storage capacitors. The switching elements are controlled by gate lines (G3 and G4) and source lines (S3, S4, S5, S6, S7 and S8). Specifically for pixel 400, the gate terminals of switching elements SE1, SE2, and SE3 are coupled to gate line G3. The source terminals of switching elements SE1, SE2, and SE3 are coupled to source lines S4, S5, and S6, respectively. FIG. 4(c) (described below) illustrates in more detail the use of source lines and gate lines in display 400. Switching element SE_1 is electrically coupled to the electrodes of color dots CD_1_3, CD_1_2 (via the electrode of color dot CD_1_3), and CD_1_1 (via the electrodes of color dots CD_1_3 and CD_1_2). Similarly, Switching element SE_2 is electrically coupled to the electrodes of color dots CD_2_3, CD_2_2 (via the electrode of color dot CD_2_3), and CD_2_1 (via the electrodes of color dots CD_2_3 and CD_2_2); and switching element SE_3 is electrically coupled to the electrodes of color dots CD_3_3, CD_3_2 (via the electrode of color dot CD_3_3), and CD_3_1 (via the electrodes of color dots CD_3_3 and CD_3_2). The electrical connections are typically made using a transparent conductor such as ITO. An alignment layer (not shown) would cover the electrodes. Although not shown in FIG. 4(b), some embodiments of the present invention may also include additional storage capacitors coupled to the color dots and switching elements to maintain proper charge (voltage) levels. The function of storage capacitors is explained below.

FIG. 4(c) illustrates a portion of a display 450 having four pixels (410, 420, 430 and 440) using pixel design 400. In FIG. 4(c) dot polarities for each color dot is illustrated with a "+" or a "−". Dot polarities are explained below with respect to FIGS. 5(a)-5(c). Pixels 410, 420, 430, and 440 are equivalent in position and polarity to Pixels P(0, 1), P(1, 1), P(0, 0), and P(1, 0) respectively. FIG. 4(c) is drawn showing source lines (S0_1, S0_2, S0_3, S1_1, S1_2, and S1_3) and gate lines (G0, G1 and G2). In general, a source line SX_Z is used for the color component Z of pixel number X of a row and a gate line GY is used for row Y. The source terminal of a transistor is coupled to a source line and the gate terminal of the transistor is coupled to a gate line. The drain terminal of the transistor is coupled to the electrode of the various color dots. For clarity, transistors are referenced as transistor T(SX_Z, GY) where SX_Z is the source line coupled to the transistor and GY is the gate line coupled to the transistor. Thus transistor 405 in FIG. 4(c) is referenced herein as transistor T(S1_3, G2) because the source terminal of transistor 405 is coupled to source line S1_3 and the gate terminal of transistor 405 is coupled to gate line G2. For clarity, the area of each pixel is shaded; this shading is only for illustrative purposes in FIG. 4(c) and has no functional significance. Due to space limitations in FIG. 4(c), color dots are labeled with J_K rather than CD_J_K as in the other figures. However for consistency the description shall continue to use CD_J_K. Electrode connections are drawn in bold lines. Thus for example in pixel 410, which is controlled by gate line G1 and source lines S0_1, S0_2, and S_03, the drain terminal of transistor T(S0_1, G1) is coupled to color dot CD_1_3, which is coupled to color dot CD_1_2, which is coupled to color dot CD_1_1. Similarly, the drain terminal of transistor T(S0_2, G1) is coupled to color dots CD_2_3, which is coupled to color dot CD_2_2, which is coupled to color dot CD_2_1 and the drain terminal of transistor T(S0_3, G1) is coupled to color dot CD_3_3, which is coupled to color dot CD_3_2, which is coupled to color dot CD_3_1. Furthermore, the gate terminals of transistors T(S0_1, G1), T(S0_2, G1), and T(SO_3, G1) are coupled to gate line G1 and the source terminals of transistors T(S0_1, G1), T(S0_2, G1), and T(SO_3, G1) are coupled to source lines S0_1, S0_2, and S0_3, respectively. Similarly, Pixel 420 is coupled to gate line G1 and source lines S1_1, S1_2, and S1_3. Pixel 430 is coupled to gate line G0 and source lines S0_1, S0_2, and S0_3; and pixel 440 is coupled to gate line G0 and source lines S1_1, S1_2, and S1_3.

Each gate line extends from the left side of display 450 to the right side and controls all the pixels on one row of display 450. Display 450 has one gate line for each row of pixels. Each source line runs from the top to the bottom of display 450. Display 450 has three times the number of source lines as the number of pixels on each row (i.e. one source line for each color component of each pixel). During operation only one gate line is active at a time. All transistors in the active row are rendered conductive by a positive gate impulse from the active gate line. Transistors in other rows are blocked by grounding the non-active gate lines. All source lines are active at the same time and each source line provides video data to one transistor on the active row (as controlled by the active gate line). Therefore, gate lines are often called bus lines and source lines are often called data lines due to the way the gate lines and source lines operate. The voltage charges the liquid crystal capacitor to a desired gray scale level (color is provided by color filters). When inactive, the electrodes of the color dot are electrically isolated and thus can maintain the field to control the liquid crystals. However, parasitic leakage is unavoidable and eventually the charge will dissipate. For small screens with fewer rows, the leakage is not problematic because the row is "refreshed" quite often. However, for larger displays with more rows the there is a longer period between refreshes. Thus, some embodiments of the present invention include one or more storage capacitors for each color dot. The storage capacitors are charged with the electrodes of the color dots and provides a "maintenance" charge while the row is inactive. Generally, the data lines and bus lines are manufactured using an opaque conductor, such as Aluminum (Al) or Chromium (Cr).

In general, LCD pixel layouts have two major methods of placing switching elements and storage capacitors. Most common, is to place the switching element and the storage capacitor together. For convenience, the area for the switching elements and storage capacitor is called the device component area DCA. Furthermore, separate device component areas are used for each color component of the pixel. In conventional pixels, device component area DCA is at the top or bottom of the pixel however some pixel designs in the present invention also have device component areas in the middle of the pixel. Alternatively, the switching element and storage capacitors are placed at different locations. Generally, pixels using this method put the switching elements at the top or bottom of the pixel and distribute the storage capacitor within the pixel. Thus, the storage capacitors for embodiments using this method are not shown. For completeness, FIGS. 4(*b*), 4(*c*), and 5(*a*)-5(*c*) show the pixel design of FIG. 4(*a*) without the device component area and FIGS. 5(*d*)-5(*f*) shows the pixel design of FIG. 4(*a*) with the device component areas. Similarly, FIGS. 6(*a*)-6(*c*) shows an alternate pixel design that is similar to the pixel design of FIG. 4(*a*) without the device component area and FIGS. 6(*d*)-6(*f*) shows the same design with the device component areas. However, for brevity the other pixel designs described herein are shown using the device component area. However, the principles of the present invention are applicable to both methods of pixel designs.

To achieve multiple domains in the pixel design of FIG. 4(*a*), the first and third color components of a pixel have the same polarity and the second component has the opposite polarity. However for adjacent pixels the polarities are reversed. For MVA LCDs using the pixel design of FIG. 4(*a*), two different dot polarity patterns are used for the pixels. FIGS. 5(*a*) and 5(*b*) illustrate the two dot polarity patterns. In FIG. 5(*a*), pixel 510− (the "510−" label refers to a negative dot polarity pattern as explained below) is an example of the first dot polarity pattern, which has positive polarity at the second color component, i.e., switching element SE_2 and color dots CD_2_1, CD_2_2, and CD_2_3, and negative polarity at the first and third color components, i.e., switching elements SE_1 and SE_3, and color dots CD_1_1, CD_1_2, CD_1_3, CD_3_1, CD_3_2, and CD_3_3. In FIG. 5(*b*), pixel 510+ (the "510+" label refers to a positive dot polarity pattern as explained below) is an example of the second dot polarity pattern, which has negative polarity at the second color component, i.e., switching element SE_2, and color dots CD_2_1, CD_2_2, and CD_2_3, and positive polarity at the first and third color components, i.e., switching elements SE_1 and SE_3, and color dots CD_1_1, CD_1_2, CD_1_3, CD_3_1, CD_3_2, and CD_3_3. In actual operation a pixel will switch between the first dot polarity pattern and the dot second polarity pattern between each image frame. For clarity, the dot polarity pattern, in which the first color dot of the first color component has a positive polarity, is referred to as the positive dot polarity pattern. Conversely, the dot polarity pattern in which the first color dot of the first color component has a negative polarity is referred to as the negative dot polarity pattern. Thus, FIG. 5(*a*) is the negative dot polarity pattern and FIG. 5(*b*) is the positive dot polarity pattern for the pixel design of FIG. 4(*a*).

Pixels using the pixel design of FIG. 4(*a*) should be arranged in a checkerboard pattern with half the pixels having the positive dot polarity pattern and half the pixels having the negative dot polarity pattern. FIG. 5(*c*) illustrates the checkerboard pattern with pixels P(0, 0), P(1, 0), P(2, 0), P(0, 1), P(1, 1), and P(2, 1) of a display 500. For clarity, the area of each pixel is shaded; this shading is only for illustrative purposes in FIG. 5(*c*) and has no functional significance. Specifically, as illustrated in FIG. 5(*c*), a pixel P(x,y) is in the xth column (from the left and the y-th row starting from the bottom, with pixel P(0,0) being the bottom left corner. Pixels P(0, 0), P(2, 0) and P(1, 1) have the positive dot polarity pattern and pixels P(1, 0), P(0, 1), and P(2, 1) have the negative dot polarity pattern. Thus, in FIG. 5(*c*) a pixel P(x, y) has the negative dot polarity pattern if x plus y is an odd number. Conversely, pixel P(x, y) has the positive dot polarity pattern if x plus y is an even number. However, at the next frame the pixels will switch dot polarity patterns. Thus, more generally, a MVA LCD using the pixel design of FIG. 4(*a*) has a first set of pixels having a first dot polarity pattern and a second set of pixels having a second dot polarity pattern. The first set of pixels and the second set of pixels are arranged in a checkerboard pattern.

A close examination of FIG. 5(*c*) reveals that the color dots also have a checkerboard pattern in terms of polarity. Thus, for each color dot of a first polarity, the four adjacent color dots will be of a second polarity. For example, color dot CD_3_1 of pixel P(0, 0), which has a positive polarity, is surrounded by four color dots of negative polarity. Specifically, color dot CD_3_3 of pixel P(0, 1), color dot CD_1_1, of pixel P(1, 0), and color dots CD_2_1 and CD_2_2 of pixel P(0, 0). As explained above, polarity inversion between neighboring color dots amplifies the fringe field in the color dots. Because the color dots are quite small, fringe fields in the color dots will cause multiple domains in the liquid crystals of each color dot under the principles explained above with respect to FIGS. 3(*a*) and 3(*b*). For clarity, FIG. 5(*c*) (as well as later similar figures) are simplified to show the arrangement of the pixels and omits the control lines for the switching elements. FIG. 4(*c*) provides greater detail as to the control lines of such displays. One skilled in the art can use the teachings provided herein to easily derive the control lines from the simplified illustrations.

As explained above the dot polarity patterns of each pixel switches between the positive dot polarity pattern and the negative dot polarity pattern in each successive frame. The polarity switching prevents image quality degradation, which may result from twisting the liquid crystals in the same direction in every frame. However, the dot polarity switching may cause other image quality issues such as flicker if all the switching elements are of the same polarity. To minimize flicker, the switching element (e.g. are transistors) are arranged in switching element driving scheme that include positive and negative polarities. Furthermore, to minimize cross talk the positive and negative polarities of the switching elements should be arranged in a uniform pattern, which provides a more uniform power distribution. Various switching element driving scheme are used by the embodiments of the present invention. The three main switching element driving schemes are switching element point inversion driving scheme, switching element row inversion driving scheme, and switching element column inversion driving scheme. In the switching element point inversion driving scheme, the switching elements form a checkerboard pattern of alternating polarities. In the switching element row inversion driving scheme, the switching elements on each row have the same polarity; however, each a switching element in one row has the opposite polarity as compared to the polarity of switching elements in adjacent rows. In the switching element column inversion driving scheme, the switching elements on each column have the same polarity; however, a switching element in one column has the opposite polarity as compared to the polarity of switching elements in adjacent columns. The pixel pattern of FIG. 5(c) uses a switching element point inversion driving scheme because switching elements form a checkerboard pattern of polarities.

FIGS. 5(d) and 5(e) show a pixel design 520, which has the same color dot arrangement as FIG. 4(a). However, pixel design 520 includes device component area DCA_1, DCA_2, and DCA_3. As explained above, switching elements and storage capacitors are placed in the device component areas. However, due to space limitations in the Figures, the storage capacitors are not shown. Specifically, color dots CD_1_1 (i.e., the first color dot of color component 1), CD_2_1 (i.e., the first color dot of the second color component), and CD_3_1 (i.e., the first color dot of the third color component) form the first row of pixel design 520. Color dots CD_1_2, CD_2_2, and CD_3_2 form a second row of pixel design 520. However the second row is offset from the first row so that color dot CD_1_2 is aligned horizontally with color dot CD_2_1. The color dots in the first row are separated from the color dots in the second row by a vertical dot spacing VDS. Color dots CD_1_3, CD_2_3, and CD_3_3 form the third row of pixel design 520. However the third row is aligned with the first row so that color dot CD_2_3 is horizontally aligned with color dot CD_1_2. Device component areas DCA_1, DCA_2, and DCA_3 form a fourth row of pixel design 520. The fourth row is aligned horizontally with the third row so that drive component DCA_1 is horizontally aligned with color dot CD_1_3. Switching elements SE_1, SE_2, and SE_3, are located within device component areas DCA_1, DCA_2, and DCA_3, respectively. Switching element SE_1 is coupled to the electrodes of color dots CD_1_1, CD_1_2, and CD_1_3. Switching element SE_2 is coupled to the electrodes of color dots CD_2_1, CD_2_2, and CD_2_3. Switching element SE_1 is coupled to the electrodes of color dots CD_3_1, CD_3_2, and CD_3_3.

FIGS. 5(d) and 5(e) illustrate the two dot polarity patterns of pixel design 520. FIG. 5(d) illustrates the negative dot polarity patter of pixel design 520 (labeled 520−). Specifically, the negative dot polarity pattern of pixel design 520 has positive polarity at the second color component, i.e., switching element SE_2 and color dots CD_2_1, CD_2_2, and CD_2_3, and negative polarity at the first and third color components, i.e., switching elements SE_1 and SE_3, and color dots CD_1_1, CD_1_2, CD_1_3, CD_3_1, CD_3_2, and CD_3_3. FIG. 5(e) illustrates the positive dot polarity pattern of pixel design 520 (labeled 520+), which has negative polarity at the second color component, i.e., switching element SE_2, and color dots CD_2_1, CD_2_2, and CD_2_3, and positive polarity at the first and third color components, i.e., switching elements SE_1 and SE_3, and color dots CD_1_1, CD_1_2, CD_1_3, CD_3_1, CD_3_2, and CD_3_3. In actual operation a pixel will switch between the first dot polarity pattern and the dot second polarity pattern between each image frame.

Figure 5B:
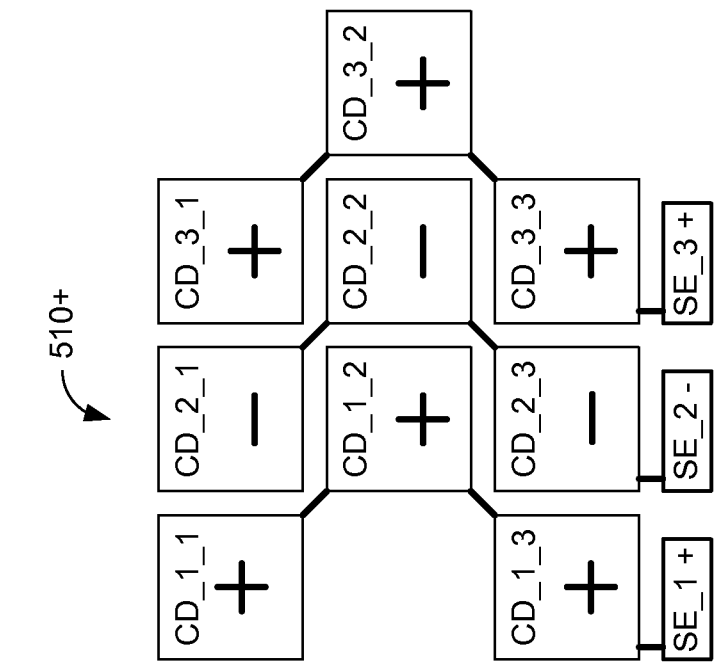
FIGS. 5(a)-5(c) illustrate dot polarity patterns and a liquid crystal display in accordance with one embodiment of the present invention.
Figure 5A:
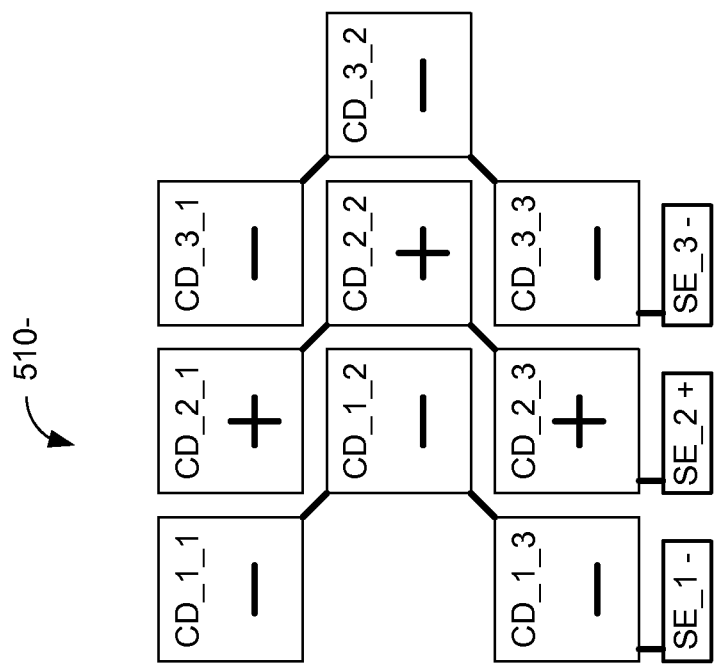

Pixels using pixel design 520 of FIGS. 5(d) and 5(e) should be arranged in a checkerboard pattern with half the pixels having the positive dot polarity pattern and half the pixels having the negative dot polarity pattern. FIG. 5(f) illustrates the checkerboard pattern with pixels P(0, 0), P(1, 0), P(2, 0), P(0, 1), P(1, 1), and P(2, 1) of a display 550. For clarity, the area of each pixel is shaded; this shading is only for illustrative purposes in FIG. 5(f) and has no functional significance. Specifically, as illustrated in FIG. 5(f), a pixel P(x,y) is in the xth column (from the left and the y-th row starting from the bottom, with pixel P(0,0) being the bottom left corner. Pixels P(0, 0), P(2, 0) and P(1, 1) have the positive dot polarity pattern and pixels P(1, 0), P(0, 1), and P(2, 1) have the negative dot polarity pattern. Thus, in FIG. 5(f) a pixel P(x, y) has the negative dot polarity pattern if x plus y is an odd number. Conversely, pixel P(x, y) has the positive dot polarity pattern if x plus y is an even number. However, at the next frame the pixels will switch dot polarity patterns. Thus, more generally, a MVA LCD using the pixel designs of FIGS. 5(d) and 5(e) has a first set of pixels having a first dot polarity pattern and a second set of pixels having a second dot polarity pattern. The first set of pixels and the second set of pixels are arranged in a checkerboard pattern.

Display 550 differs from display 500 due to the rows of device component areas. If the device component areas are short than the checkerboard of polarities for the color dots should be maintained for fringe field enhancement. However, some embodiments of the present invention may use tall device component areas to isolate color dots in one region from color dots in a second region. In these embodiments, the checkerboard pattern of dot polarities for the color dots is maintained within each region but not necessarily across the entire display. For example Display 550 maintains the checkerboard pattern for the entire display. However another embodiment of the present invention could reverse the polarities pixel P(0, 0), P(1, 0) and P(2, 0) if the device component areas are sufficiently tall.

Figure 5C:
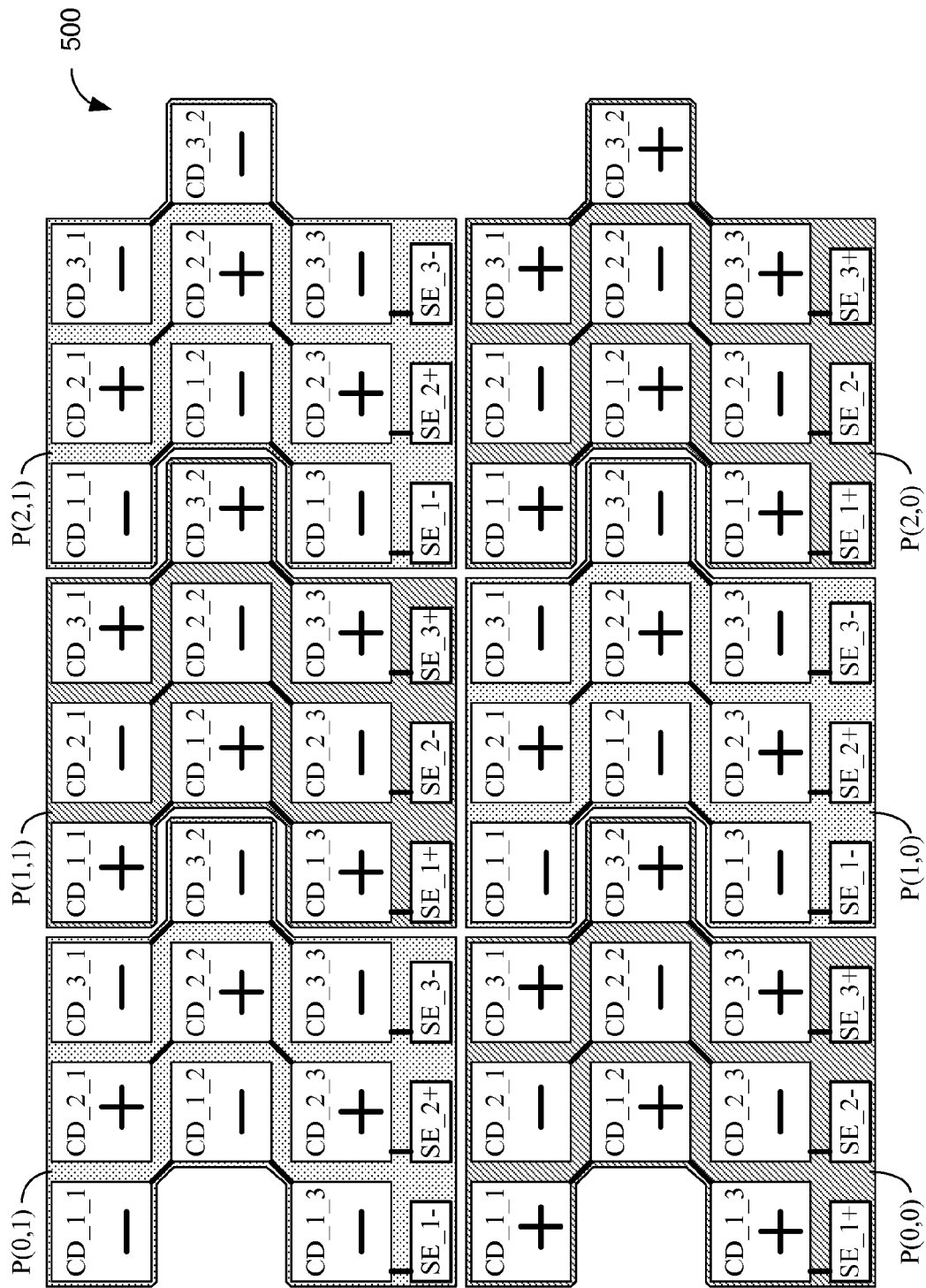
Figure 5F:
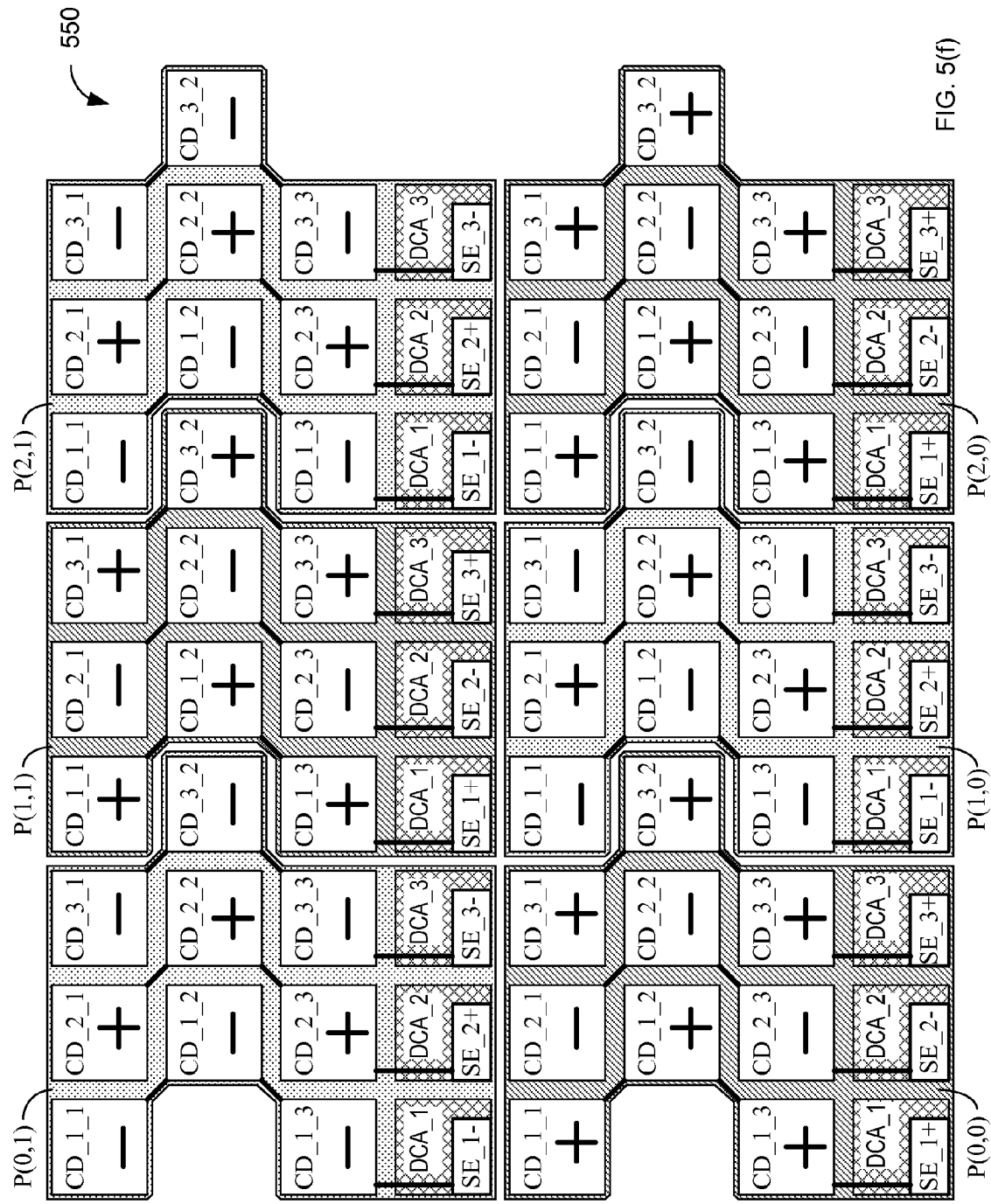

In FIGS. 5(c) and 5(f), color dots of the same color components within a pixel exhibit a zigzag pattern. However, color dots of the same color component in adjacent pixels are adjacent at the boundary of the pixels. For example, color dot CD_1_3 of pixel P(0,1) is directly above color dot CD_1_1 of pixel P(0,0) in display 500. Therefore, in some embodiments of the present invention, a liquid crystal display combines two pixel designs to provide a more symmetrical color distribution. FIGS. 6(a)-6(b) show dot polarity patterns of a pixel design 610 that can be used with the pixel design of FIGS. 5(a) and 5(b) to create multi-domain vertical alignment liquid crystal display (MVA LCD) having more symmetrical color distribution.

In FIG. 6(a), pixel 610− has three color components and each color component is divided into 3 color dots. The electrodes of the color dots of each color component are electrically coupled. Color dots CD_1_1 (i.e., the first color dot of color component 1), CD_2_1 (i.e., the first color dot of the second color component), and CD_3_1 (i.e., the first color dot of the third color component) form the first row of pixel 610. Color dots CD_1_2, CD_2_2, and CD_3_2 form a second row of pixel 610. However the second row is offset from the first row so that color dot CD_1_1 is adjacent to color dot CD_2_2. As described above, as used herein adjacent color dots are generally separated by a vertical (or horizontal) dot spacing. Color dots CD_1_3, CD_2_3, and CD_3_3 form the third row of pixel 610. However the third row is aligned with the first row so that color dot CD_1_3 is adjacent to color dot CD_2_2. Pixel 610 also includes switching elements SE_1, SE_2, and SE_3, which are coupled to color dots CD_1_3, CD_2_3, and CD_3_3, respectively. Furthermore, switching elements SE_1, SE_2, and SE_3 form a row, which is lined up with the second row of pixel 610. Switching element SE_1 is coupled to the electrodes of color dots CD_1_3, CD_1_2 and CD_1_1. As shown in FIG. 6(a), the connection to the electrode of color dot CD_1_1 is via the electrodes of color dots CD_1_2 and CD_1_3, while the connection to the electrode of color dot CD_1_2 is via the electrode of color dot CD_1_3. Similarly, switching element SE_2 is coupled to the electrodes of color dots CD_2_3, CD_2_2, and CD_2_1; and switching element SE_3 is coupled to color dots CD_3_3, CD_3_2, and CD_3_1. In the various figures showing the connection between the switching elements and the color dot electrodes, each figure represents one specific embodiment of the present invention. One skilled in the art can easily create other connection layouts based on the principles of the present invention.

In FIG. 6(a), pixel 610− is an example of the negative dot polarity pattern, which has positive polarity at the second color component, i.e., switching element SE_2, and color dots CD_2_1, CD_2_2, and CD_2_3, and negative polarity at the first and third color components, i.e., switching elements SE_1, and SE_3, and color dots CD_1_1, CD_1_2, CD_1_3, CD_3_1, CD_3_2, and CD_3_3. In FIG. 6(b), pixel 610+ is an example of the positive dot polarity pattern, which has negative polarity at the second color component, i.e., switching element SE_2, and color dots CD_2_1, CD_2_2, and CD_2_3, and positive polarity at the first and third color components, i.e., switching elements SE_1 and SE_3 and color dots CD_1_1, CD_1_2, CD_1_3, CD_3_1, CD_3_2, and CD_3_3. In actual operation a pixel will switch between the positive dot polarity pattern and the negative dot polarity pattern between each image frame.

The pixels of a MVA LCD using the pixel design of FIGS. 4, 5(a) and 5(b) with the pixel design of FIGS. 6(a)-6(b) should arranged in alternating rows with alternating dot polarity patterns arrangement. For example, odd rows would use the pixel design of FIGS. 4, 5(a) and 5(b), while even rows would use the pixel design of FIGS. 6(a) and 6(b). Pixels in each row would have alternating dot polarity patterns. FIG. 6(c) illustrates a portion of display 600 having the alternating row with alternating dot polarity patterns arrangement. Specifically, display 600 includes pixels P(0, 0), P(1, 0), P(2, 0), P(0, 1), P(1, 1), and P(2, 1). For clarity, the area of each pixel is shaded; this shading is only for illustrative purposes in FIG. 6(c) and has no functional significance. The pixel pattern of FIG. 6(c) use a switching element column inversion driving scheme because the switching elements in each column have the same polarity; however, a switching element in one column has an opposite polarity as compared to the polarities of switching elements in adjacent columns. Pixels P(0, 0), P(1, 0) and P(2, 0) use the pixel design of FIGS. 6(a)-6(b) and Pixels P(0, 1), P(1, 1), and P(2, 1) use the pixel design of FIGS. 4, 5(a), and 5(b). Furthermore, Pixels P(0, 0) and Pixels P(2, 0) have the negative dot polarity pattern of FIG. 6(a) while pixel P(1, 0) has the positive dot polarity pattern of Pixel 6(b). Similarly, Pixels P(0, 1) and P(2, 1) have the negative dot polarity pattern of FIG. 5(a) while pixel P(1, 1) has the positive dot polarity pattern of FIG. 5(b). However, at the next frame the pixels will switch dot polarity patterns. Thus, display 600 of FIG. 6(c) has a first set of pixels having of a first pixel design and a first dot polarity pattern, a second set of pixels of the first pixel design and a second dot polarity pattern, a third set of pixels of a second pixel design with a first dot polarity pattern, and a fourth set of pixels having the second pixel design and a second dot polarity pattern. Alternatively, FIG. 6(c) can be described as having alternating columns of dot polarity patterns. For example, in one frame even columns have pixels with positive dot polarity patterns and odd columns have pixels with negative dot polarity patterns. In the next frame the even columns would have pixels with negative dot polarity patterns and the odd columns would have pixels with positive dot polarity columns.

A close examination of FIG. 6(c) reveals that the color dots also have a checkerboard pattern in terms of polarity. Thus, for each color dot of a first polarity, the four adjacent color dots will be of a second polarity. For example, color dot CD_3_1 of pixel P(0, 0), which has a negative polarity, is surrounded by four color dots of positive polarity. Specifically, color dot CD_1_3 of pixel P(1, 1), color dots CD_1_1 and CD_1_2 of pixel P(1, 0), and color dot CD_2_1 of pixel P(0, 0). Furthermore, color distribution is more symmetrical as compared to FIG. 5(c) because each color component has a zigzag pattern both within each pixel and across pixel boundaries. For example, color dots CD_1_1, CD_1_2, and CD_1_3 of pixel P(0,1) and color dots CD_1_1, CD_1_2, and CD_1_3 of pixel P(0,0) form a zigzag pattern. However, some embodiments of the present invention may still use the pixel pattern of FIG. 5(c) because the pixel pattern in FIG. 5(c), which uses a switching element point inversion driving scheme, can have a more uniform electrical distribution than the pixel pattern of FIG. 6(c), which uses a switching element column inversion driving scheme. LCDs that use a switching element point inversion scheme provide a more uniform electrical distribution, which may improve optical performance by reducing flicker and cross-talk than those LCDs using a switching element column inversion driving scheme.

Figure 6E:
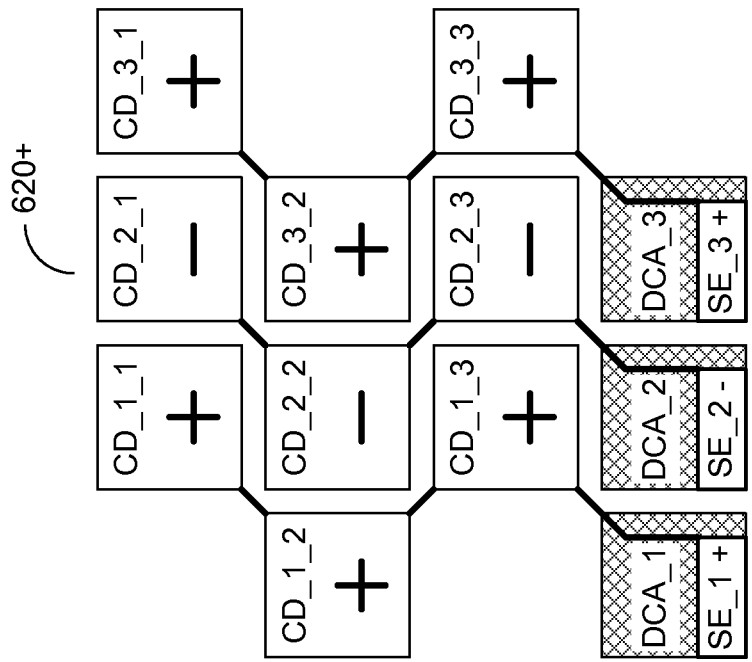
FIGS. 6(d)-6(f) illustrate dot polarity patterns and a liquid crystal display in accordance with one embodiment of the present invention.
Figure 6D:
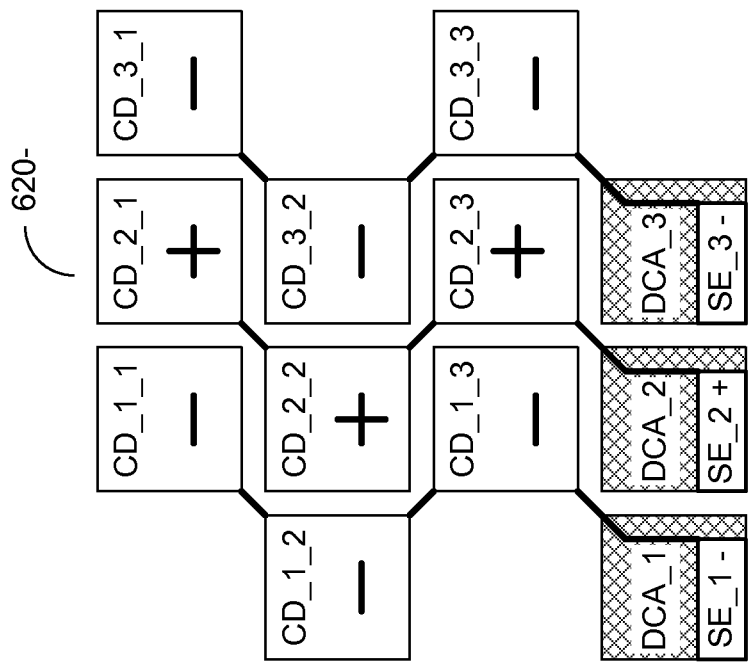

FIGS. 6(d)-6(e) show dot polarity patterns of a pixel design 620 that can be used with the pixel design of FIGS. 5(d) and 5(e) to create multi-domain vertical alignment liquid crystal display (MVA LCD) having more symmetrical color distribution. In FIG. 6(d), pixel 610− has three color components and each color component is divided into 3 color dots. The electrodes of the color dots of each color component are electrically coupled. Color dots CD_1_1 (i.e., the first color dot of color component 1), CD_2_1 (i.e., the first color dot of the second color component), and CD_3_1 (i.e., the first color dot of the third color component) form the first row of pixel 620. Color dots CD_1_2, CD_2_2, and CD_3_2 form a second row of pixel 620. However the second row is offset from the first row so that color dot CD_1_1 is adjacent to color dot CD_2_2. Color dots CD_1_3, CD_2_3, and CD_3_3 form the third row of pixel 620. However the third row is aligned with the first row so that color dot CD_1_3 is adjacent to color dot CD_2_2. Pixel 620 also includes switching elements SE_1, SE_2, and SE_3, which are coupled to color dots CD_1_3, CD_2_3, and CD_3_3, respectively. Switching elements SE_1, SE_2, and SE_3 are located within device component areas DCA_1, DCA_2, and DCA_3, respectively. Device component areas DCA_1, DCA_2, and DCA_3 form a fourth row, which is lined up with the second row of pixel 620. Switching element SE_1 is coupled to the electrodes of color dots CD_1_3, CD_1_2 and CD_1_1. As shown in FIG. 6(d), the connection to the electrode of color dot CD_1_1 is via the electrodes of color dots CD_1_2 and CD_1_3, while the connection to the electrode of color dot CD_1_2 is via the electrode of color dot CD_1_3. Similarly, switching element SE_2 is coupled to the electrodes of color dots CD_2_3, CD_2_2, and CD_2_1; and switching element SE_3 is coupled to color dots CD_3_3, CD_3_2, and CD_3_1.

In FIG. 6(d), pixel 620− is an example of the negative dot polarity pattern, which has positive polarity at the second color component, i.e., switching element SE_2, and color dots CD_2_1, CD_2_2, and CD_2_3, and negative polarity at the first and third color components, i.e., switching elements SE_1, and SE_3, and color dots CD_1_1, CD_1_2, CD_1_3, CD_3_1, CD_3_2, and CD_3_3. In FIG. 6(d), pixel 620+ is an example of the positive dot polarity pattern, which has negative polarity at the second color component, i.e., switching element SE_2, and color dots CD_2_1, CD_2_2, and CD_2_3, and positive polarity at the first and third color components, i.e., switching elements SE_1 and SE_3 and color dots CD_1_1, CD_1_2, CD_1_3, CD_3_1, CD_3_2, and CD_3_3. In actual operation a pixel will switch between the positive dot polarity pattern and the negative dot polarity pattern between each image frame.

Figure 6F:
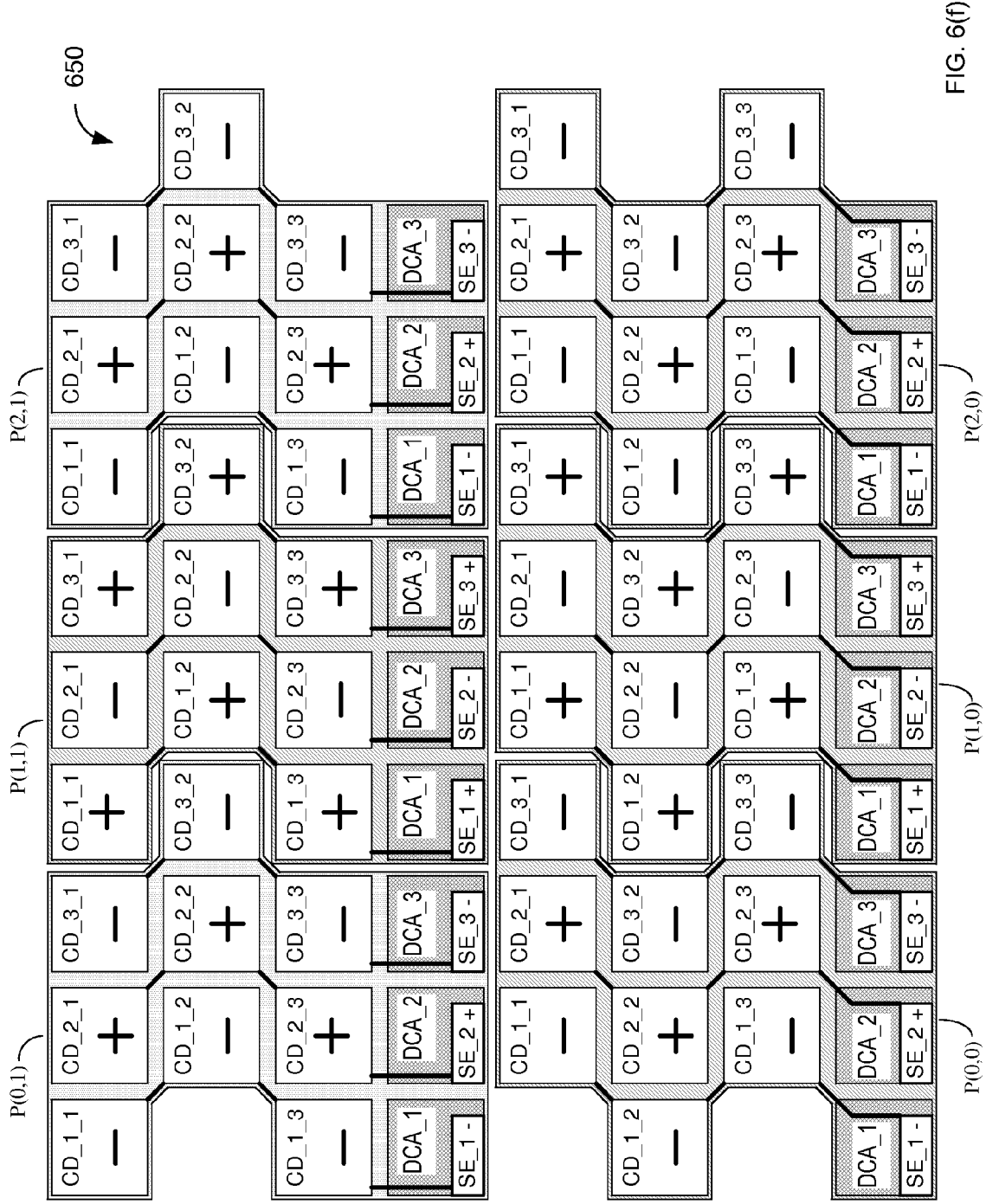

The pixels of a MVA LCD using the pixel design of FIGS. 5(d) and 5(e) with the pixel design of FIGS. 6(d)-6(e) should arranged in alternating rows with alternating dot polarity patterns arrangement. For example, odd rows would use the pixel design of FIGS. 5(d) and 5(e), while even rows would use the pixel design of FIGS. 6(d) and 6(e). Pixels in each row would have alternating dot polarity patterns. FIG. 6(f) illustrates a portion of display 650 having the alternating row with alternating dot polarity patterns arrangement. Specifically, display 650 includes pixels P(0, 0), P(1, 0), P(2, 0), P(0, 1), P(1, 1), and P(2, 1). For clarity, the area of each pixel is shaded; this shading is only for illustrative purposes in FIG. 6(f) and has no functional significance. The pixel pattern of FIG. 6(f) use a switching element column inversion driving scheme because the switching elements in each column have the same polarity; however, a switching element in one column has an opposite polarity as compared to the polarities of switching elements in adjacent columns. Pixels P(0, 0), P(1, 0) and P(2, 0) use the pixel design of FIGS. 6(d)-6(e) and Pixels P(0, 1), P(1, 1), and P(2, 1) use the pixel design of FIGS. 5(d), and 5(e). Furthermore, Pixels P(0, 0) and Pixels P(2, 0) have the negative dot polarity pattern of FIG. 6(d) while pixel P(1, 0) has the positive dot polarity pattern of Pixel 6(e). Similarly, Pixels P(0, 1) and P(2, 1) have the negative dot polarity pattern of FIG. 5(d) while pixel P(1, 1) has the positive dot polarity pattern of FIG. 5(d). However, at the next frame the pixels will switch dot polarity patterns. Thus, display 650 of FIG. 6(f) has a first set of pixels of a first pixel design and a first dot polarity pattern, a second set of pixels of the first pixel design and a second dot polarity pattern, a third set of pixels of a second pixel design with a first dot polarity pattern, and a fourth set of pixels having the second pixel design and a second dot polarity pattern. Alternatively, FIG. 6(f) can be described as having alternating columns of dot polarity patterns. For example, in one frame even columns have pixels with positive dot polarity patterns and odd columns have pixels with negative dot polarity patterns. In the next frame the even columns would have pixels with negative dot polarity patterns and the odd columns would have pixels with positive dot polarity columns.

A close examination of FIG. 6(f) reveals that the color dots also have a checkerboard pattern in terms of polarity. Thus, for each color dot of a first polarity, the four adjacent color dots (ignoring device component areas, which are not polarized) will be of a second polarity. For example, color dot CD_3_1 of pixel P(0, 0), which has a negative polarity, is surrounded by four color dots of positive polarity. Specifically, color dot CD_1_3 of pixel P(1, 1)(ignoring device component area DCA_1 of pixel P(1, 1)), color dots CD_1_1 and CD_1_2 of pixel P(1, 0), and color dot CD_2_1 of pixel P(0, 0). Furthermore, color distribution is more symmetrical as compared to FIG. 5(f) because each color component has a zigzag pattern both within each pixel and across pixel boundaries. For example, color dots CD_1_1, CD_1_2, and CD_1_3 of pixel P(0,1) and color dots CD_1_1, CD_1_2, and CD_1_3 of pixel P(0,0) form a zigzag pattern. However, some embodiments of the present invention may still use the pixel pattern of FIG. 5(f) because the pixel pattern in FIG. 5(f), which uses a switching element point inversion driving scheme, can have a more uniform electrical distribution than the pixel pattern of FIG. 6(f), which uses a switching element column inversion driving scheme. LCDs that use a switching element point inversion scheme provide a more uniform electrical distribution, which may improve optical performance by reducing flicker and cross-talk than those LCDs using a switching element column inversion driving scheme.

As explained above, fringe fields are relatively small; therefore, as LCD pixels become larger, further subdivision may be necessary. FIGS. 7(a)-7(b) show dot polarity patterns of a pixel design 710 in accordance with another embodiment of the present invention. Specifically, in FIG. 7(a) each color component of a pixel 710− is divided into 4 color dots. The color dots of each color component are electrically coupled. In addition, pixel 710 has a device component area for each color component. In many embodiments of the present invention, the switching element is located within the device component area. In these embodiments, the device component area should be diagonally, horizontally, or vertically adjacent to a color dot of the associated color component to minimize wiring lengths between the switching element and the color dots. Furthermore, in many embodiments of the present invention, the device component area is opaque. In other embodiments the device component area is colored to provide a desired color performance. Although, device component areas are not shown in FIGS. 5(a), 5(b), 5(c), 6(a), 6(b), and 6(c), other embodiments of the present invention may use the same color dot layout as pixels 510 and 610 while also including a device component areas for each color component.

In pixel 710, color dots CD_1_1 (i.e., the first color dot of color component 1), CD_2_1 (i.e., the first color dot of the second color component), and CD_3_1 (i.e., the first color dot of the third color component) form the first row of pixel 710. Color dots CD_1_2, CD_2_2, and CD_3_2 form a second row of pixel 710. However the second row is offset from the first row so that color dot CD_1_2 is adjacent to color dot CD_2_1. Color dots CD_1_3, CD_2_3, and CD_3_3 form the third row of pixel 710. However the third row is aligned with the first row so that color dot CD_2_3 is adjacent to color dot CD_1_2, i.e. color dot CD_2_3 is horizontally aligned with color dot CD_1_2 and separated vertically by the vertical dot offset VDO (not labeled in FIG. 7(a). Color dots CD_1_4, CD_2_4, and CD_3_4 form the fourth row of pixel 710. However, the fourth row is aligned with the second row so that color dot CD_1_4 is adjacent to color dot CD_2_3.

Device component areas DCA_1, DCA_2, and DCA_3 form a fifth row of pixel 710. The fifth row is aligned with the fourth row (and second row) so that device component area DCA_1 is adjacent to color dot CD_1_4. Switching elements SE_1, SE_2, and SE_3 are located within device component areas DCA_1, DCA_2, and DCA_3. Switching element SE_1 is coupled to the electrodes of color dots CD_1_4, CD_1_3, CD_1_2 and CD_1_1. As shown in FIG. 7(a), the connection to the electrode of color dot CD_1_1 is via the electrodes of color dots CD_1_2, CD_1_3 and CD_1_4; the connection to the electrode of color dot CD_1_2 is via the electrodes of color dots CD_1_3 and CD_1_4; and the connection to the electrode of color dot CD_1_3 is vial the electrode of color dot CD_1_4. Similarly, switching element SE_2 is coupled to the electrodes of color dots CD_2_4, CD_2_3, CD_2_2, and CD_2_1; and switching element SE_3 is coupled to color dots CD_3_4, CD_3_3, CD_3_2, and CD_3_1.

FIG. 7(a) also shows a negative dot polarity pattern for pixel 710−. The negative dot polarity pattern has positive polarity at the second color component, i.e., switching element SE_2 and color dots CD_2_1, CD_2_2, CD_2_3, and CD_2_4, and negative polarity at the first and third color components, i.e., switching elements SE_1 and SE_3, and color dots CD_1_1, CD_1_2, CD_1_3, CD_1_4, CD_3_1, CD_3_2, CD_3_3, CD_3_4. In FIG. 7(b), pixel 710+ is an example of the positive dot polarity pattern, which has negative polarity at the second color component, i.e., switching element SE_2 and color dots CD_2_1, CD_2_2, CD_2_3, and CD_2_4, and positive polarity at the first and third color components, i.e., switching elements SE_1 and SE_3 and color dots CD_1_1, CD_1_2, CD_1_3, CD_1_4, CD_3_1, CD_3_2, CD_3_3, and CD_3_4.

Figure 7C:
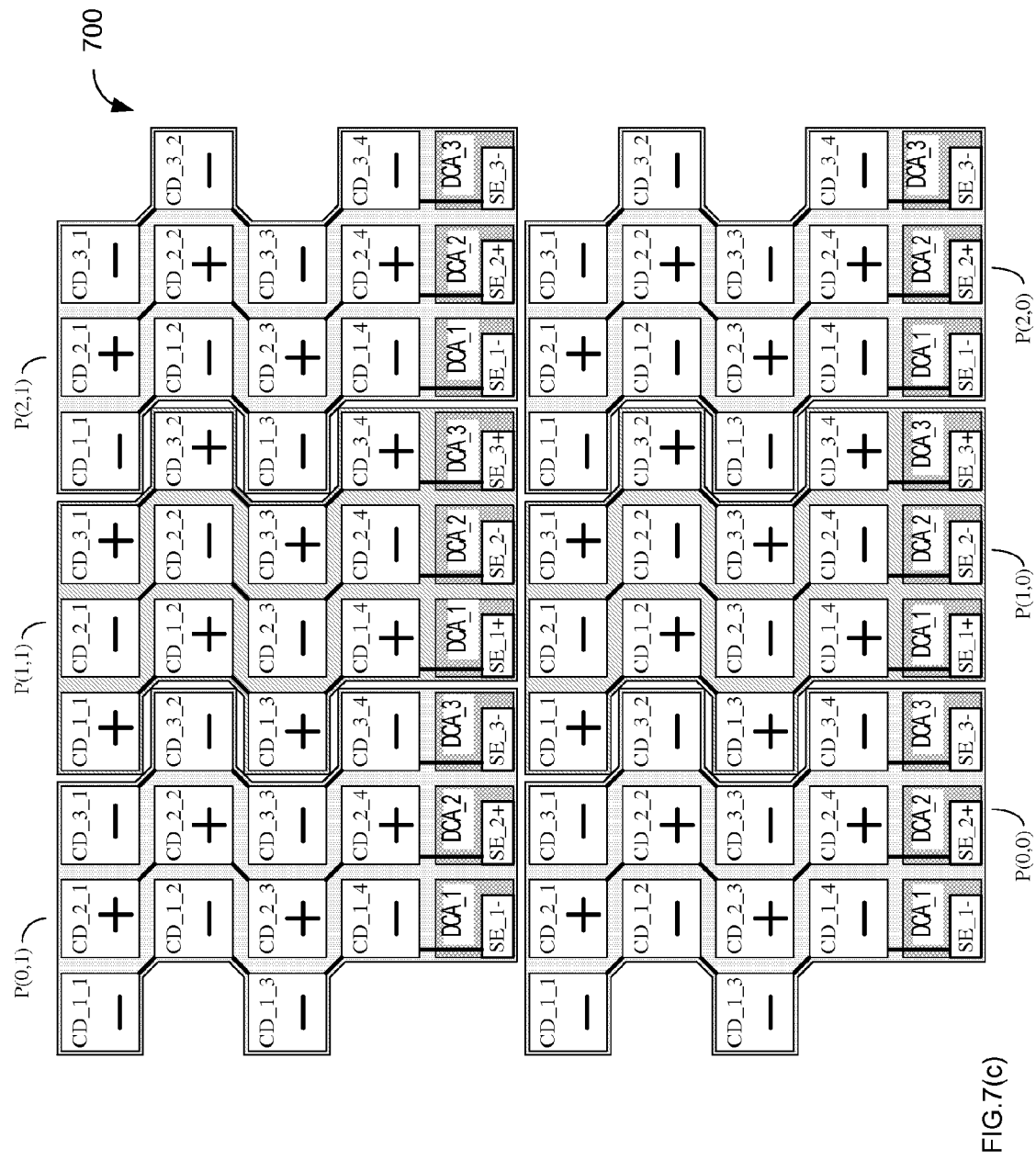

Pixels using the pixel design of FIGS. 7(a) and 7(b) should be arranged in an alternating column pattern so that pixels in even numbered columns have one dot polarity pattern and pixels in odd numbered columns have the other dot polarity pattern. FIG. 7(c) illustrates the alternating column pattern with pixels P(0, 0), P(1, 0), P(2, 0), P(0, 1), P(1, 1), and P(2, 1). For clarity the area of each pixel is shaded; this shading is only for illustrative purposes in FIG. 7(c) and has no functional significance. As illustrated in FIG. 7(c), pixels P(0, 0), P(0, 1), P(2,0) and P(2, 1) have the negative dot polarity pattern, and pixels P(1, 0) and P(1, 1) have the positive dot polarity pattern. Thus, in general a pixel P(x, y) has the first dot polarity pattern if x is an odd number. Conversely, pixel P(x, y) has the second dot polarity pattern if x an even number. The pixel pattern of FIG. 7(c) uses a switching element column inversion driving scheme. As described above, at the next frame the pixels will switch dot polarity patterns.

In some embodiments of the present invention, a switching element point inversion driving scheme, which has a checkerboard pattern of switching element polarity is used instead of the switching element column inversion driving scheme, which has an alternating column pattern of switching element polarity. Switching element point inversion driving scheme is used to provide a more uniform electrical distribution, which can improve the optical performance by reducing flicker and cross-talk. To achieve a checkerboard pattern of switching element polarity, a second pixel design is used with the pixel design of FIGS. 7(a) and 7(b). Specifically, FIGS. 7(d) and 7(e) illustrate the negative dot polarity pattern and positive dot polarity pattern, respectively, of a second pixel design 730 (labeled 730− and 730+, respectively) having twelve color dots. As shown in FIG. 7(d) each color component of a pixel 730 is divided into 4 color dots. Color dots CD_1_1 (i.e., the first color dot of color component 1), CD_2_1 (i.e., the first color dot of the second color component), and CD_3_1 (i.e., the first color dot of the third color component) form the first row of pixel 730. Color dots CD_1_2, CD_2_2, and CD_3_2 form a second row of pixel 730. However the second row is offset from the first row so that color dot CD_1_1 is adjacent to color dot CD_2_2 (i.e., color dot CD_2_2 is horizontally aligned with color dot CD_1_1 and vertically separated by the vertical dot spacing VDS). Color dots CD_1_3, CD_2_3, and CD_3_3 form the third row of pixel 730. However the third row is aligned with the first row so that color dot CD_1_3 is adjacent to color dot CD_2_2. Color dots CD_1_4, CD_2_4, and CD_3_4 form the fourth row of pixel 730. However, the fourth row is aligned with the second row so that color dot CD_2_4 is adjacent to color dot CD_1_3. Device component areas DCA_1, DCA_2, and DCA_3 form a fifth row of pixel 730. The row of device component areas is aligned with the first and third rows of pixel 730. Switching elements SE_1, SE_2, and SE_3 are located within device component areas DCA_1, DCA_2, and DCA_3, respectively. Switching elements SE_1, SE_2, and SE_3 are located within device component areas DCA_1, DCA_2, and DCA_3. Switching element SE_1 is coupled to the electrodes of color dots CD_1_4, CD_1_3, CD_1_2 and CD_1_1. As shown in FIG. 7(d), the connection to the electrode of color dot CD_1_1 is via the electrodes of color dots CD_1_2, CD_1_3 and CD_1_4; the connection to the electrode of color dot CD_1_2 is via the electrodes of color dots CD_1_3 and CD_1_4; and the connection to the electrode of color dot CD_1_3 is vial the electrode of color dot CD_1_4. Similarly, switching element SE_2 is coupled to the electrodes of color dots CD_2_4, CD_2_3, CD_2_2, and CD_2_1; and switching element SE_3 is coupled to color dots CD_3_4, CD_3_3, CD_3_2, and CD_3_1. Furthermore SE_1, SE_2, and SE_3 are coupled to color dots CD_1_4, CD_2_4, and CD_3_4, respectively.

FIG. 7(d) shows a negative dot polarity pattern for pixel 730−. The negative dot polarity pattern has positive polarity at the second color component, i.e., switching element SE_2 and color dots CD_2_1, CD_2_2, CD_2_3, and CD_2_4, and negative polarity at the first and third color components, i.e., switching elements SE_1 and SE_3 and color dots CD_1_1, CD_1_2, CD_1_3, CD_1_4, CD_3_1, CD_3_2, CD_3_3, CD_3_4. FIG. 7(e), shows the positive dot polarity pattern of pixel 730+, which has negative polarity at the second color component, i.e., switching element SE_2 and color dots CD_2_1, CD_2_2, CD_2_3, and CD_2_4, and positive polarity at the first and third color components, i.e., switching elements SE_1 and SE_3 and color dots CD_1_1, CD_1_2, CD_1_3, CD_1_4, CD_3_1, CD_3_2, CD_3_3, and CD_3_4.

Figure 7F:
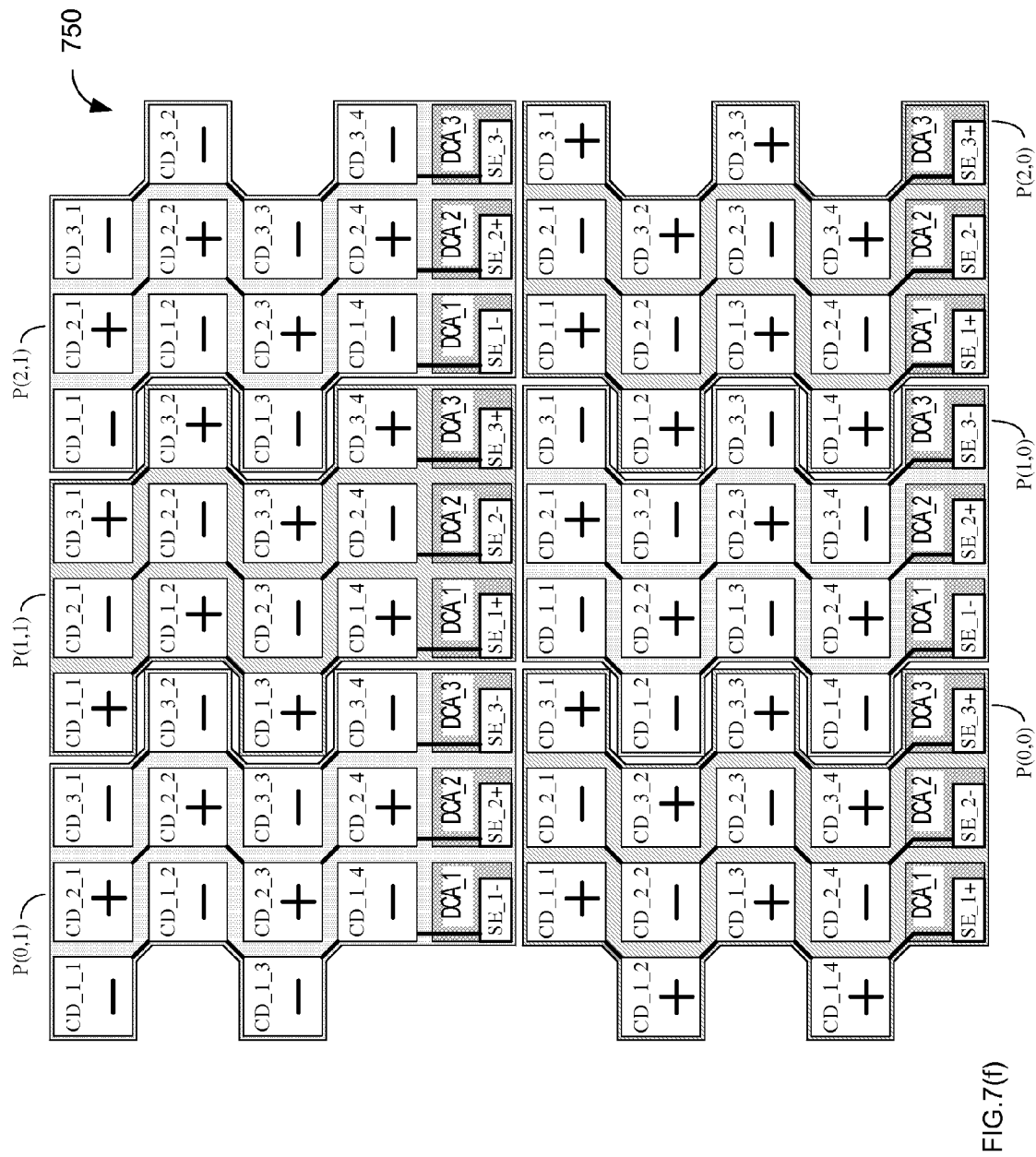

FIG. 7(f) illustrates a portion of a display 750 with a checkerboard pixel polarity pattern with pixels P(0, 0), P(1, 0), P(2, 0), P(0, 1), P(1, 1), and P(2, 1). Specifically, as illustrated in FIG. 7(f), pixels P(0, 0), P(1, 0), and P(2,0) use pixel design 730 of FIGS. 7(d) and 7(e). Pixels P(0, 1), P(1, 1), and P(2, 1) use pixel design 710 of FIGS. 7(a) and 7(b). Pixels P(0, 1), P(2, 1), and P(1, 0) have a negative dot polarity pattern and pixels P(0, 0), P(1, 1), and P(2, 0) have a positive dot polarity pattern. Thus, in general a pixel P(x, y) has a first dot polarity pattern (negative as shown in FIG. 7(f) if x plus y is an odd number. Conversely, pixel P(x, y) has the second dot polarity pattern (positive as shown in FIG. 7(f)) if x plus y is an even number. However, at the next frame the pixels will switch dot polarity patterns. Specifically, the MVA LCD of FIG. 7(f) has a first set of pixels having of a first pixel design and a first dot polarity pattern, a second set of pixels of the first pixel design and a second dot polarity pattern, a third set of pixels of a second pixel design with a first dot polarity pattern, and a fourth set of pixels having the second pixel design and a second dot polarity pattern. Furthermore, the MVA LCD of FIG. 7(f) has a first set of rows of pixels formed by alternating pixels from the first and second set of pixels and a second set of rows formed by alternating pixels from the third and fourth set of pixels. Finally, the rows are arranged by alternating rows from the first and second set of rows. Beneficially, the pixel pattern of FIG. 7(f) uses a switching element point inversion driving scheme.

Using the principles of the present invention, one skilled in the art should realize that other pixel designs are also possible. For example, a color component could be divided into 5 color dots or more dots in the same manner as the pixel designs described above. However, because pixels should be relatively compact and more color dots would reduce the aperture ratio, using more than 6 rows of color dots in a pixel is not recommended unless the number of columns is also expanded.

Figure 8A:
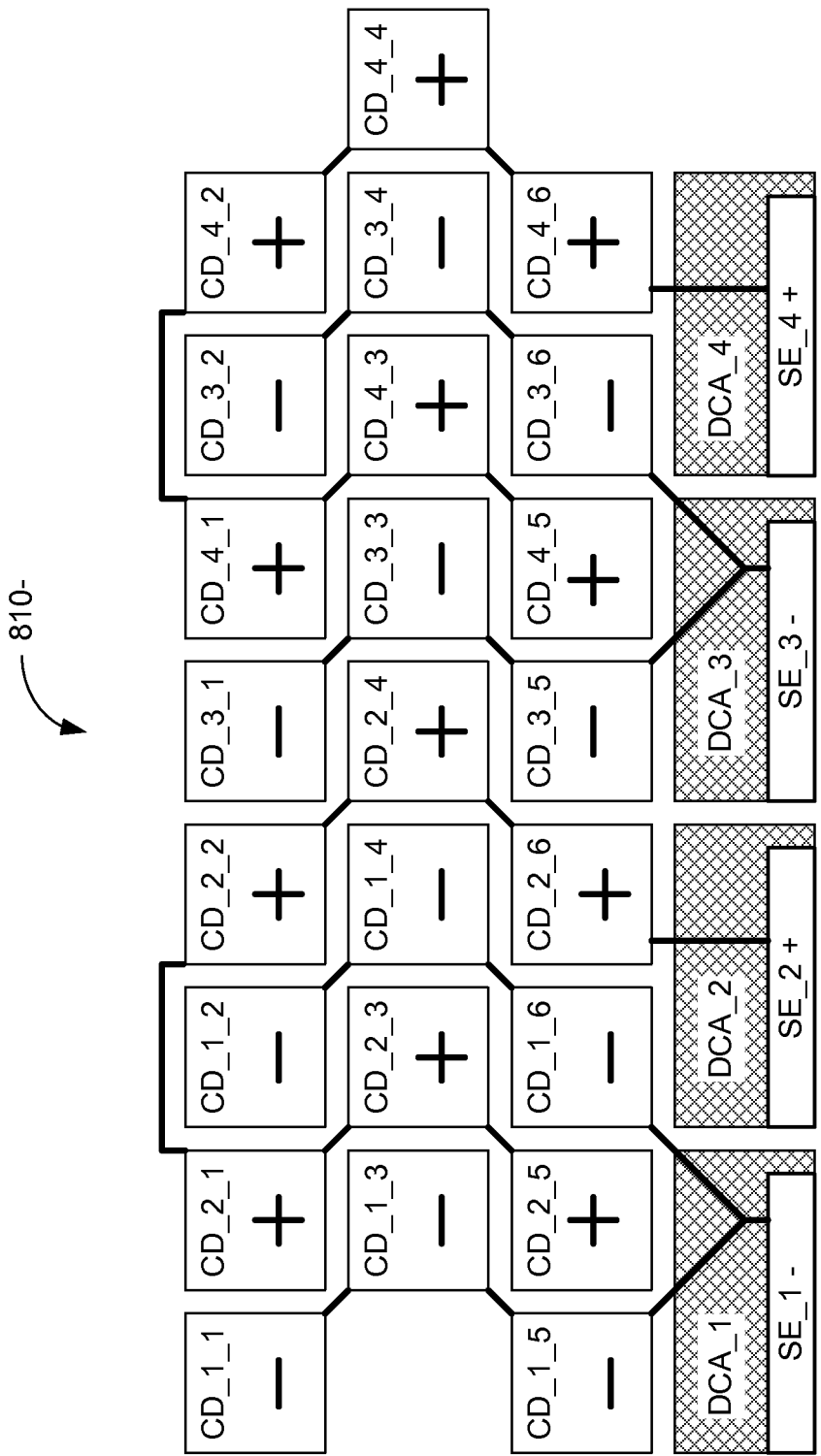
Figure 8B:
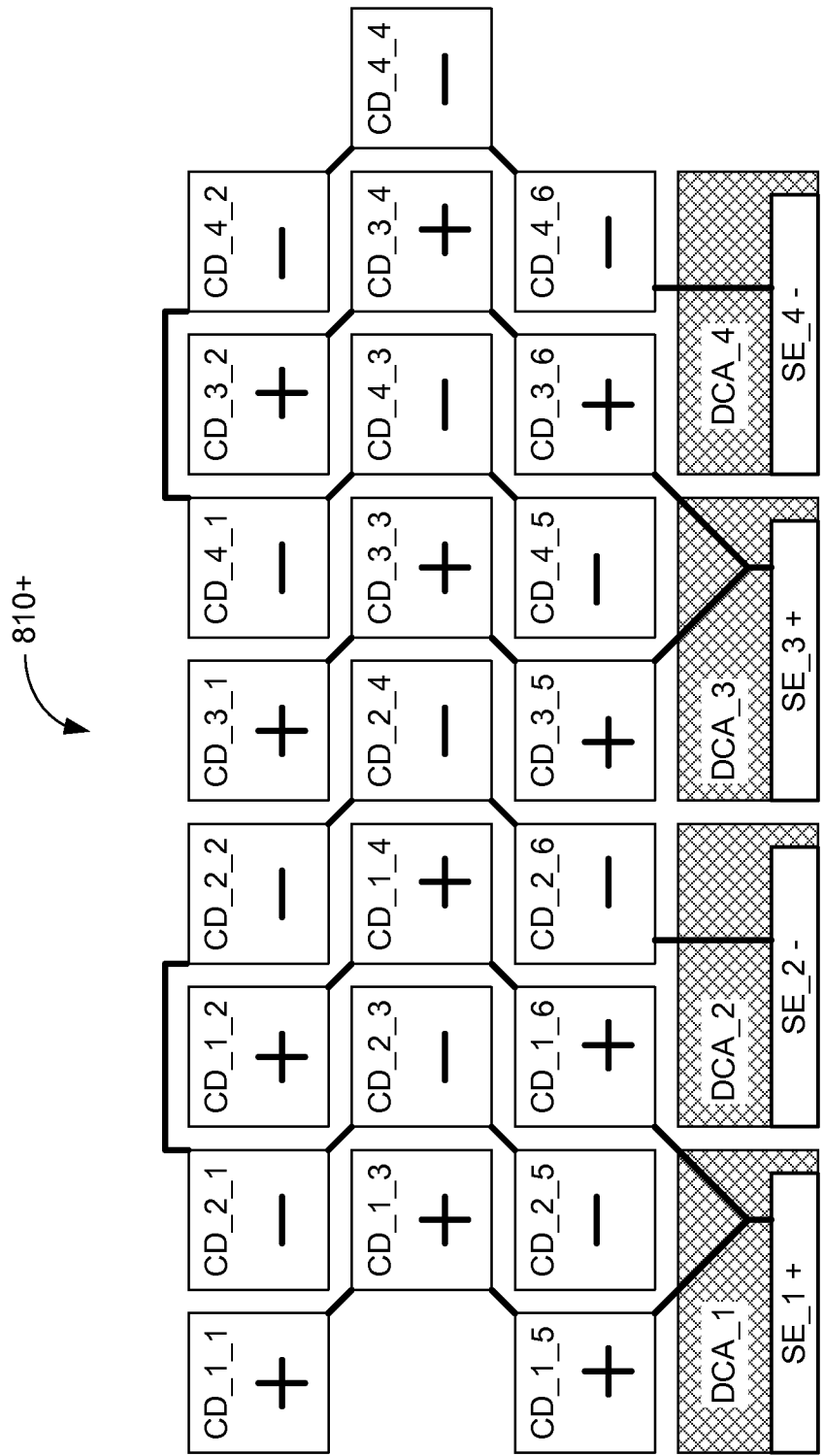

Some embodiments of the present invention, particularly those used for very large or high brightness screens, include four color components. For most application the four color components would be red, green, blue, and white to improve the brightness and contrast of the display unit. However, for some applications the fourth color component could be a repeat of one of the other three color components. For example, in many military applications, the four color components could be red, green one, blue and green two. FIGS. 8(a) and 8(b) show dot polarity patterns of a pixel design 810 (labeled 810– and 810+) in accordance with another embodiment of the present invention. Pixel design 810 includes 4 color components each of which is divided into six color dots in two zigzag columns. Color dots CD_1_1, CD_2_1, CD_1_2, CD_2_2, CD_3_1, CD_4_1, CD_3_2, and CD_4_2 form the first row of a pixel design 810. Color dots CD_1_3, CD_2_3, CD_1_4, CD_2_4, CD_3_3, CD_4_3, CD_3_4, and CD_4_4 form a second row of pixel design 810. However the second row is offset from the first row so that color dot CD_1_3 is adjacent to color dot CD_2_1. Color dots CD_1_5, CD_2_5, CD_1_6, CD_2_6, CD_3_5, CD_4_5, CD_3_6, and CD_4_6 form the third row of pixel 810. However the third row is aligned with the first row so that color dot CD_2_5 is adjacent to color dot CD_1_3. Pixel design 810 includes 4 device component areas DCA_1, DCA_2, DCA_3, and DCA_4. For better alignment, each device component area is the width of two color dots plus the horizontal dot spacing HDS. The device component areas form a fourth row of pixel 810 which is aligned with the first row and the third row. Switching elements SE_1, SE_2, SE_3, and SE_4 are located within device component areas DCA_1, DCA_2, DCA_3, and DCA_4, respectively. Switching element SE_1 is coupled to the electrodes of the six color dots of the first color component (i.e. color dots CD_1_1 to CD_1_6). Similarly, switching elements SE_2, SE_3, and SE_4 are coupled to the electrodes of the color dots of the second color component (color dots CD_2_1 to CD_2_6, the third color component (color dots CD_3_1 to CD_3_6) and the fourth color components (color dots CD_4_1 to CD_4_2), respectively.

FIG. 8(a) illustrates the negative dot polarity pattern for the pixel design 810–. Specifically, for the negative dot polarity pattern of pixel design 810–, the second color component and the fourth color component, i.e. switching elements SE_2 and SE_4 and color dots CD_2_1, CD_2_2, CD_2_3, CD_2_4, CD_2_5, CD_2_6, CD_4_1, CD_4_2, CD_4_3, CD_4_4, CD_4_5, and CD_4_6 have positive polarity and the first color component and the third color component, i.e. switching elements SE_1 and SE_3 and color dots CD_1_1, CD_1_2, CD_1_3, CD_1_4, CD_1_5, CD_1_6, CD_3_1, CD_3_2, CD_3_3, CD_3_4, CD_3_5, and CD_3_6, have negative polarity. FIG. 8(b) illustrates the positive polarity of pixel design 810+. Specifically, for the positive dot polarity pattern of pixel design 810+, the second color component and the fourth color component, i.e. switching elements SE_2 and SE_4 and color dots CD_2_1, CD_2_2, CD_2_3, CD_2_4, CD_2_5, CD_2_6, CD_4_1, CD_4_2, CD_4_3, CD_4_4, CD_4_5, and CD_4_6 have negative polarity and the first color component and the third color component, i.e. switching elements SE_1 and SE_3 and color dots CD_1_1, CD_1_2, CD_1_3, CD_1_4, CD_1_5, CD_1_6, CD_3_1, CD_3_2, CD_3_3, CD_3_4, CD_3_5, and CD_3_6, have positive polarity.

Pixels using the pixel design of FIGS. 8(a) and 8(b) should be arranged in an alternating row pattern so that pixels in even numbered rows have one dot polarity pattern and pixels in odd numbered rows have the other dot polarity pattern. In general a pixel P(x, y) has the first dot polarity pattern if y is an odd number. Conversely, pixel P(x, y) has the second dot polarity pattern if y an even number. FIG. 8(c) illustrates a portion of a display 800 having this pattern. Specifically, FIG. 8(c) shows a pixel P(0, 0) in a first row having the positive dot polarity and a pixel P(0, 1) in the next row having a negative dot polarity pattern. However, at the next frame the pixels will switch dot polarity patterns. The pixel pattern of FIG. 8(c) uses a switching element point inversion driving scheme.

As illustrated in FIG. 8(c), the alternating row pattern results in an asymmetric color distribution. For example, color dot CD_1_5 of pixel P(0, 1) is adjacent to color dot CD_1_1 of pixel P(0, 0). Thus, some embodiments of the present invention also use a second pixel design with the pixel design 810 to create displays with a more symmetric color distribution. Specifically, FIGS. 8(d) and 8(e) show dot polarity patterns of a pixel design 830 in accordance with another embodiment of the present invention.

Pixel design 830 includes 4 color components each of which is divided into six color dots in two zigzag columns. Color dots CD_1_1, CD_2_1, CD_1_2, CD_2_2, CD_3_1, CD_4_1, CD_3_2, and CD_4_2 form the first row of a pixel design 810. Color dots CD_1_3, CD_2_3, CD_1_4, CD_2_4, CD_3_3, CD_4_3, CD_3_4, and CD_4_4 form a second row of pixel design 830. However the second row is offset from the first row so that color dot CD_2_3 is adjacent to color dot CD_1_1. Color dots CD_1_5, CD_2_5, CD_1_6, CD_2_6, CD_3_5, CD_4_5, CD_3_6, and CD_4_6 form the third row of pixel 830. However the third row is aligned with the first row so that color dot CD_1_5 is adjacent to color dot CD_2_3. Pixel design 830 includes 4 device component areas DCA_1, DCA_2, DCA_3, and DCA_4. For better alignment, each device component area is the width of two color dots plus the horizontal dot spacing HDS. The device component areas form a fourth row of pixel 830 which is aligned with the second row. Switching elements SE_1, SE_2, SE_3, and SE_4 are located within device component areas DCA_1, DCA_2, DCA_3, and DCA_4, respectively. Switching element SE_1 is coupled to the electrodes of the six color dots of the first color component (i.e. color dots CD_1_1 to CD_1_6). Similarly, switching elements SE_2, SE_3, and SE_4 are coupled to the electrodes of the color dots of the second color component (color dots CD_2_1 to CD_2_6, the third color component (color dots CD_3_1 to CD_3_6) and the fourth color components (color dots CD_4_1 to CD_4_2), respectively.

Figure 8D:
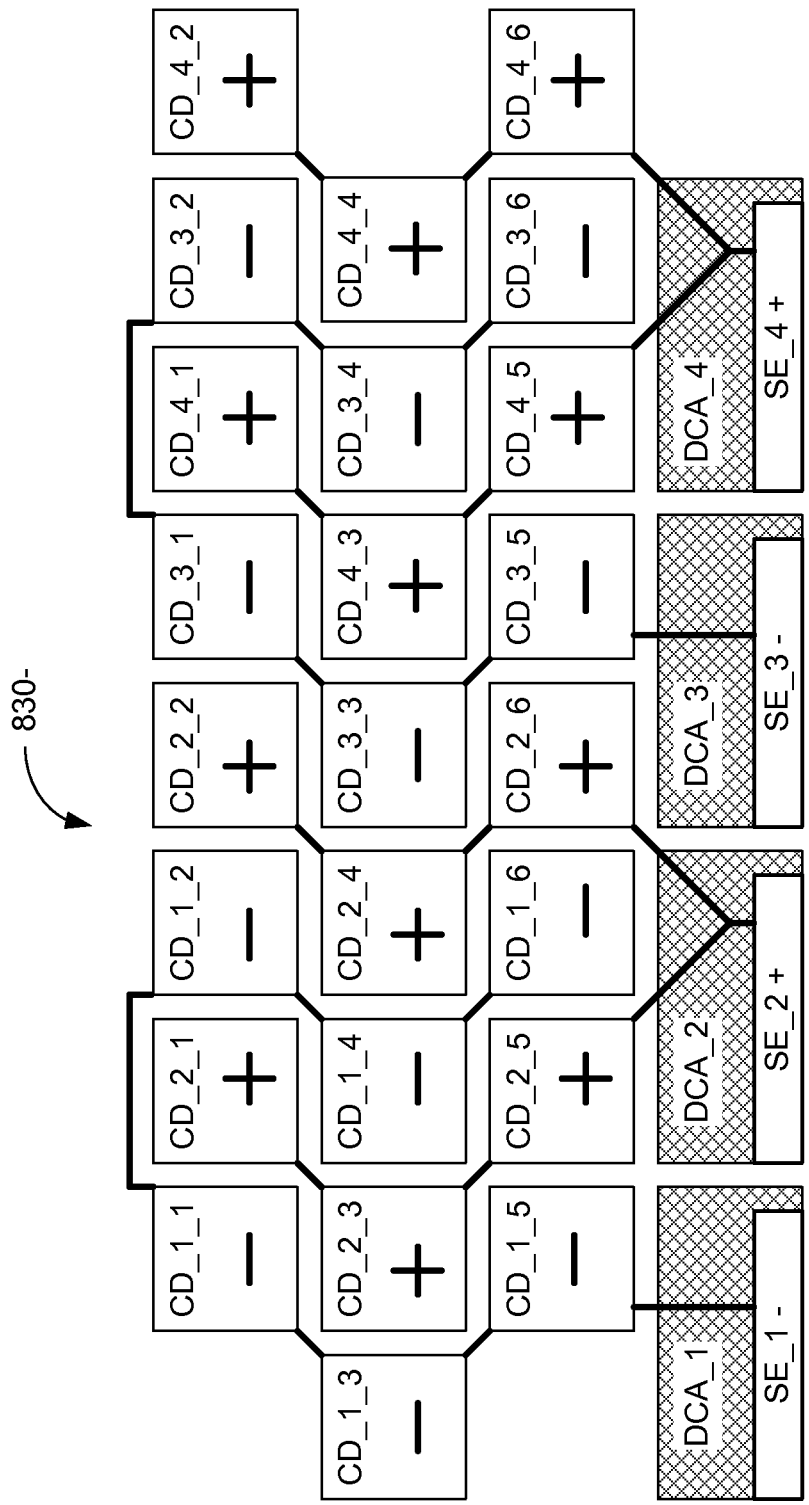
FIGS. 8(d)-8(f) illustrate pixel designs, dot polarity patterns and liquid crystal displays in accordance with one embodiment of the present invention.

FIG. 8(d) illustrates the negative dot polarity pattern for pixel design 830–. Specifically, for the negative dot polarity pattern of pixel design 830–, the second color component and the fourth color component, i.e. switching elements SE_2 and SE_4 and color dots CD_2_1, CD_2_2, CD_2_3, CD_2_4, CD_2_5, CD_2_6, CD_4_1, CD_4_2, CD_4_3, CD_4_4, CD_4_5, and CD_4_6 have positive polarity and the first color component and the third color component, i.e. switching elements SE_1 and SE_3 and color dots CD_1_1, CD_1_2, CD_1_3, CD_1_4, CD_1_5, CD_1_6, CD_3_1, CD_3_2, CD_3_3, CD_3_4, CD_3_5, and CD_3_6, have negative polarity. FIG. 8(e) illustrates the positive polarity of pixel design 830+. Specifically, for the positive dot polarity pattern of pixel design 830+, the second color component and the fourth color component, i.e. switching elements SE_2 and SE_4 and color dots CD_2_1, CD_2_2, CD_2_3, CD_2_4, CD_2_5, CD_2_6, CD_4_1, CD_4_2, CD_4_3, CD_4_4, CD_4_5, and CD_4_6 have negative polarity and the first color component and the third color component, i.e. switching elements SE_1 and SE_3 and color dots CD_1_1, CD_1_2, CD_1_3, CD_1_4, CD_1_5, CD_1_6, CD_3_1, CD_3_2, CD_3_3, CD_3_4, CD_3_5, and CD_3_6, have positive polarity.

Figure 8E:
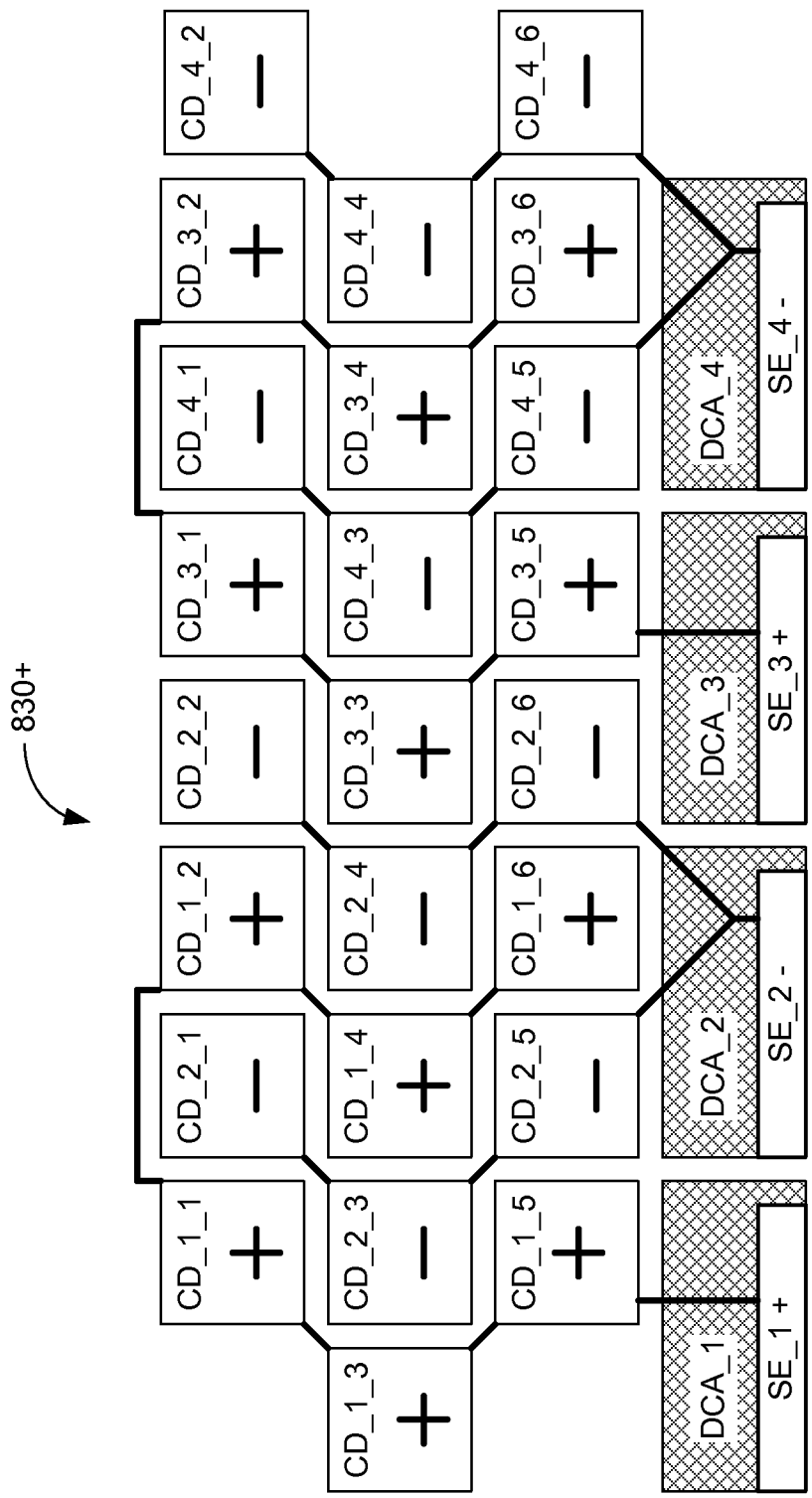
Figure 8F:
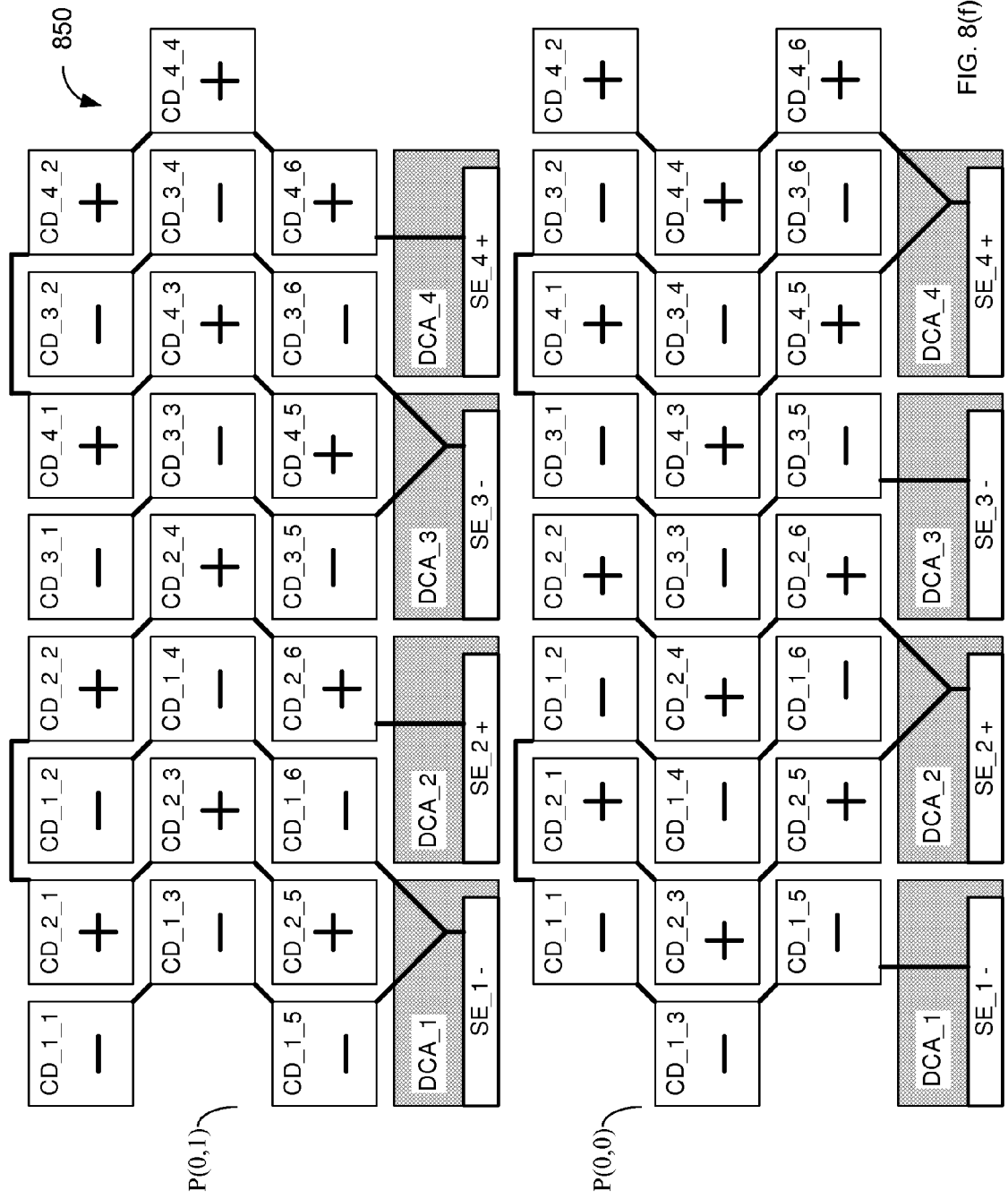

Pixels using pixel design 810 of FIGS. 8(a) and 8(b) with pixel design 830 of FIGS. 8(d) and 8(e) should be arranged in an alternating row pattern so that pixels in even numbered rows are of one pixel design and odd numbered rows are of the second pixel design. FIG. 8(f) illustrates a portion of a display 850 having this pattern. Specifically, FIG. 8(f) shows a pixel P(0, 0) of pixel design 830 of FIGS. 8(d) and 8(e) in a first row and a pixel P(0, 1) of pixel design 810 of FIGS. 8(a) and 8(b) in the next row. All pixels would have the same dot polarity patterns in a given frame. For example, in FIG. 8(f) both pixels have negative dot polarity patterns. However, at the next frame the pixels will switch to positive dot polarity patterns. Thus for FIG. 8(f) a pixel P(x, y) is of a first pixel design y is an odd number. Conversely, pixel P(x, y) has a second pixel design if y an even number. The pixel pattern of FIG. 8(f) uses a switching element column inversion driving scheme.

While the pixel pattern of FIG. 8(f) has better color distribution than the pixel pattern of FIG. 8(c). Some embodiments of the present invention may still use the pixel pattern of FIG. 8(c), which uses a switching element point inversion driving scheme, rather than the pixel pattern of FIG. 8(f), which uses a switching element column inversion driving scheme, because the switching element point inversion driving schemes typically produces less flicker and cross talk than a switching element column inversion driving scheme.

Figure 9B:
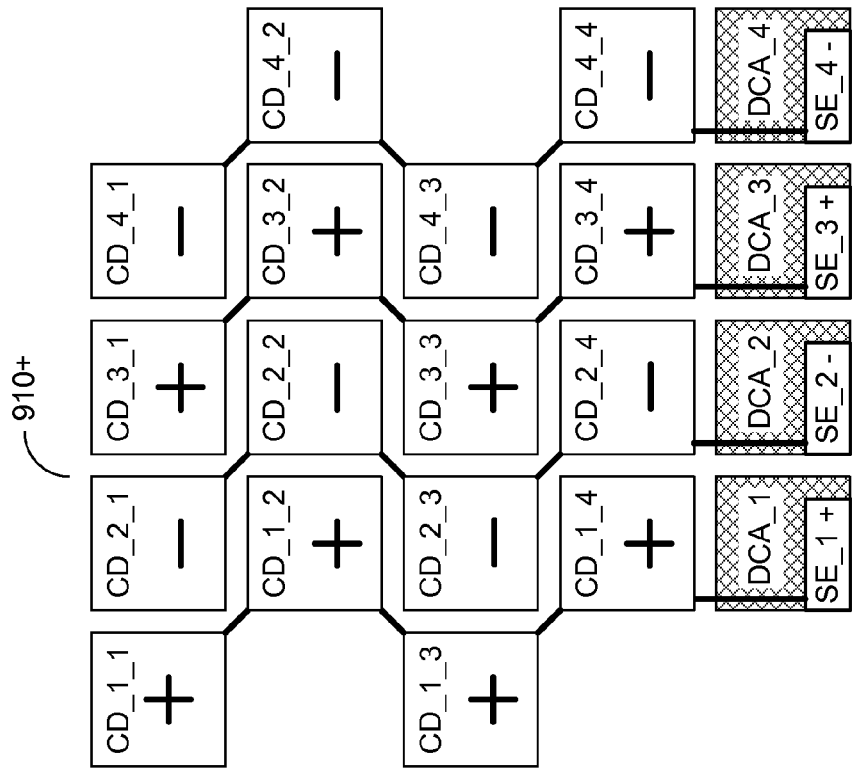
FIGS. 9(a)-9(c) illustrate pixel designs, dot polarity patterns and liquid crystal displays in accordance with one embodiment of the present invention.
Figure 9A:
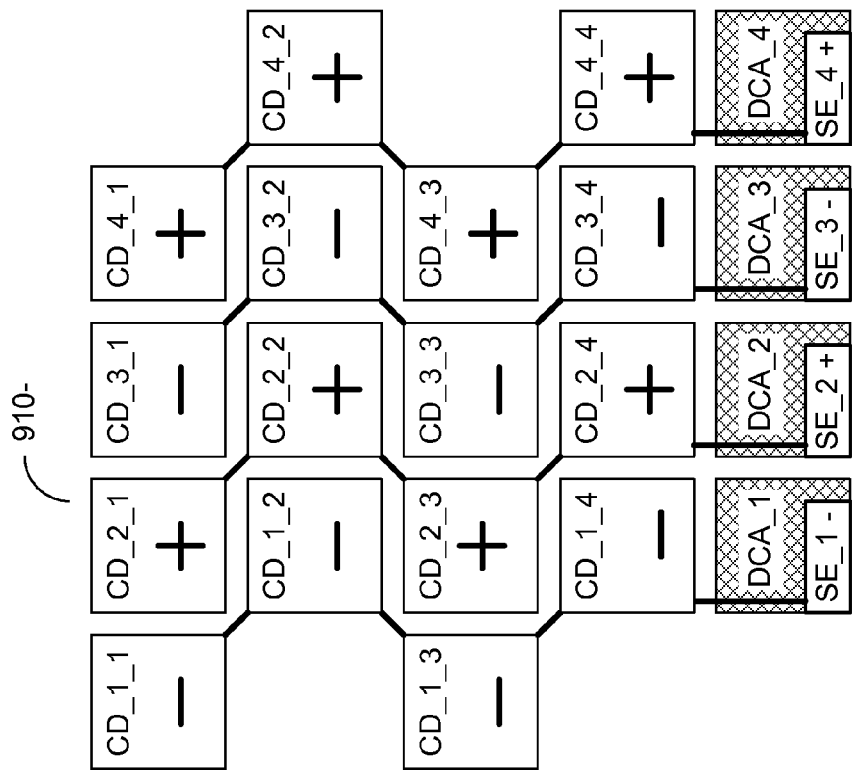

FIGS. 9(a)-9(b) show dot polarity patterns of a pixel design 910 in accordance with another embodiment of the present invention. Specifically, in FIG. 9(a) each of the four color components of pixel design 910 is divided into 4 color dots. Color dots CD_1_1 (i.e., the first color dot of color component 1), CD_2_1 (i.e., the first color dot of the second color component), CD_3_1 (i.e., the first color dot of the third color component) and CD_4_1 (i.e., the first color dot of the fourth color component) form the first row of pixel design 910. Color dots CD_1_2, CD_2_2, CD_3_2 and CD_4_2 form a second row of pixel 910. However the second row is offset from the first row so that color dot CD_1_2 is adjacent to color dot CD_2_1. Color dots CD_1_3, CD_2_3, CD_3_3, and CD_4_3 form the third row of pixel design 910. However the third row is aligned with the first row so that color dot CD_2_3 is adjacent to color dot CD_1_2. Color dots CD_1_4, CD_2_4, CD_3_4, and CD_4_4 form the fourth row of pixel 910. However, the fourth row is aligned with the second row so that color dot CD_1_4 is adjacent to color dot CD_2_3. Pixel design 910 also includes device component areas DCA_1, DCA_2, DCA_3, and DCA_4. The device component areas form a fifth row of pixel design 910. The fifth row is horizontally aligned with the fourth row. Switching elements SE_1, SE_2, SE_3, and SE_4 are located within device component areas DCA_1, DCA_2, DCA_3, and DCA_4, respectively. Switching element SE_1 is coupled to the electrodes of color dots CD_1_1, CD_1_2, CD_1_3, and CD_1_4. Switching element SE_2 is coupled to the electrodes of color dots CD_2_1, CD_2_2, CD_2_3, and CD_2_4. Switching element SE_3 is coupled to the electrodes of color dots CD_3_1, CD_3_2, CD_3_3, and CD_3_4. Switching element SE_4 is coupled to the electrodes of color dots CD_4_1, CD_4_2, CD_4_3, and CD_4_4.

FIG. 9(a) illustrates a negative dot polarity pattern for pixel design 910−. The negative dot polarity pattern has positive polarity at the second color component and fourth color component, i.e., switching elements SE_2 and SE_4 and color dots CD_2_1, CD_2_2, CD_2_3, CD_2_4, CD_4_1, CD_4_2, CD_4_3, and CD_4_4, and negative polarity at the first and third color components, i.e., switching elements SE_1 and SE_3 and color dots CD_1_1, CD_1_2, CD_1_3, CD_1_4, CD_3_1, CD_3_2, CD_3_3, CD_3_4. FIG. 9(b) illustrates the positive dot polarity pattern of pixel design 910−, which has negative polarity at the second color component and fourth color component, i.e., switching elements SE_2 and SE_4 and color dots CD_2_1, CD_2_2, CD_2_3, CD_2_4, CD_4_1, CD_4_2, CD_4_3, and CD_4_4, and positive polarity at the first and third color components, i.e., switching elements SE_1 and SE_3 and color dots CD_1_1, CD_1_2, CD_1_3, CD_1_4, CD_3_1, CD_3_2, CD_3_3, and CD_3_4.

Figure 9C:
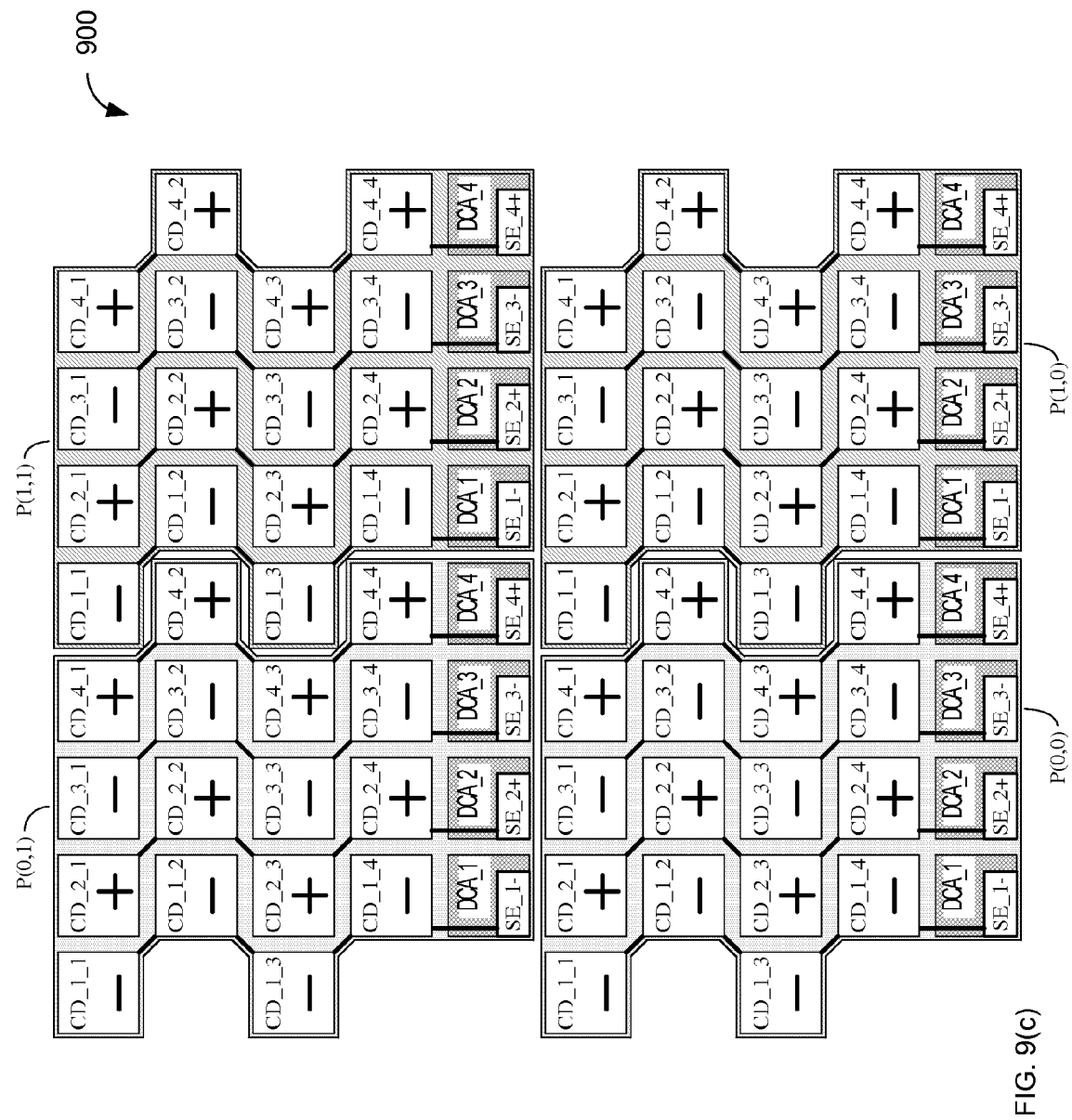

Displays using the pixel design of FIGS. 9(a) and 9(b) should use the same dot polarity pattern for all pixels in a display frame to create a checkerboard pattern for all the color dots of the display. However, as explained above, successive display frames should switch between the two dot polarity patterns. For example, FIG. 9(c) illustrates a portion of a display 900 having Pixels P(0, 0), P(0, 1), P(1, 0), and P(1, 1), which all have the negative dot polarity pattern. However in the next frame the pixels would switch to the positive dot polarity pattern. The pixel pattern of FIG. 9(c) uses a switching element column inversion driving scheme.

Figure 9E:
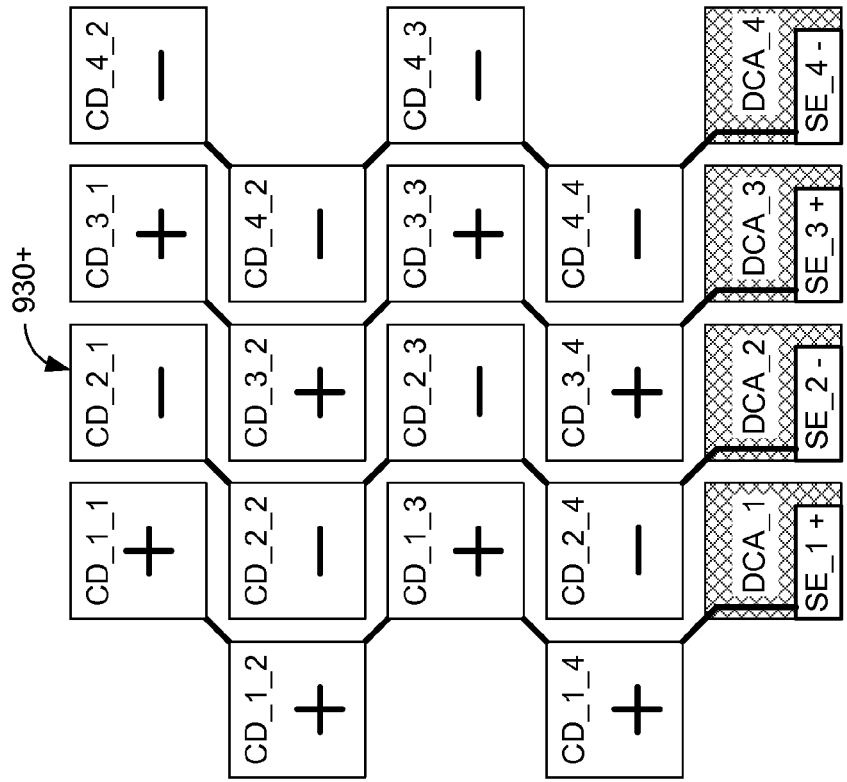
FIGS. 9(d)-9(f) illustrate pixel designs, dot polarity patterns and liquid crystal displays in accordance with one embodiment of the present invention.
Figure 9D:
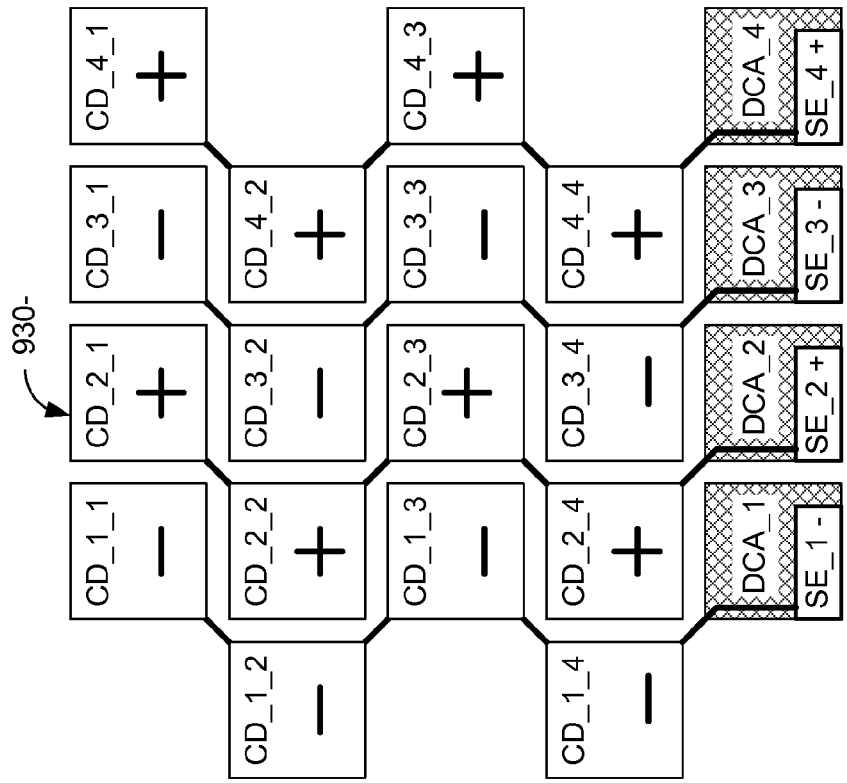

In some embodiments of the present invention, using pixels of different dot polarity patterns may provide a more uniform electrical distribution. Therefore, some embodiments of the present invention use a second pixel design with pixel design 910 of FIGS. 9(a) and 9(b). FIGS. 9(d)-9(e) show dot polarity patterns of a pixel design 930 in accordance with another embodiment of the present invention. Specifically, in FIG. 9(d) each of the four color components of pixel 930 is divided into 4 color dots. Color dots CD_1_1 (i.e., the first color dot of color component 1), CD_2_1 (i.e., the first color dot of the second color component), CD_3_1 (i.e., the first color dot of the third color component) and CD_4_1 (i.e., the first color dot of the fourth color component) form the first row of pixel 910. Color dots CD_1_2, CD_2_2, CD_3_2 and CD_4_2 form a second row of pixel 930. However the second row is offset from the first row so that color dot CD_2_2 is adjacent to color dot CD_1_1. Color dots CD_1_3, CD_2_3, CD_3_3, and CD_4_3 form the third row of pixel 930. However the third row is aligned with the first row so that color dot CD_1_3 is adjacent to color dot CD_2_2. Color dots CD_1_4, CD_2_4, CD_3_4, and CD_4_4 form the fourth row of pixel 930. However, the fourth row is aligned with the second row so that color dot CD_2_4 is adjacent to color dot CD_1_3. Pixel design 930 also includes device component areas DCA_1, DCA_2, DCA_3, and DCA_4. The device component areas form a fifth row of pixel design 930. The fifth row is horizontally aligned with the first and third row.

Switching elements SE_1, SE_2, SE_3, and SE_4 are located within device component areas DCA_1, DCA_2, DCA_3, and DCA_4, respectively. Switching element SE_1 is coupled to the electrodes of color dots CD_1_1, CD_1_2, CD_1_3, and CD_1_4. Switching element SE_2 is coupled to the electrodes of color dots CD_2_1, CD_2_2, CD_2_3, and CD_2_4. Switching element SE_3 is coupled to the electrodes of color dots CD_3_1, CD_3_2, CD_3_3, and CD_3_4. Switching element SE_4 is coupled to the electrodes of color dots CD_4_1, CD_4_2, CD_4_3, and CD_4_4.

FIG. 9(d) illustrates the negative dot polarity pattern for pixel 930. The negative dot polarity pattern has positive polarity at the second color component and fourth color component, i.e., switching elements SE_2 and SE_4 and color dots CD_2_1, CD_2_2, CD_2_3, CD_2_4, CD_4_1, CD_4_2, CD_4_3, and CD_4_4, and negative polarity at the first and third color components, i.e., switching element SE_1 and SE_3 and color dots CD_1_1, CD_1_2, CD_1_3, CD_1_4, CD_3_1, CD_3_2, CD_3_3, CD_3_4. FIG. 9(e) illustrates the positive dot polarity pattern of pixel design 930+, which has negative polarity at the second color component and fourth color component, i.e., switching elements SE_2 and SE_4 and color dots CD_2_1, CD_2_2, CD_2_3, CD_2_4, CD_4_1, CD_4_2, CD_4_3, and CD_4_4, and positive polarity at the first and third color components, i.e., switching elements SE_1 and SE_3 and color dots CD_1_1, CD_1_2, CD_1_3, CD_1_4, CD_3_1, CD_3_2, CD_3_3, and CD_3_4.

Figure 9F:
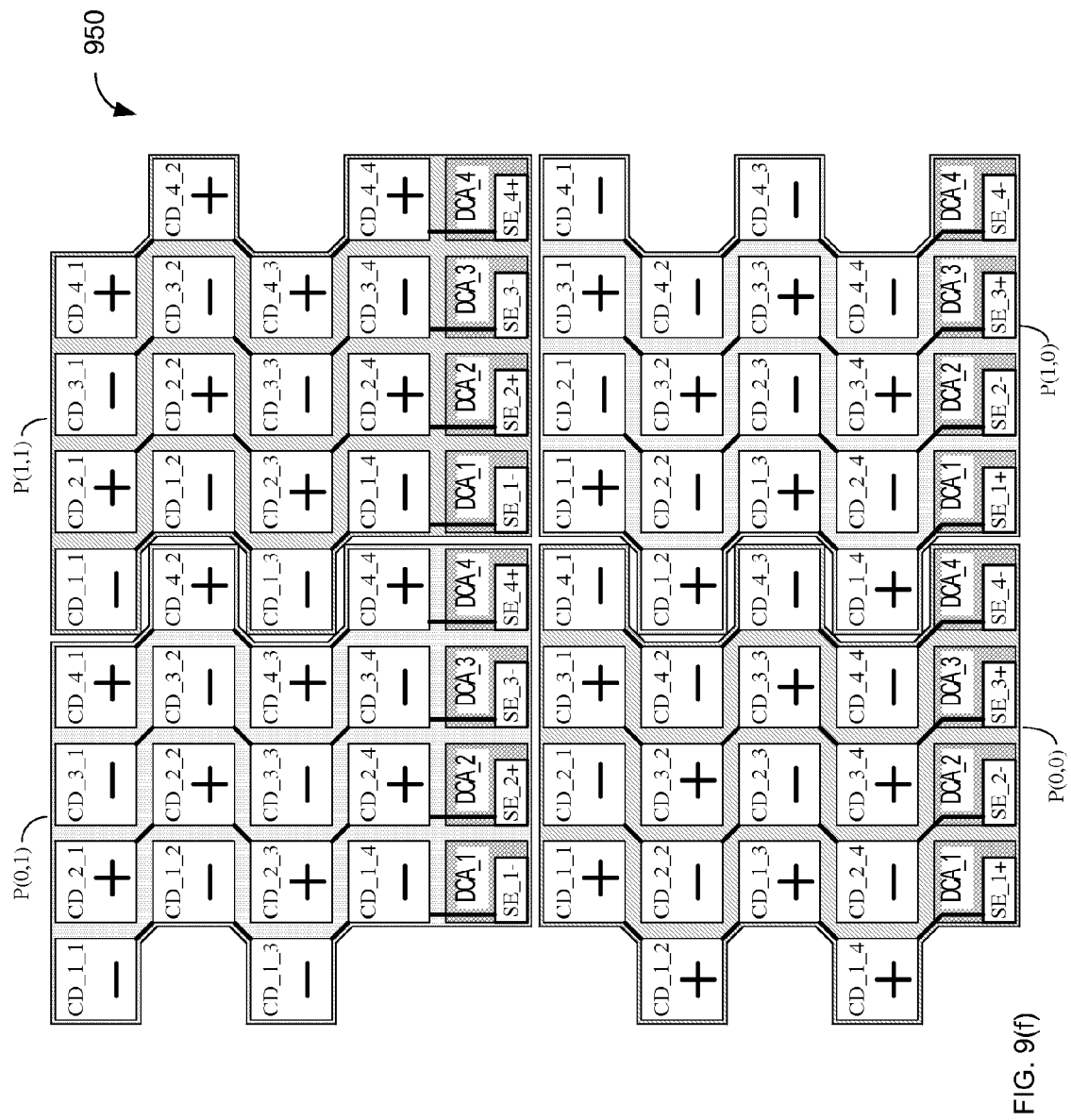

Displays using pixel design 910 of FIGS. 9(a) and 9(b) (i.e., the first pixel design) with pixel design 930 of FIGS. 9(d) and 9(e) (i.e. the second pixel design) are arranged in alternating rows of different pixel designs. Within each row the pixels are all of the same dot polarity patterns. However each alternating row should have different dot polarity patterns. FIG. 9(f) illustrates a portion of a display 950 using this pattern. Specifically, in FIG. 9(f), a first row of pixels, which is represented by pixels P(0, 1) and P(1, 1), use pixel design 910 of FIGS. 9(a) and 9(b). Both pixels P(0, 1) and P(1, 1) are illustrated using a negative dot polarity pattern. However, as explained above, successive display frames should switch between the positive and negative dot polarity patterns. A second row of pixels, which is represented by pixels P(0, 0) and P(1, 0) use pixel design 930 from FIGS. 9(d) and 9(e) and are of opposite dot polarity from pixels P(0, 1) and P(1, 1). As compared to the pixel pattern of FIG. 9(c), which uses a switching element column inversion driving scheme, the pixel pattern of FIG. 9(f) uses a switching element point inversion driving scheme, which can have a more uniform electrical distribution, which may improve optical performance by reducing flicker and cross-talk.

Figure 10B:
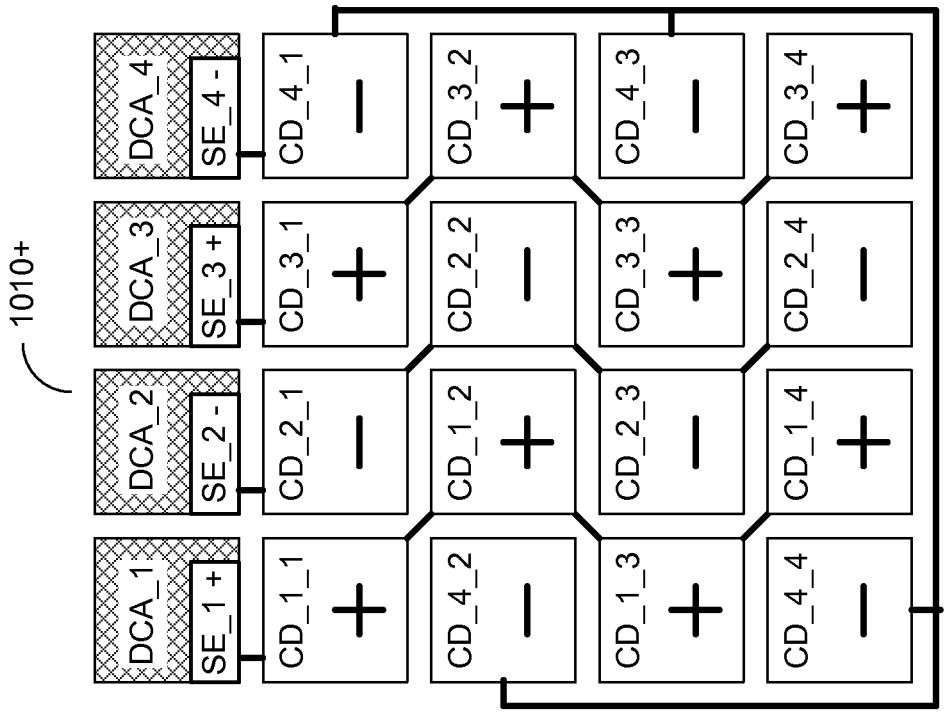
FIGS. 10(a)-10(d) illustrate pixel designs and dot polarity patterns in accordance with one embodiment of the present invention.
Figure 10A:
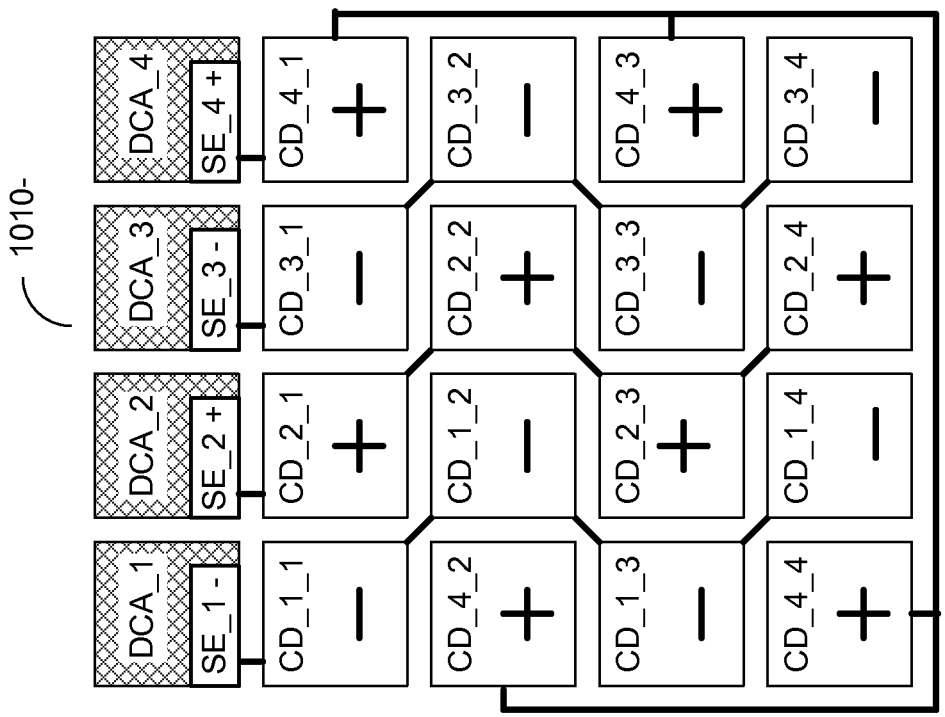

FIGS. 10(a)-10(b) show dot polarity patterns of a pixel design 1010 with four color components in accordance with another embodiment of the present invention. Specifically, each of the four color components of pixel design 1010 is divided into 4 color dots. In addition, all rows of color dots and device component areas are horizontally aligned so that pixel design 1010 has a rectangular shape. Device component areas DCA_1, DCA_2, DCA_3, and DCA_4 form the first row of pixel design 1010. Switching elements SE_1, SE_2, SE_3, and SE_4, are located within device component area DCA_1, DCA_2, DCA_3, and DCA_4, respectively. Color dots CD_1_1 (i.e., the first color dot of color component 1), CD_2_1 (i.e., the first color dot of the second color component), CD_3_1 (i.e., the first color dot of the third color component) and CD_4_1 (i.e., the first color dot of the fourth color component) form the second row of pixel 1010. Color dots CD_4_2, CD_1_2, CD_2_2, and CD_3_2 form a third row of pixel 1010, with color dot CD_4_2 being adjacent to color dot CD_1_1. Color dots CD_1_3, CD_2_3, CD_3_3, and CD_4_3 form the fourth row of pixel 1010, with color dot CD_1_3 being adjacent to color dot CD_4_2. Finally, color dots CD_4_4, CD_1_4, CD_2_4, and CD_3_4, form the fourth row of pixel 1010, with color dot CD_4_4 being adjacent to color dot CD_1_3. Switching element SE_1 is coupled to the electrodes of color dots CD_1_1, CD_1_2, CD_1_3, and CD_1_4. Switching element SE_2 is coupled to the electrodes of color dots CD_2_1, CD_2_2, CD_2_3, and CD_2_4. Switching element SE_3 is coupled to the electrodes of color dots CD_3_1, CD_3_2, CD_3_3, and CD_3_4. Switching element SE_4 is coupled to the electrodes of color dots CD_4_1, CD_4_2, CD_4_3, and CD_4_4.

FIG. 10(a) illustrates the negative dot polarity pattern for pixel 1010. The negative dot polarity pattern has positive polarity at the second color component and fourth color component, i.e., switching elements SE_2 and SE_4 and color dots CD_2_1, CD_2_2, CD_2_3, CD_2_4, CD_4_1, CD_4_2, CD_4_3, and CD_4_4, and negative polarity at the first and third color components, i.e., switching elements SE_1 and SE_3 and color dots CD_1_1, CD_1_2, CD_1_3, CD_1_4, CD_3_1, CD_3_2, CD_3_3, CD_3_4. FIG. 10(b) shows the positive dot polarity pattern for pixel design 1010+, which has negative polarity at the second color component and fourth color component, i.e., switching elements SE_2 and SE_4 and color dots CD_2_1, CD_2_2, CD_2_3, CD_2_4, CD_4_1, CD_4_2, CD_4_3, and CD_4_4, and positive polarity at the first and third color components, i.e., switching elements SE_1 and SE_3 color dots CD_1_1, CD_1_2, CD_1_3, CD_1_4, CD_3_1, CD_3_2, CD_3_3, and CD_3_4.

Displays using pixel design 1010 of FIGS. 10(a) and 10(b) should use the same dot polarity pattern for all pixels in a display frame to create a checkerboard pattern for all the color dots of the display. However, as explained above, successive display frames should switch between the two dot polarity patterns.

Figure 10D:
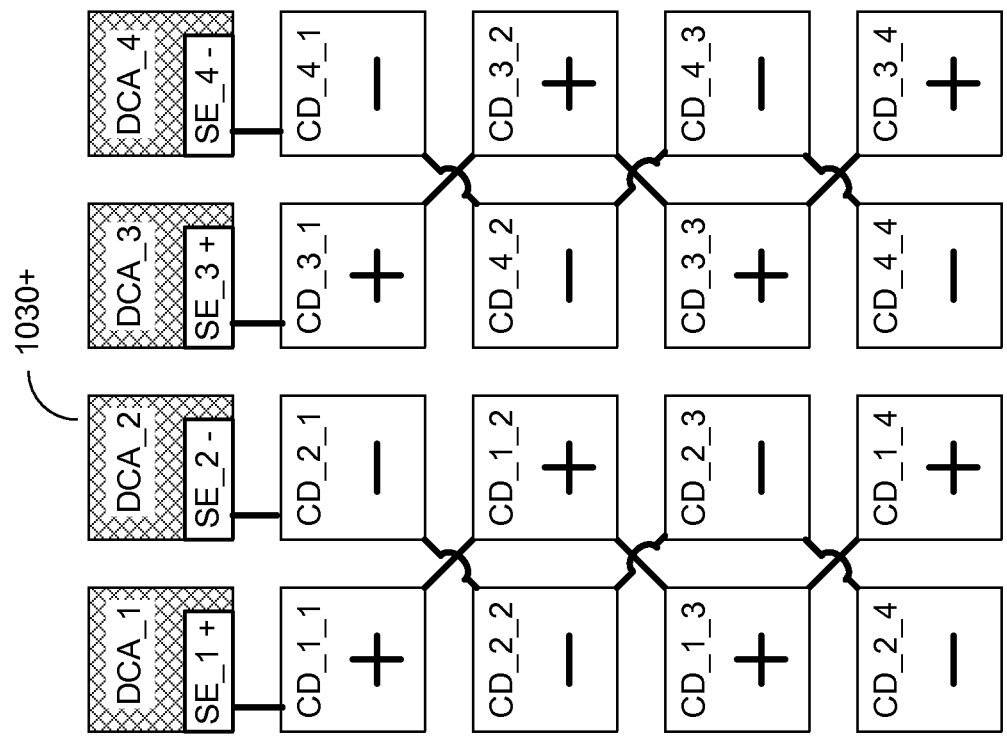
Figure 10C:
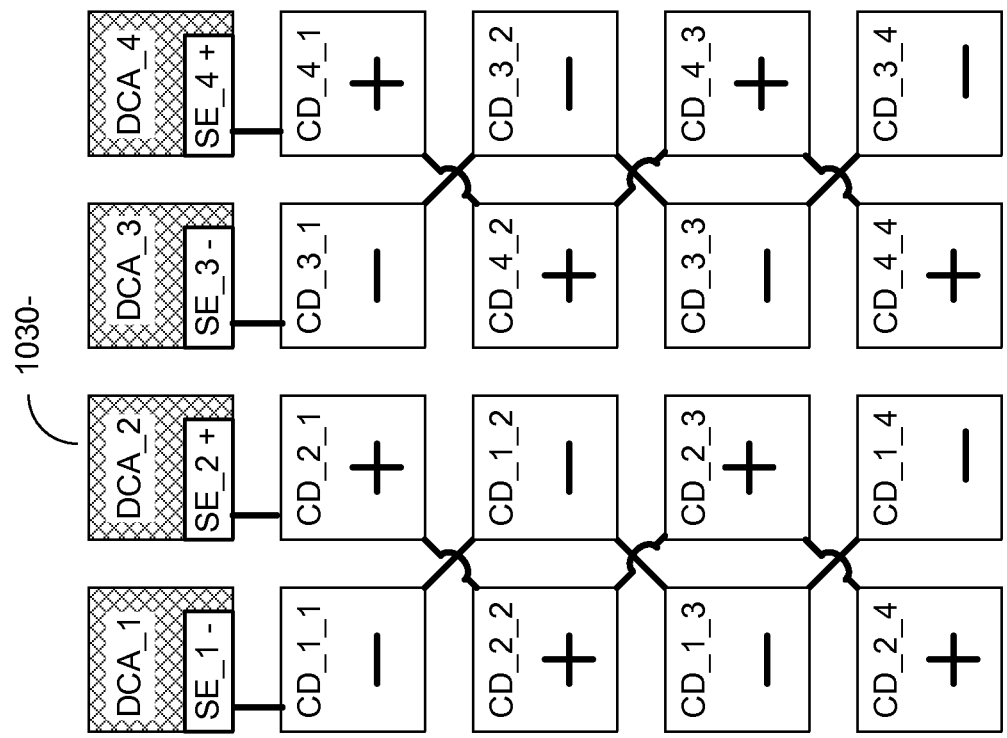

FIGS. 10(c)-10(b) show dot polarity patterns of a pixel design 1030 with four color components in accordance with another embodiment of the present invention. Like pixel design 1010, pixel design 1030 also has horizontally aligned rows and a rectangular shape. Device component areas DCA_1, DCA_2, DCA_3, and DCA_4 form the first row of pixel design 1030. Switching elements SE_1, SE_2, SE_3, and SE_4, are located within device component areas DCA_1, DCA_2, DCA_3, and DCA_4, respectively. Color dots CD_1_1 (i.e., the first color dot of color component 1), CD_2_1 (i.e., the first color dot of the second color component), CD_3_1 (i.e., the first color dot of the third color component) and CD_4_1 (i.e., the first color dot of the fourth color component) form the first row of pixel 1030. Color dots CD_2_2, CD_1_2, CD_3_2, and CD_3_2 form a second row of pixel 1030, with color dot CD_2_2 being adjacent to color dot CD_1_1. Color dots CD_1_3, CD_2_3, CD_3_3, and CD_4_3 form the third row of pixel 1030, with color dot CD_1_3 being adjacent to color dot CD_2_2. Finally, color dots CD_2_4, CD_1_4, CD_4_4, and CD_3_4, form the fourth row of pixel 1030, with color dot CD_2_4 being adjacent to color dot CD_1_3. Switching element SE_1 is coupled to the electrodes of color dots CD_1_1, CD_1_2, CD_1_3, and CD_1_4. Switching element SE_2 is coupled to the electrodes of color dots CD_2_1, CD_2_2, CD_2_3, and CD_2_4. Switching element SE_3 is coupled to the electrodes of color dots CD_3_1, CD_3_2, CD_3_3, and CD_3_4. Switching element SE_4 is coupled to the electrodes of color dots CD_4_1, CD_4_2, CD_4_3, and CD_4_4.

FIG. 10(c) illustrates the negative dot polarity pattern for pixel 1030−. The negative dot polarity pattern has positive polarity at the second color component and fourth color component, i.e., switching elements SE_2 and SE_4 and color dots CD_2_1, CD_2_2, CD_2_3, CD_2_4, CD_4_1, CD_4_2, CD_4_3, and CD_4_4, and negative polarity at the first and third color components, i.e., switching elements SE_1 and SE_3 and color dots CD_1_1, CD_1_2, CD_1_3, CD_1_4, CD_3_1, CD_3_2, CD_3_3, CD_3_4. FIG. 10(d) illustrates the positive dot polarity pattern of pixel 1030+, which has negative polarity at the second color component and fourth color component, i.e., switching elements SE_2 and SE_4 and color dots CD_2_1, CD_2_2, CD_2_3, CD_2_4, CD_4_1, CD_4_2, CD_4_3, and CD_4_4, and positive polarity at the first and third color components, i.e., switching elements SE_1 and SE_3 and color dots CD_1_1, CD_1_2, CD_1_3, CD_1_4, CD_3_1, CD_3_2, CD_3_3, and CD_3_4.

Displays using pixel design 1030 of FIGS. 10(c) and 10(d) should use the same dot polarity pattern for all pixels in a display frame to create a checkerboard pattern for all the color dots of the display. However, as explained above, successive display frames should switch between the two dot polarity patterns.

Figure 11B:
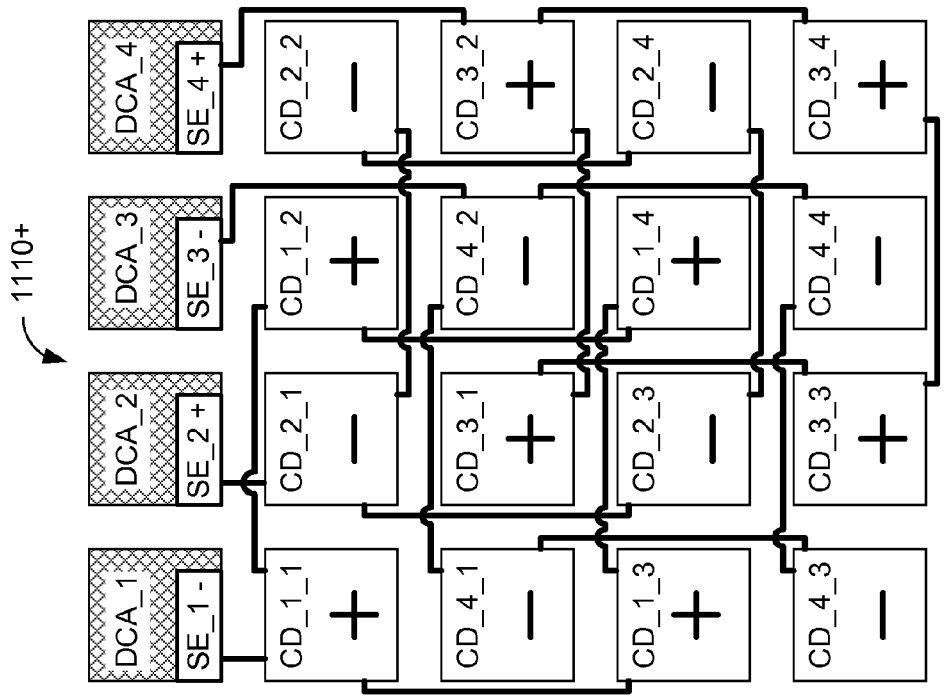
FIGS. 11(a)-11(b) illustrate pixel designs and dot polarity patterns in accordance with one embodiment of the present invention.
Figure 11A:
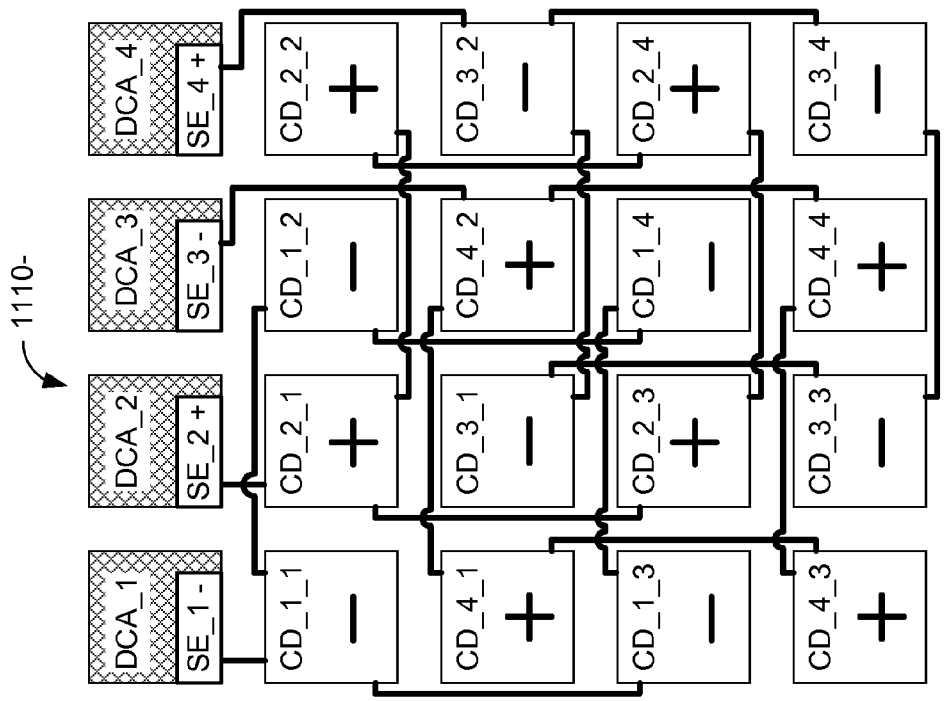

FIGS. 11(a)-11(b) show dot polarity patterns of a pixel design with four color components in accordance with another embodiment of the present invention. Specifically, in FIG. 11(a) each of the four color components of pixel design 1110 is divided into 4 color dots. A device component area is present for each color component. Specifically, device component areas DCA_1, DCA_2, DCA_3, and DCA_4 form the first row of pixel design 1110. Switching element SE_1, SE_2, SE_3, and SE_4 are located within device component areas DCA_1, DCA_2, DCA_3, and DCA_4, respectively. Color dots CD_1_1 (i.e., the first color dot of color component 1), CD_2_1 (i.e., the first color dot of the second color component), CD_1_2 (i.e., the second color dot of the first color component) and CD_2_2 (i.e., the second color dot of the second color component) form the second row of pixel design 1110. The second row is horizontally aligned with the first row. Color dots CD_4_1, CD_3_1, CD_4_2, and CD_3_2 form a third row of pixel design 1110, with color dot CD_4_1 being adjacent to color dot CD_1_1. Color dots CD_1_3, CD_2_3, CD_1_4, and CD_2_4 form the fourth row of pixel 1110, with color dot CD_1_3 being adjacent to color dot CD_4_1. Finally, color dots CD_4_3, CD_3_3, CD_4_4, and CD_3_4, form the fifth row of pixel 1110, with color dot CD_4_3 being adjacent to color dot CD_1_3. Switching element SE_1 is coupled to the electrodes of color dots CD_1_1, CD_1_2, CD_1_3, and CD_1_4. Switching element SE_2 is coupled to the electrodes of color dots CD_2_1, CD_2_2, CD_2_3, and CD_2_4. Switching element SE_3 is coupled to the electrodes of color dots CD_3_1, CD_3_2, CD_3_3, and CD_3_4. Switching element SE_4 is coupled to the electrodes of color dots CD_4_1, CD_4_2, CD_4_3, and CD_4_4.

FIG. 11(a) illustrates a negative dot polarity pattern for pixel design 1110 (labeled 1110−). The negative dot polarity pattern has positive polarity at the second color component and fourth color component, i.e., switching elements SE_2 and SE_4 and color dots CD_2_1, CD_2_2, CD_2_3, CD_2_4, CD_4_1, CD_4_2, CD_4_3, and CD_4_4, and negative polarity at the first and third color components, i.e., switching elements SE_1 and SE_3, CD_1_1, CD_1_2, CD_1_3, CD_1_4, CD_3_1, CD_3_2, CD_3_3, CD_3_4. In FIG. 11(b), pixel design 1110 (labeled 1110+) is an example of the positive dot polarity pattern, which has negative polarity at the second color component and fourth color component, i.e., switching elements SE_2 and SE_4 and color dots CD_2_1, CD_2_2, CD_2_3, CD_2_4, CD_4_1, CD_4_2, CD_4_3, and CD_4_4, and positive polarity at the first and third color components, i.e., switching element SE_1 and SE_3 and color dots CD_1_1, CD_1_2, CD_1_3, CD_1_4, CD_3_1, CD_3_2, CD_3_3, and CD_3_4.

Displays using the pixel design of FIGS. 11(a) and 11(b) should use the same dot polarity pattern for all pixels in a display frame to create a checkerboard pattern for all the color dots of the display. However, as explained above, successive display frames should switch between the two dot polarity patterns.

Figures 12A, 12B:
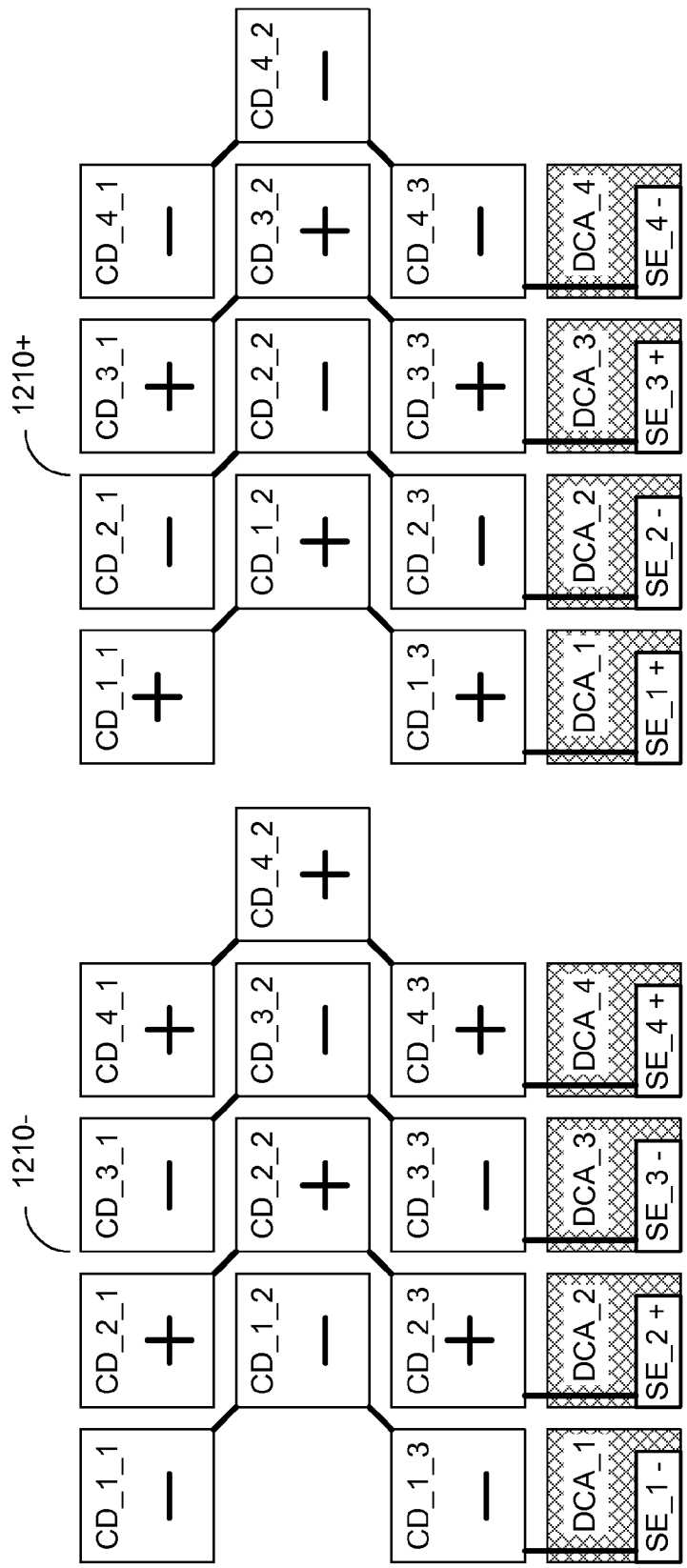
FIGS. 12(a)-12(c) illustrate pixel designs, dot polarity patterns and liquid crystal displays in accordance with one embodiment of the present invention.

FIGS. 12(a)-12(b) show dot polarity patterns of a pixel design 1210 in accordance with another embodiment of the present invention. Specifically, in FIG. 12(a) each of the four color components of pixel 1210 is divided into 3 color dots. Color dots CD_1_1 (i.e., the first color dot of color component 1), CD_2_1 (i.e., the first color dot of the second color component), CD_3_1 (i.e., the first color dot of the third color component) and CD_4_1 (i.e., the first color dot of the fourth color component) form the first row of pixel 1210. Color dots CD_1_2, CD_2_2, CD_3_2 and CD_4_2 form a second row of pixel 1210. However the second row is offset from the first row so that color dot CD_1_2 is adjacent to color dot CD_2_1. Color dots CD_1_3, CD_2_3, CD_3_3, and CD_4_3 form the third row of pixel 1210. However the third row is aligned with the first row so that color dot CD_2_3 is adjacent to color dot CD_1_2. Pixel design 1210 includes a row of device component areas DCA_1, DCA_2, DCA_3, and DCA_4 located below and aligned with the third row of color dots. Switching elements SE_1, SE_2, SE_3, and SE_4 are located within device component areas DCA_1, DCA_2, DCA_3, and DCA_4, respectively. Switching element SE_1 is coupled to the electrodes of color dots CD_1_1, CD_1_2, and CD_1_3. Switching element SE_2 is coupled to the electrodes of color dots CD_2_1, CD_2_2, and CD_2_3. Switching element SE_3 is coupled to the electrodes of color dots CD_3_1, CD_3_2, and CD_3_3. Switching element SE_4 is coupled to the electrodes of color dots CD_4_1, CD_4_2, and CD_4_3.

FIG. 12(a) illustrates a negative dot polarity pattern for pixel 1210−. The negative dot polarity pattern has positive polarity at the second color component and fourth color component, i.e., switching elements SE_2 and SE_4 and color dots CD_2_1, CD_2_2, CD_2_3, CD_4_1, CD_4_2, and CD_4_3, and negative polarity at the first and third color components, i.e., switching elements SE_1 and SE_3 and color dots CD_1_1, CD_1_2, CD_1_3, CD_3_1, CD_3_2, and CD_3_3. FIG. 12(b) shows the positive dot polarity pattern of pixel design 1210+, which has negative polarity at the second color component and fourth color component, i.e., switching elements SE_2 and SE_4 and color dots CD_2_1, CD_2_2, CD_2_3, CD_4_1, CD_4_2, and CD_4_3 and positive polarity at the first and third color components, i.e., switching elements SE_1 and SE_3 and color dots CD_1_1, CD_1_2, CD_1_3, CD_3_1, CD_3_2, and CD_3_3.

Figure 12C:
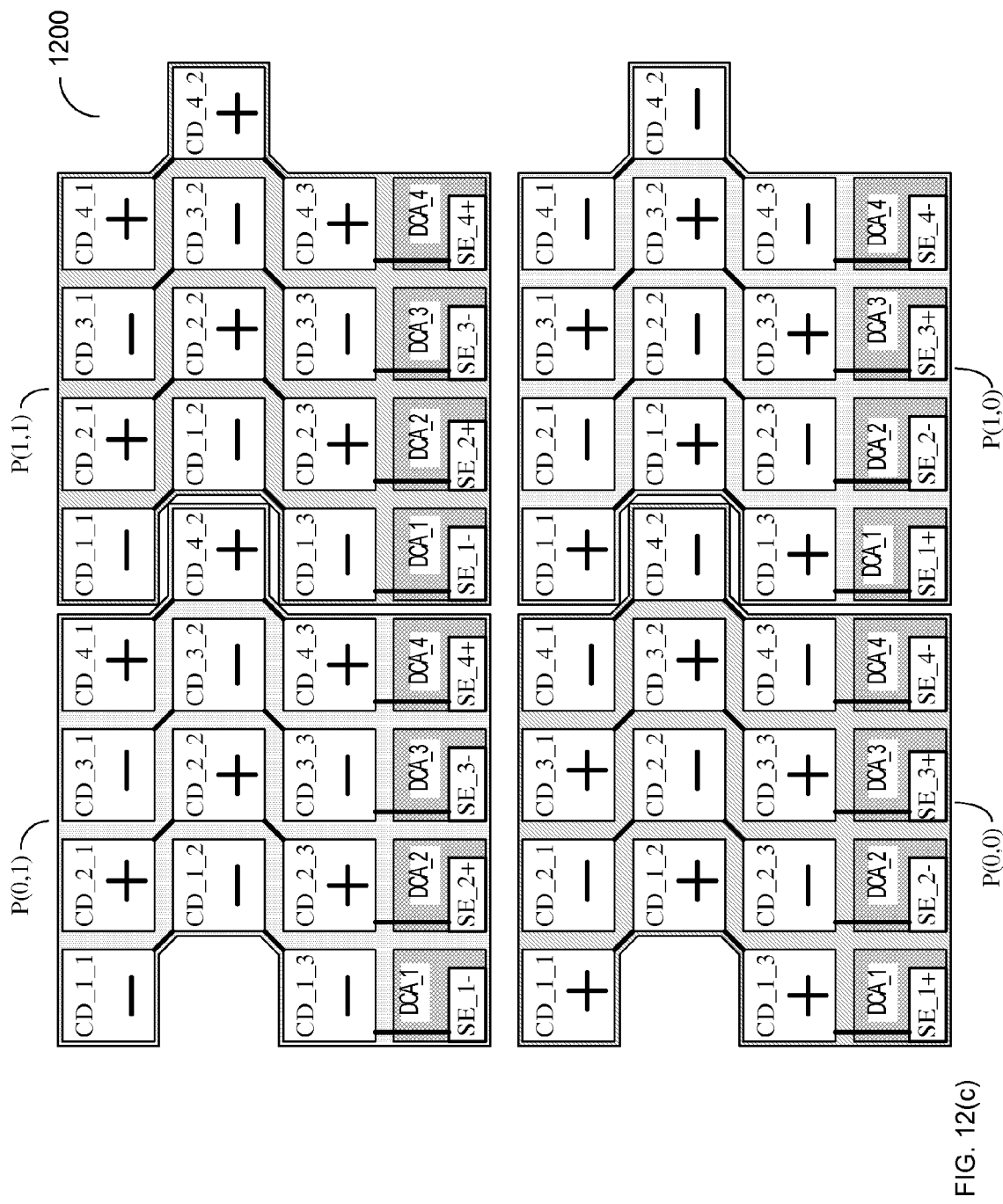

Displays using pixel design 1210 of FIGS. 12(a) and 12(b) should arrange the pixels in alternating rows of different dot polarity patterns. Specifically, even rows should include pixels of a first dot polarity pattern and odd rows should include pixels of the second dot polarity pattern. However, as explained above, successive display frames should switch between the two dot polarity patterns. FIG. 12(c) shows a portion of a display 1200, in which a first row of pixels represented by pixels P(0, 1) and pixel P(1, 1) are of the negative polarity type. However, Pixels P(0, 0) and P(1, 0), which represent a second row are of the positive polarity type. Thus, in general, a pixel P(x, y) would have a first polarity type if y is an even number and would have a second polarity type if y is an odd number. The pixel pattern of FIG. 12(c) uses a switching element point inversion driving scheme.

Figure 12E:
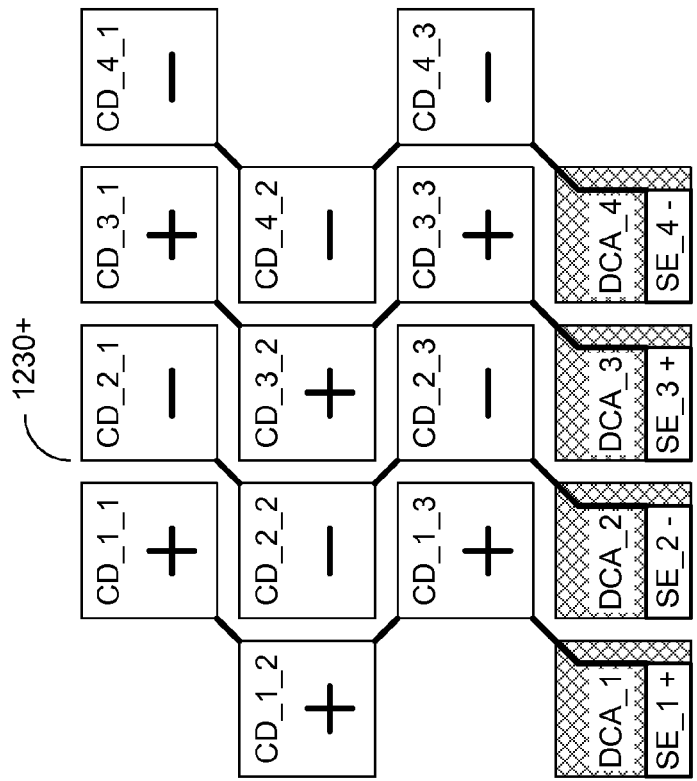
FIGS. 12(d)-12(f) illustrate pixel designs, dot polarity patterns and liquid crystal displays in accordance with one embodiment of the present invention.
Figure 12D:
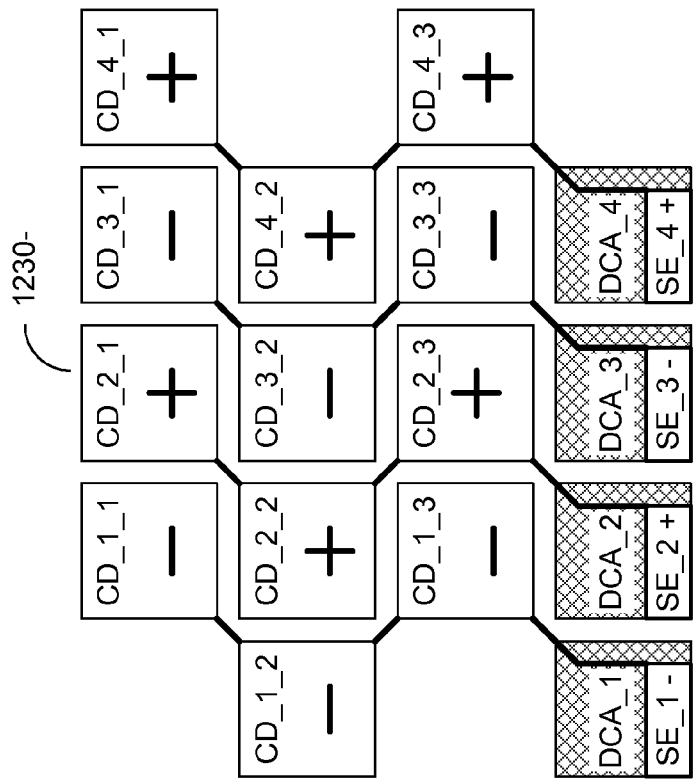

However, the display of FIG. 12(c) has an asymmetric color distribution at the boundary of adjacent rows. Therefore, some embodiments of the present invention incorporate a second pixel design with pixel design 1210 of FIGS. 12(a) and 12(b). FIGS. 12(d)-12(e) show dot polarity patterns of a pixel design 1230 in accordance with another embodiment of the present invention. Specifically, in FIG. 12(d) each of the four color components of pixel design 1230 is divided into 3 color dots. Color dots CD_1_1 (i.e., the first color dot of color component 1), CD_2_1 (i.e., the first color dot of the second color component), CD_3_1 (i.e., the first color dot of the third color component) and CD_4_1 (i.e., the first color dot of the fourth color component) form the first row of pixel 1230. Color dots CD_1_2, CD_2_2, CD_3_2 and CD_4_2 form a second row of pixel 1230. However the second row is offset from the first row so that color dot CD_2_2 is adjacent to color dot CD_1_1. Color dots CD_1_3, CD_2_3, CD_3_3, and CD_4_3 form the third row of pixel 1230. However the third row is aligned with the first row so that color dot CD_1_3 is adjacent to color dot CD_2_2. Pixel design 1230 includes a device component area row with device component areas DCA_1, DCA_2, DCA_3, and DCA_4. The device component area row forms the fourth row of pixel design 1210 and is horizontally aligned with the second row. Switching elements SE_1, SE_2, SE_3, and SE_4 are located within device component areas DCA_1, DCA_2, DCA_3, and DCA_4, respectively. Switching element SE_1 is coupled to the electrodes of color dots CD_1_1, CD_1_2, and CD_1_3. Switching element SE_2 is coupled to the electrodes of color dots CD_2_1, CD_2_2, and CD_2_3. Switching element SE_3 is coupled to the electrodes of color dots CD_3_1, CD_3_2, and CD_3_3. Switching element SE_4 is coupled to the electrodes of color dots CD_4_1, CD_4_2, and CD_4_3.

FIG. 12(d) illustrates the negative dot polarity pattern for pixel design 1230−. The negative dot polarity pattern has positive polarity at the second color component and fourth color component, i.e., switching elements SE_2 and SE_4 and color dots CD_2_1, CD_2_2, CD_2_3, CD_4_1, CD_4_2, and CD_4_3, and negative polarity at the first and third color components, i.e., switching elements SE_1 and SE_3 and color dots CD_1_1, CD_1_2, CD_1_3, CD_1_4, CD_3_1, CD_3_2, CD_3_3, CD_3_4. FIG. 12(e) shows the positive dot polarity pattern of pixel design 1230+, which has negative polarity at the second color component and fourth color component, i.e., switching elements SE_2 and SE_4 and color dots CD_2_1, CD_2_2, CD_2_3, CD_4_1, CD_4_2, and CD_4_3, and positive polarity at the first and third color components, i.e., switching elements SE_1 and SE_3 and color dots CD_1_1, CD_1_2, CD_1_3, CD_3_1, CD_3_2, and CD_3_3.

Figure 12F:
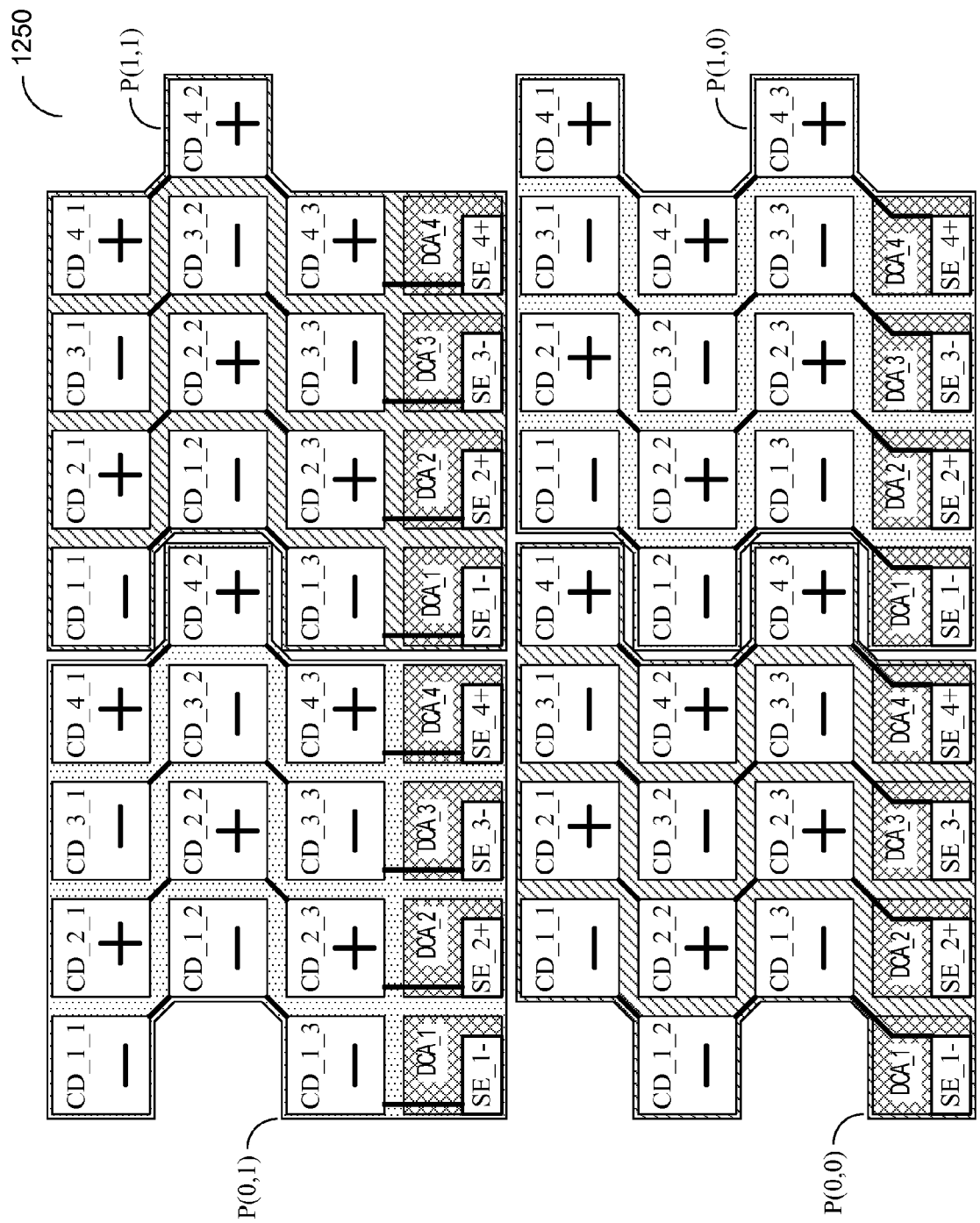

Displays using pixel design 1210 of FIGS. 12(a) and 12(b) (i.e., the first pixel design) with pixel design 1230 of FIGS. 12(d) and 12(e) (i.e. the second pixel design) are arranged in alternating rows of different pixel designs. Within each row the pixels are all of the same dot polarity patterns. FIG. 12(f) illustrates a portion of a display 1250 having this pattern. For clarity, the area of each pixel is shaded; this shading is only for illustrative purposes and has no functional significance. Specifically, in FIG. 12(f), a first row of pixels represented by pixels P(0, 1) and P(1, 1) use pixel design 1210 of FIGS. 12(a) and 12(b). Both pixels P(1, 0) and P(1, 1) are illustrated using a negative dot polarity pattern. However, as explained above, successive display frames should switch between the positive and negative dot polarity patterns. A second row of pixels represented by pixels P(0, 0) and P(1, 0) use pixel design 1230 from FIGS. 12(d) and 12(e) and are also of the negative dot polarity pattern. The pixel pattern of FIG. 12(f) uses a switching element column inversion driving scheme.

While the pixel pattern of FIG. 12(f) provides better color distribution than the pixel pattern of FIG. 12(c), some embodiments of the present invention may still use the pixel pattern of FIG. 12(c) because the pixel pattern in FIG. 12(c), which uses switching element point inversion driving scheme, may improve optical performance by reducing flicker and cross-talk as compared to the switching element column inversion driving scheme used in the pixel pattern of FIG. 12(f).

Various embodiments of the present invention were fabricated in the form of a 7 inch color wide VGA (WVGA) resolution display using a switching element point inversion driving scheme. WVGA has a resolution is 800 pixels in the horizontal direction and 480 pixels in the vertical direction. Thus, the color pixel size is 190.5 um in width by 190.5 um in height. Each pixel includes three color components (red, green and blue colors) using color filter materials. Thus the resolution is 2400 (800×3) color components in the horizontal direction and 480 color components in the vertical direction, each color component has a theoretical maximum size of 63.5 um in width by 190.5 um in height. However, some of this area is required for the device component areas. The display includes 2400 switching elements per row and 480 rows. The device component area (DCA), which consists of the switching element (a thin film transistor) and the storage capacitor, has a theoretical maximum size of about 63.5 um in width by 38.0 um in height. However due to horizontal and vertical dot spacing, the device component area has an actual size of about 55.5 um in width by 35.0 um.

In the display panel fabrication process, Merck vertical alignment liquid crystal (LC) is used with a negative dielectric anisotropy, such as MLC-6884. The Japan Nissan Chemical Industrial Limited (Nissan) polyimide SE-5300 with a non-rubbing process is used to fabricate the standard vertical LC alignment without the pretilt angle. Other vertical alignment polyimides (PIs) can also be used to obtain the vertical LC alignment, such as Nissan LC vertical alignment PI SE-1211, SE-7511L, RN-1566, and RN-1681, and Japan Synthetic Rubber Corporation (JSR) LC vertical alignment PI AL1H659, AL60101, JALS688-R11, JALS-2096-R14. Other vertical alignment LCs from Merck can also be used as the LC material, such as LC MLC-6008, MLC-6609, MLC-6610, MLC-6882, MLC-6883, MLC-6885, and MLC-6886. The fabrication process is a non-rubbing process and does not require high precision top to bottom substrates alignment, which is required in the fabrication process for other MVA LCDs using the protrusion or ITO slit geometry. The width of the ITO connection lines between different color dots and different device component areas is 3 um. Top and bottom polarizers are attached to the panels. The typical LC cell gap is about 2.0 to 3.5 um.

In a particular embodiment of the present invention, the display was created using the pixel designs and dot polarity patterns and the pixel arrangement of FIGS. 7(a)-7(b) and 7(d)-7(e), where each color component is divided into 4 color dots. Thus each color dot has a theoretical maximum size of about 63.5 um in width by 38.1 um in height. However due to horizontal and vertical dot spacing each color dot has an actual size of about 55.5 um in width by 35.1 um In another embodiment of the present invention, the display was created using the pixel designs and dot polarity patterns and pixel arrangement of FIGS. 5(d)-5(f), where each color component is divided into 3 color dots. Thus each color dot has a theoretical maximum size of about 63.5 um in width by 47.8 um in height. However due to horizontal dot spacing and vertical dot spacing each color dot has an actual size of about 55.5 um in width by 47.8 um in height. An actual display using the principle of the present invention, produced a contrast ratio greater than 700 at an applied voltage of 5 volt. Furthermore, the display exhibited a very wide viewing angle (viewing angle cone with a contrast ratio larger than 5). The viewing angles depend on the polarizers that are attached to the panels. Various embodiments of the present invention used four types of polarizers: the regular linear polarizers (without the MVA wide viewing optical compensation film), MVA wide viewing angle polarizer (with the MVA wide viewing optical compensation film), regular circular polarizers (without the MVA wide viewing optical compensation film), and MVA wide viewing circular polarizer (circular polarizer attached with the MVA wide viewing angle compensation films). The MVA compensation films include negative birefringence uniaxial and biaxial films, with a total retardation of −100 to −300 nm. Specifically, the viewing angle is larger than ±85° in the horizontal and vertical viewing zones, and larger than ±50° in the two major diagonal viewing zones, using the normal linear polarizer without the MVA wide viewing optical compensation film. The viewing angle is larger than ±85° in all viewing zones, using the MVA wide viewing angle polarizers with the MVA wide viewing optical compensation film. The circular polarizers doubled the optical transmission compared to the transmission using linear polarizers. Moreover, both the transmission and viewing angle are enlarged using the MVA circular polarizers.

While switching element point inversion reduces flicker and crosstalk, the switching power, driver IC cost and other manufacturing complexities of using switching element point inversion driving schemes may be greater than switching element column inversion or switching element row inversion. Thus, to reduce these complexities, the present invention also provides pixel patterns that can be used with switching element column inversion driving schemes as described above and with switching element row inversion as described below. Compared to switching element column inversion driving scheme, switching element row inversion driving scheme provide a lower switching power, lower voltage and lower driver IC cost, but a larger flicker and cross talk.

Figure 13A:
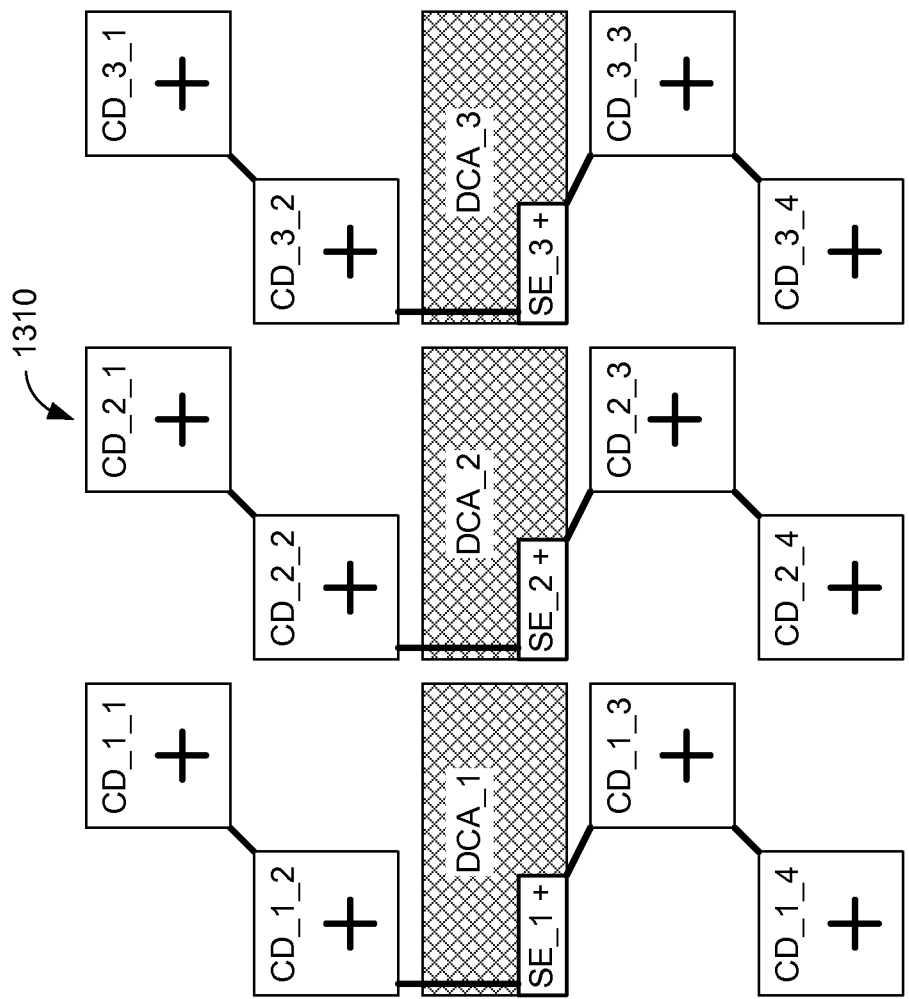
FIG. 13(a) illustrates a spread pixel design in accordance with one embodiment of the present invention.

FIG. 13(a) shows a spread pixel design 1310 in accordance with another embodiment of the present invention. Spread pixels differ from pixels shown earlier in that the color dots of a spread pixel are spread out to allow color dots of multiple spread pixels to be interleaved. Specifically, FIG. 13(a) shows a spread pixel design 1310, in which each of the three color components of pixel 1310 is divided into 4 color dots. Color dots $CD\_1\_1$ (i.e., the first color dot of color component 1), $CD\_2\_1$ (i.e., the first color dot of the second color component), and $CD\_3\_1$ (i.e., the first color dot of the third color component) form the first row of pixel 1310. However, these color dots are separated from each other by at least the width of a color dot to allow interleaving with color dots of other pixels. Color dots $CD\_1\_2$, $CD\_2\_2$, and $CD\_3\_2$ form a second row of pixel 1310. Like the first row of color dots, color dots $CD\_1\_2$, $CD\_2\_2$, and $CD\_3\_2$, are separated from each other by at least the width of a color dot. Furthermore, the second row of spread pixel 1310 is offset from the first row so that color dot $CD\_2\_2$ is adjacent to the space between color dots $CD\_1\_1$ and $CD\_2\_1$. The third row of pixel design 1310 is a device component area row having device component areas $DCA\_1$, $DCA\_2$, and $DCA\_3$. For better alignment, each device component area is the width of two color dots plus the horizontal dot spacing HDS. However, some embodiments of the present invention use a variant of pixel design 1210 that uses device component areas having the same width as a color dot (see below). Switching elements $SE\_1$, $SE\_2$, and $SE\_3$, are located within device component area $DCA\_1$, $DCA\_2$, and $DCA\_3$, respectively. Color dots $CD\_1\_3$, $CD\_2\_3$, and $CD\_3\_3$, form the fourth row of pixel 1310, and are separated from each other by at least the width of a color dot. However the third row is aligned with the first row so that color dot $CD\_1\_3$ is horizontally aligned with color dot $CD\_1\_1$. Color dots $CD\_1\_4$, $CD\_2\_4$, and $CD\_3\_4$, form the fourth row of pixel 1310, and are separated from each other by at least the width of a color dot. However the fourth row is aligned with the second row so that color dot $CD\_2\_4$ is adjacent to the space between color dots $CD\_1\_3$ and $CD\_2\_3$. Switching element $SE\_1$ is coupled to the electrodes of color dots $CD\_1\_1$, $CD\_1\_2$, $CD\_1\_3$, and $CD\_1\_4$. Switching element $SE\_2$ is coupled to the electrodes of color dots $CD\_2\_1$, $CD\_2\_2$, $CD\_2\_3$, and $CD\_2\_4$. Switching element $SE\_3$ is coupled to the electrodes of color dots $CD\_3\_1$, $CD\_3\_2$, $CD\_3\_3$, and $CD\_3\_4$.

In other words, the first color component of spread pixel 1310 has four color dots with $CD\_1\_1$ and $CD\_1\_2$ in a first right-left zigzag pattern (as used herein a right-left zigzag pattern includes a first color dot and a second color dot to the left and below the first color dot) and $CD\_1\_3$ and $CD\_1\_4$ in a second right left zigzag pattern. The first zigzag pattern is horizontally aligned with the second zigzag pattern but separated vertically by device component area $DCA\_1$. Similarly, the second color component and third color component of pixel 1310 each has 4 color dots in two horizontally aligned right-left zigzag patterns separated by device component areas. The color components are vertically aligned in pixel 1310 but offset horizontally by at least one pixel width.

The color dots of spread pixel 1310 occupy one color of a checkerboard pattern, i.e., none of color dots of spread pixel 1310 share a common side. The primary advantage of this arrangement is that the polarity of all the color dots of spread pixel 1310 can be the same. Thus, as shown in FIG. 13(a), the positive dot polarity pattern of spread pixel 1310 has positive polarity for all the color dots and switching elements. Conversely, the negative dot polarity pattern for spread pixel 1310 would have negative polarity for all the color dots. A complete checkerboard pattern for color dot polarity in a display is formed by interleaving spread pixels as explained below.

Figure 13B:
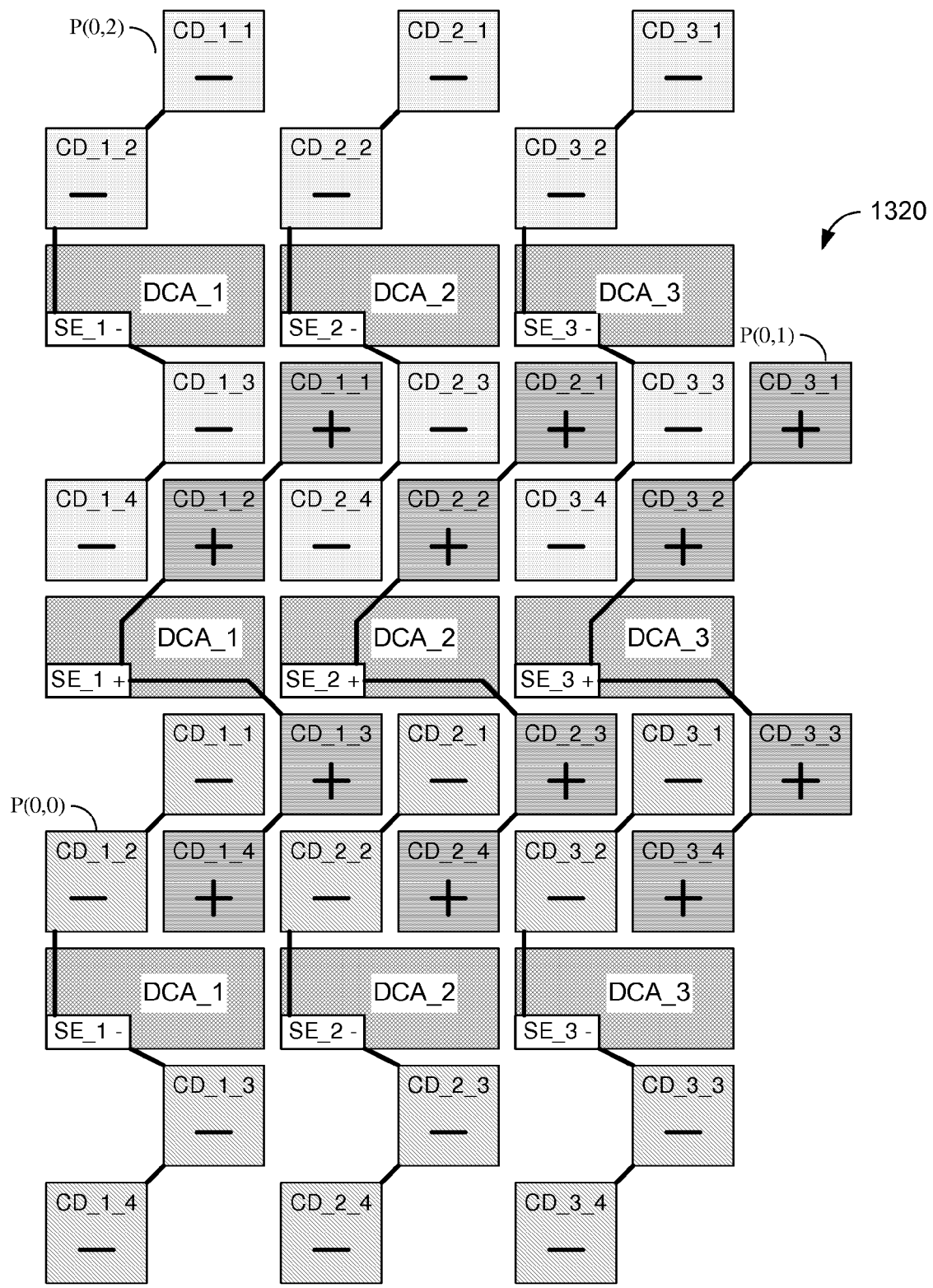
FIGS. 13(b)-13(f) illustrate the use of multiple spread pixels in liquid crystal displays in accordance with various embodiments of the present invention.

Displays using the spread pixel design of FIG. 13(a) can arrange the pixels in a variety of formats. For example, some embodiments of the present invention use row interleaving of spread pixels, other embodiments may use column interleaving, still other embodiments may use both row and column interleaving, and other embodiment may use pixel pair interleaving. For example, FIG. 13(b) shows a portion of a display 1320 using row interleaving of spread pixels. Specifically, FIG. 13(b) shows three pixels P(0,0), P(0, 1), and P(0, 2), which are on three different rows in a single column. For clarity the color dots of each pixel are use different shading. In row interleaving, each row of pixels overlaps with two adjacent rows of pixels (except at the top and bottom of the display). Specifically, color dots from one row would fill a subset of spaces in adjacent rows. For example, row 1 of the display as represented by pixel P(0, 1) overlaps with row 0 of the display as represented by pixel P(0,0). Specifically, color dot CD_1_1 of pixel P(0, 0) fills the space between color dots CD_1_4 and device component area DCA_1 of pixel P(0, 1); color dot CD_2_1 of pixel P(0, 0) fills the space between color dots CD_2_4 and device component area DCA_2 of pixel P(0, 1) (the space is also between color dots CD_1_3 and CD_2_3 of pixel P(0, 1)); color CD_3_1 of pixel P(0, 0) fills the space in between color dots CD_3_4 and device component area DCA_3 of pixel P(0, 1) (the space is also between color dots CD_2_3 and CD_3_3 of pixel P(0, 1)); color dot CD_2_2 of pixel P(0, 0) fills the space in between color dots CD_1_4 and CD_2_4 of pixel P(0, 1); and color dot CD_3_2 of pixel P(0, 0) fills the space between color dots CD_2_4, and CD_3_4 of pixel P(0, 1). The other spaces in pixel P(0, 1) are filled by color dots from pixel P(0, 2). Specifically, color dots CD_2_3, CD_3_3, CD_2_4 and CD_3_4 of pixel P(0, 2) fill spaces between color dots CD_1_1 and CD_2_1 of pixel P(0, 1); between color dots CD_2_1 and CD_3_1 of pixel P(0, 1); between color dots CD_1_2 and CD_2_2 of pixel P(0, 1), and between color dots CD_2_2 and CD_3_2 of pixel P(0, 1), respectively. Furthermore, color dot CD_1_3 of pixel P(0, 2) fills the space adjacent to color dots CD_1_2 and CD_1_1 of pixel P(0, 1). Similarly, the color dots of pixel P(0, 1) occupy spaces within pixels P(0, 0) and P(0, 2).

The embodiment of FIG. 13(b) should use rows with alternating dot polarity to achieve a checkerboard pattern of dot polarities for the display. Specifically, even-numbered rows of pixels should be of a first polarity and odd-numbered rows of pixels should be of the second polarity. As explained above, the dot polarities of the pixels switch with each frame. Thus, for example FIG. 13(b) shows pixels in row 0 and row 2 (i.e. the even-numbered rows) with negative dot polarity, while pixels in row one (i.e. the odd-numbered rows) have positive dot polarity. However, during the next frame, the pixels in even-numbered rows would have positive dot polarity and the pixels in odd numbered rows would have negative dot polarity. The pixel pattern of FIG. 13(b) uses a switching element row inversion driving scheme, because the switching elements on each row have the same polarity; however, each a switching element in one row has the opposite polarity as compared to the polarity of switching elements in adjacent rows. Specifically in FIG. 13(b), the switching elements in pixel P(0,0) have negative polarity, the switching elements in pixel P(0,1) have positive polarity, and the switching elements in pixel P(0,2) has negative polarity.

As illustrated in FIG. 13(b) the spaces in the spread pixels are not filled at the edge of the display. Several different approaches can be used to address the edge conditions. For example some embodiments of the present invention would only use half pixels at the edge of the display. For example, in such an embodiment color dots CD_1_3, CD_1_4, CD_2_3, CD_2_4, CD_3_3, and CD_3_4 of pixel P(0, 0) are eliminated. In other embodiments of the present invention, the edges of the display are covered to so that the visible edge of the display would not have the spaces. In other embodiments of the present invention, the edge of the display may be covered with a black matrix and the edge pixels are unused.

Figure 13C:
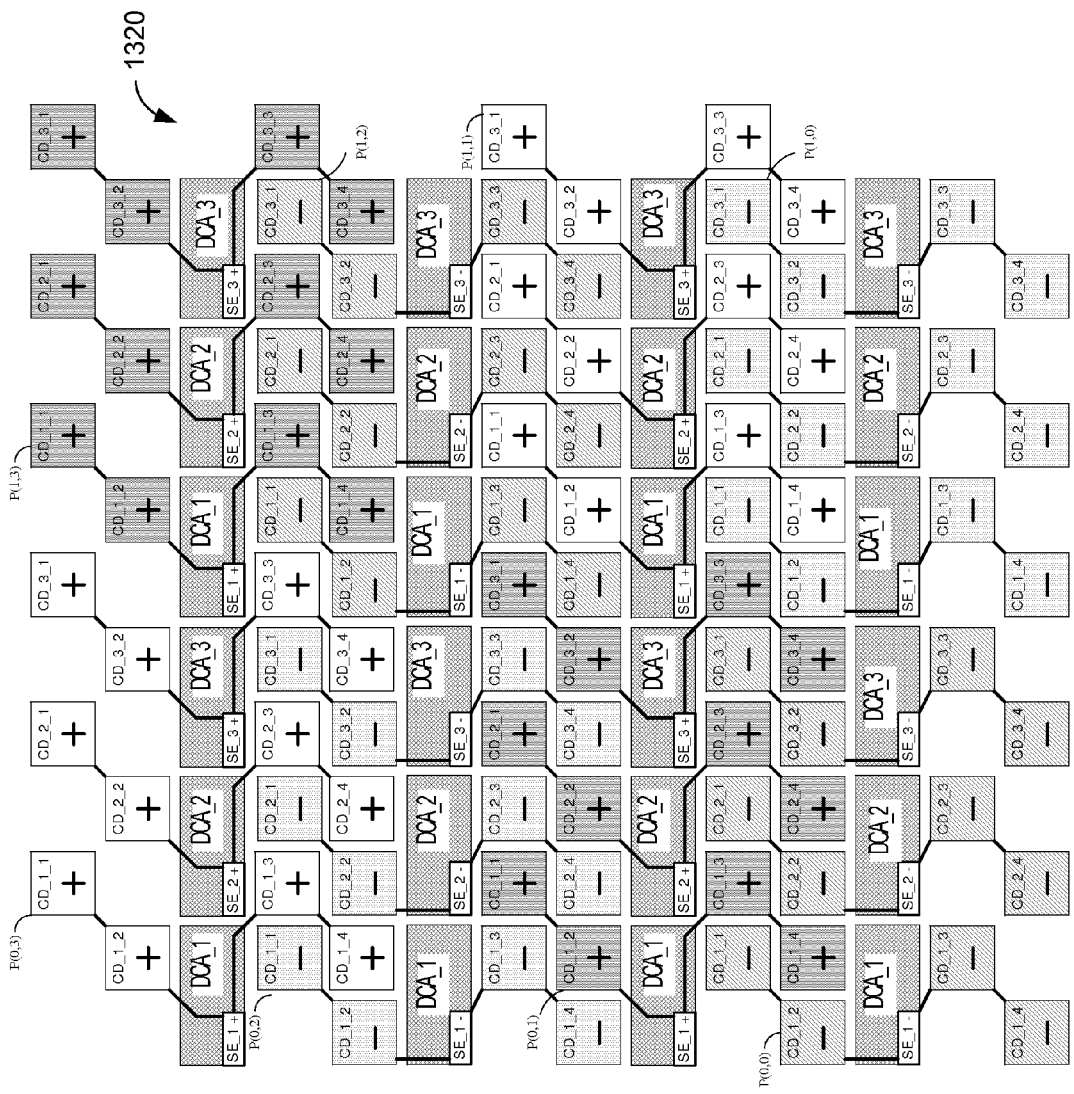
Figure 13D:
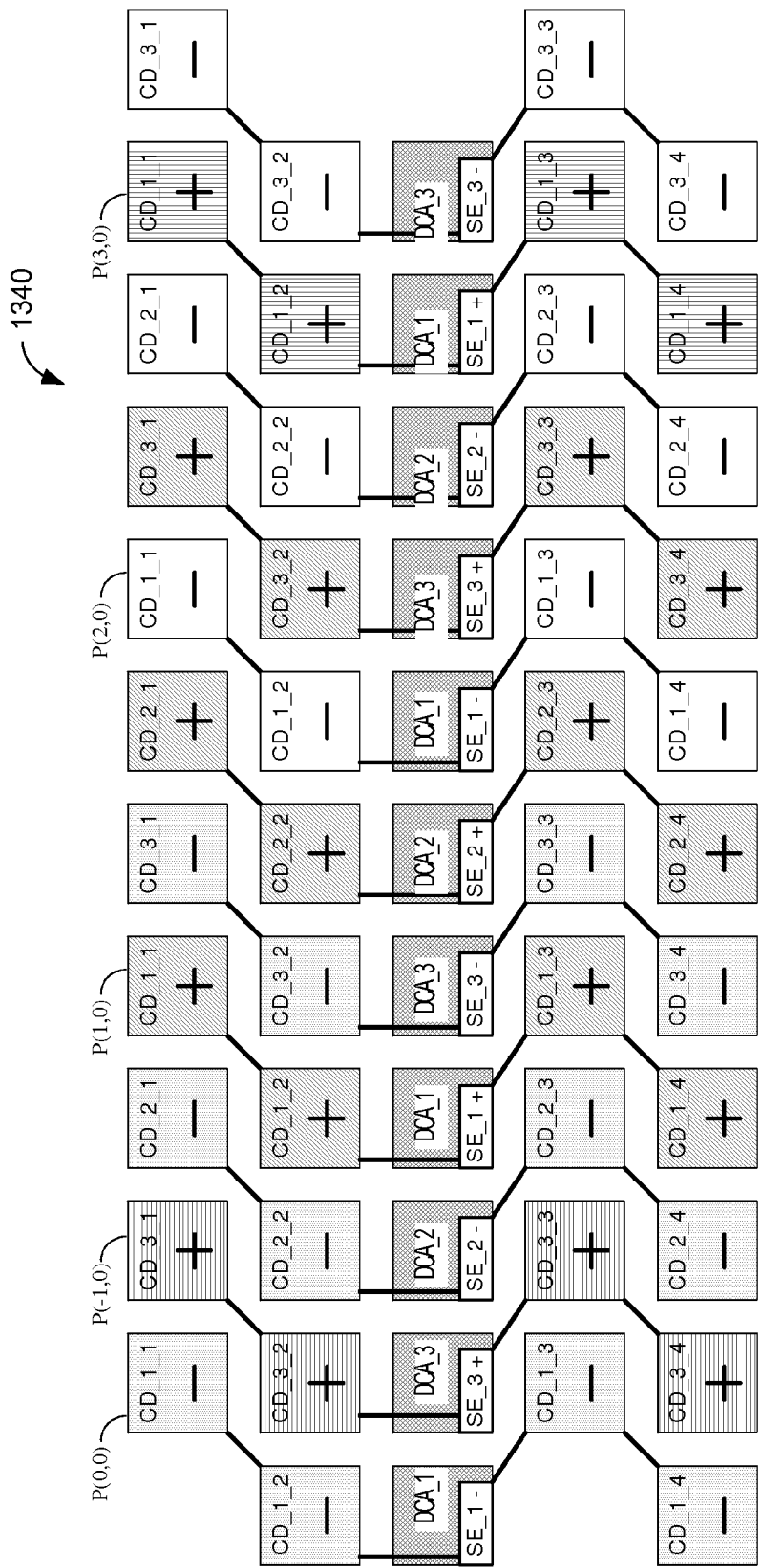

FIG. 13(c) is included to further illustrate row interleaving. Specifically, FIG. 13(c) illustrates 8 pixels of display 1320, which are part of 4 rows and 2 columns of a display. As explained above with respect to FIG. 13(b), Pixels P(0, 0) is interleaved with pixel P(0, 1), which is also interleaved with pixel, P(0, 2), which is also interleaved with pixel P(0,3). Similarly, Pixels P(1, 0) is interleaved with pixel P(1, 1), which is also interleaved with pixel, P(1, 2), which is also interleaved with pixel P(1,3). Like the pixel pattern of FIG. 13(b), the pixel pattern of FIG. 13(c) uses a switching element row inversion driving scheme FIG. 13(d) shows a portion of a display 1340, which uses column interleaving with spread pixels. The spread pixels of FIG. 13(d) are a variant of pixel design 1310. Specifically, the device component area in the pixels of FIG. 13(d) has the same width as a color dot to allow column interleaving. FIG. 13(d) shows three pixels P(0,0), P(1, 0), and P(2, 0), which are on three different columns in a single row. In addition a portion of a filler pixel labeled P(-1, 0) is shown as well as a portion of pixel P(3, 0). Filler pixels are used to fill the spaces of pixels at the edge of the screen. Alternatively the spaces could be left unfilled. In column interleaving, each column of pixels overlaps with two adjacent columns of pixels (except at the left and right side of the display where filler pixels could be used). Specifically, color dots from one column would fill a subset of spaces in adjacent columns. For example, column 1 of the display as represented by pixel P(1, 0) overlaps with column 0 of the display as represented by pixel P(0,0). Specifically, color dot CD_3_1 of pixel P(0, 0) fills the space between color dots CD_2_1 and CD_1_1 of pixel P(1, 0); color dot CD_3_2 of pixel P(0, 0) fills the space between color dots CD_1_2 and CD_2_2 of pixel P(1, 0); color dot CD_3_3 of pixel P(0, 0) fills the space in between color dots CD_2_3 and CD_1_3 of pixel P(1, 0); color dot CD_3_4 of pixel P(0, 0) fills the space between color dot C_2_4 and CD_1_4 of pixel P(1, 0), color dot CD_2_1 of pixel P(0, 0) fills the space adjacent to color dots CD_1_1 and CD_1_2 of pixel P(1, 0); and color dot CD_2_3 of pixel P(0, 0) fills the space between color dot CD_1_4 and device component area DCA_1 of pixel P(1, 0). The other spaces in pixel P(0, 1) are filled by color dots from pixel P(0, 2). Specifically, color dot CD_1_1 of pixel P(2, 0) fills the space between color dots CD_2_1 and CD_3_1 of pixel P(1, 0); color dot CD_1_2 of pixel P(2, 0) fills the space between color dots CD_2_2 and CD_3_2 of pixel P(1, 0); color dot CD_1_3 of pixel P(2, 0) fills the space in between color dots CD_2_3 and CD_3_3 of pixel P(1, 0); color dot CD_1_4 of pixel P(2, 0) fills the space between color dot C_2_4 and CD_3_4 of pixel P(1, 0), color dot CD_2_2 of pixel P(1, 0) fills the space in between color dots CD_3_1 and CD_3_3 of pixel P(1, 0); and color dot CD_2_4 of pixel P(2, 0) fills the space adjacent to color dots CD_3_3 and CD_3_4 of pixel P(1, 0). Similarly, the color dots of pixel P(1, 0) occupy spaces within pixels P(0, 0) and P(2, 0).

The embodiment of FIG. 13(d) should use columns with alternating dot polarity to achieve a checkerboard pattern of dot polarities for the display. Specifically, even-numbered columns of pixels should be of one polarity and odd-numbered columns of pixels should be of the second polarity. As explained above, the dot polarities of the pixels switch with each frame. Thus, for example FIG. 13(d) shows pixels in column 0 and column 2 (i.e. the even-numbered columns) with negative dot polarity, while pixels in column one (i.e. the odd-numbered column) have positive dot polarity. However, during the next frame, the pixels in even-numbered columns would have positive dot polarity and the pixels in odd numbered columns would have negative dot polarity.

Several different approaches can be used to address the edge conditions. For example some embodiments of the present invention would only use filler pixels to fill the spaces as illustrated in FIG. 13(d). In other embodiments partial pixels are used at the edge of the display. For example, in such an embodiment color dots CD_1_1, CD_1_2, CD_1_3, CD_1_4, and device control area DCA_1 are eliminated. In other embodiments of the present invention, the edges of the display are covered to so that the visible edge of the display would not have the spaces.

Figure 13E:
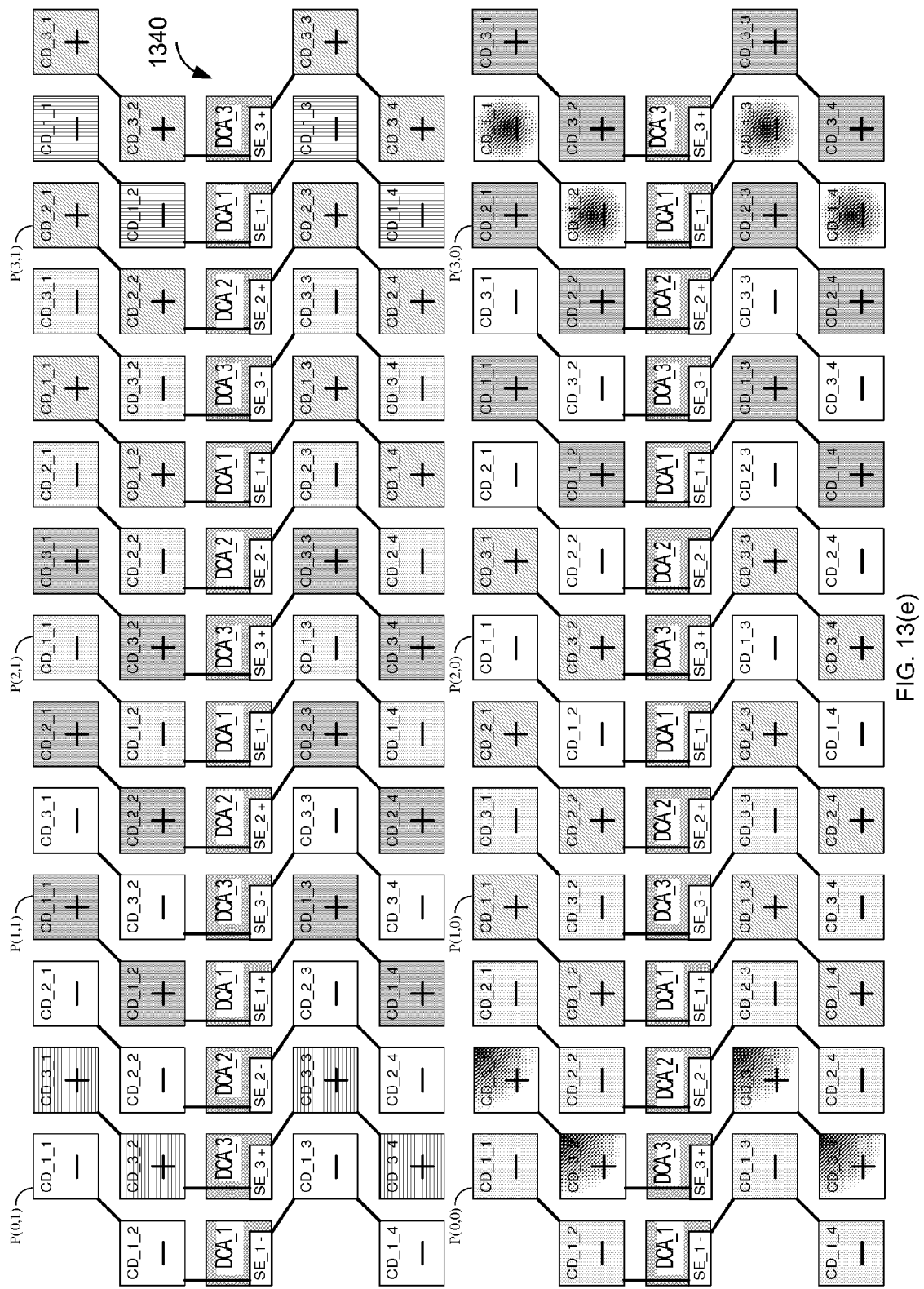

FIG. 13(e) is included to further illustrate column interleaving. Specifically, FIG. 13(e) shows 8 pixels, which are part of 4 columns and 2 rows of display 1340. As explained above with respect to FIG. 13(d), Pixels P(0, 0) is interleaved with pixel P(1, 0), which is also interleaved with pixel, P(2, 0), which is also interleaved with pixel P(3, 0). Similarly, Pixels P(0, 1) is interleaved with pixel P(1, 1), which is also interleaved with pixel, P(2, 1), which is also interleaved with pixel P(3, 1).

Figure 13F:
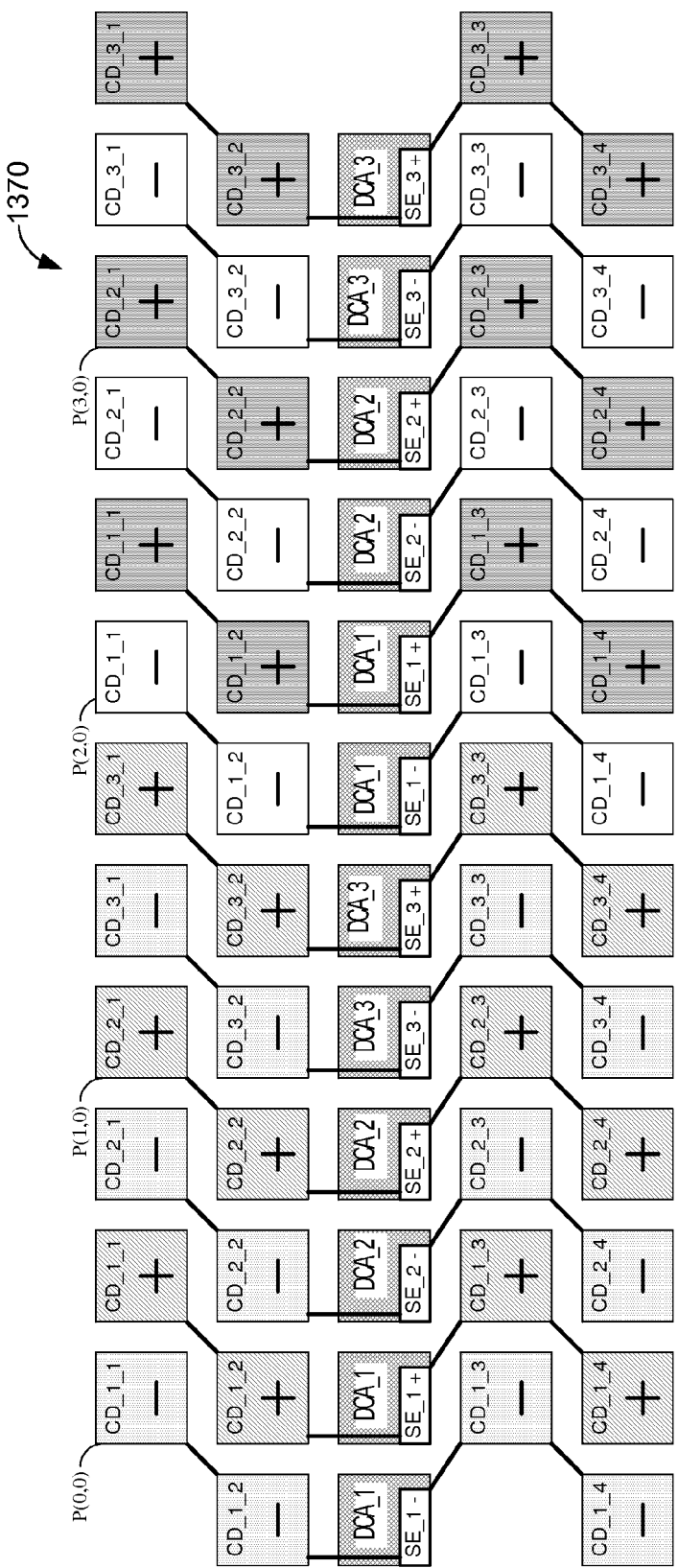

FIG. 13(f) shows a portion of a display 1370 using horizontal pixel pair interleaving with spread pixels. Like FIG. 13(d), FIG. 13(f) uses the variant of spread pixel design 1310 having device component areas with the same width as color dots. Specifically, FIG. 13(g) shows four pixels P(0,0), P(1, 0), and P(2, 0) and P(3, 0), which are part of four different columns in a single row. In horizontal pixel pair interleaving two pixels are interleaved to fill in the spaces of each spread pixel with corresponding color dots of each pixel being adjacent horizontally. As shown in FIG. 13(g), pixels P(0,0) and pixel P(1, 0) form a horizontal pixel pair. The corresponding color dots of each pixel are adjacent horizontally as shown by color dot CD_1_1 of pixel P(0, 0) being adjacent horizontally with (e.g. to the left of) color dot CD_1_1 of pixel P(1, 0). Similarly, pixels P(2, 0) and P(3, 0) form a second horizontal pixel pair.

To achieve a checkerboard pattern of dot polarities, the two pixels in a pixel pair should have different dot polarities. Specifically, the first pixel of each pixel pair should be of one polarity and the second pixel of each pixel pair should be of the second polarity. As explained above, the dot polarities of the pixels switch with each frame. Thus, for example FIG. 13(g) shows the first pixel of each pixel pair (i.e. pixels P(0, 0) and pixel P(2, 0)) with negative dot polarity, while the second pixel of each pixel pair (i.e. pixels P(1, 0) and P(3, 0)) have positive dot polarity. However, during the next frame, the first pixels in each pixel pair would have positive dot polarity and the second pixel in each pixel pair would have negative dot polarity.

Figure 14A:
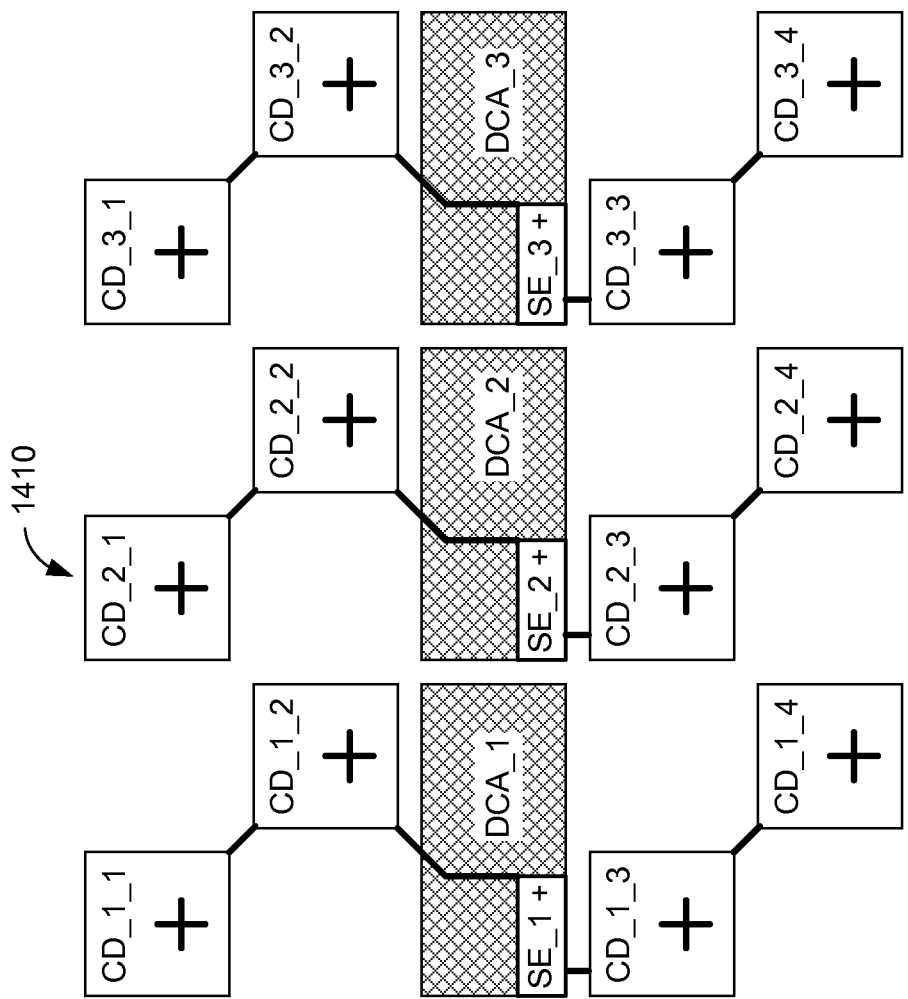
FIG. 14(a) illustrates a spread pixel design in accordance with one embodiment of the present invention.

Like the pixel designs described above, multiple spread pixel designs may be combined into a single display. FIG. 14(a) shows a second spread pixel design 1410 that can be used individually or with the spread pixel design of FIG. 13(a). Specifically, FIG. 14(a) shows a spread pixel 1410, in which each of the three color components of pixel 1410 is divided into 4 color dots. Color dots CD_1_1 (i.e., the first color dot of color component 1), CD_2_1 (i.e., the first color dot of the second color component), and CD_3_1 (i.e., the first color dot of the third color component) form the first row of pixel 1410. However, these color dots are separated from each other by at least the width of a color dot to allow interleaving with color dots of other pixels. Color dots CD_1_2, CD_2_2, and CD_3_2 form a second row of pixel 1410. Like the first row of color dots, color dots CD_1_2, CD_2_2, and CD_3_2, are separated from each other by at least the width of a color dot. Furthermore, the second row of spread pixel 1410 is offset from the first row so that color dot CD_1_2 is adjacent to the space between color dots CD_1_1 and CD_2_1. The third row of pixel design 1410 is a device component area row having device component areas DCA_1, DCA_2, and DCA_3, which have a width equal to twice the color dot width plus the horizontal dot offset. Switching elements SE_1, SE_2, and SE_3 are located within device component areas DCA_1, DCA_2, and DCA_3, respectively. The left side of the device component area row is aligned with the left side of the first row. Color dots CD_1_3, CD_2_3, and CD_3_3, form the fourth row of pixel 1410, and are separated from each other by at least the width of a color dot. However the third row is aligned with the first row so that color dot CD_1_3 is horizontally aligned with color dot CD_1_1. Color dots CD_1_4, CD_2_4, and CD_3_4, form the fifth row of pixel 1410, and are separated from each other by at least the width of a color dot. However the fourth row is aligned with the second row so that color dot CD_1_4 horizontally aligned with color dot CD_1_2. Switching element SE_1 is coupled to the electrodes of color dots CD_1_1, CD_1_2, CD_1_3, and CD_1_4. Switching element SE_2 is coupled to the electrodes of color dots CD_2_1, CD_2_2, CD_2_3, and CD_2_4. Switching element SE_3 is coupled to the electrodes of color dots CD_3_1, CD_3_2, CD_3_3, and CD_3_4. Switching element SE_4 is coupled to the electrodes of color dots CD_4_1, CD_4_2, CD_4_3, and CD_4_4.

In other words, the first color component of spread pixel 1410 has four color dots with CD_1_1 and CD_1_2 in a first left-right zigzag pattern (as used herein a left-right zigzag pattern includes a first color dot and a second color dot to the right and below the first color dot) and CD_1_3 and CD_1_4 in a second left-right zigzag pattern. The first zigzag pattern is horizontally aligned with the second zigzag pattern but separated vertically by device component area DCA_1. Similarly, the second color component and third color component of pixel 1410 each has 4 color dots in two horizontally aligned left-right zigzag patterns separated by device component areas. The color components are vertically aligned in pixel 1410 but offset horizontally by at least one pixel width.

The color dots of spread pixel 1410 occupy one color of a checkerboard pattern, i.e., none of color dots of spread pixel 1410 share a common side. The primary advantage of this arrangement is that the polarity of all the color dots of spread pixel 1410 can be the same. Thus, as shown in FIG. 14(a), the positive dot polarity pattern of spread pixel 1410 has positive polarity for all the color dots and switching elements. Conversely, the negative dot polarity pattern for spread pixel 1410 would have negative polarity for all the color dots.

Figure 14B:
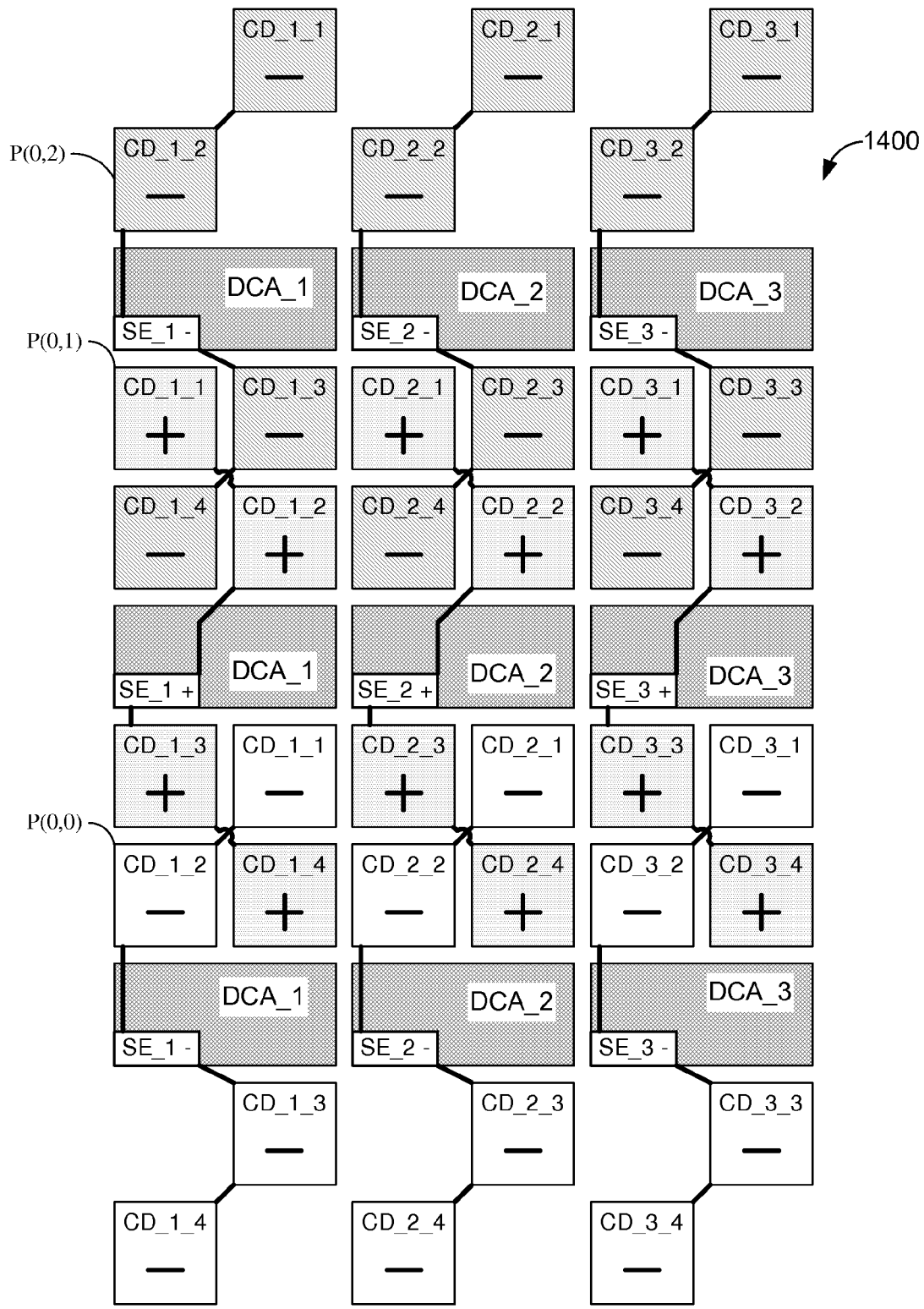
FIG. 14(b) illustrates the use of multiple spread pixel designs in a single display.

FIG. 14(b) shows a portion of a display 1400 using row interleaving and two different spread pixel designs. Specifically, FIG. 14(b) shows three pixels P(0,0), P(0, 1), and P(0, 2), which are on three different rows in a single column. Pixels P(0, 0) and pixel P(0, 2) use pixel design 1310 of FIG. 13(a), while pixel P(0, 1) uses pixel design 1410 of FIG. 14(a). In general, for the display of FIG. 14(b) pixels on odd numbered rows use pixel design 1310 of FIG. 13(a) and pixels on even numbered rows use pixel design 1410 of FIG. 14(a). For row interleaving with pixel design 1310 and 1410, each row of pixels overlaps with two adjacent rows of pixels (except at the top and bottom of the display). Specifically, color dots from one row would fill a subset of spaces in adjacent rows. For example, row 1 of the display as represented by pixel P(0, 1) overlaps with row 0 of the display as represented by pixel P(0,0). Specifically, color dot CD_1_1 of pixel P(0, 0) fills the space between color dots CD_1_3 and CD_2_3 of pixel P(0, 1); color dot CD_2_1 of pixel P(0, 0) fills the space between color dots CD_2_3 and CD_3_3 of pixel P(0, 1); color CD_3_1 of pixel P(0, 0) fills the space adjacent to color dots CD_3_3 and CD_3_4 of pixel P(0, 1); color dot CD_1_2 of pixel P(0, 0) fills the space adjacent to color dots CD_1_3 and CD_1_4 of pixel P(0, 1); color dot CD_2_2 of pixel P(0, 0) fills the space in between color dots CD_1_4 and CD_2_4 of pixel P(0, 1); and color dot CD_3_2 of pixel P(0, 0) fills the space between color dots CD_2_4, and CD_3_4 of pixel P(0, 1). The other spaces in pixel P(0, 1)

are filled by color dots from pixel P(0, 2). Specifically, color dots CD_1_3, CD_2_3, CD_2_4 and CD_3_4 of pixel P(0, 2) fill spaces between color dots CD_1_1 and CD_2_1 of pixel P(0, 1); between color dots CD_2_1 and CD_3_1 of pixel P(0, 1); between color dots CD_1_2 and CD_2_2 of pixel P(0, 1); and between color dots CD_2_2 and CD_3_2 of pixel P(0, 1), respectively. Furthermore, color dot CD_3_3 of pixel P(0, 2) fills the space adjacent to color dots CD_3_1 and CD_3_2 of pixel P(0, 1) and color dot CD_1_4 of pixel P(0, 2) fills the space adjacent to color dots CD_1_1 and CD_1_2 of pixel P(0, 1). Similarly, the color dots of pixel P(0, 1) occupy spaces within pixels P(0, 0) and P(0, 2).

The embodiment of FIG. 14(b) should use rows with alternating dot polarity to achieve a checkerboard pattern of dot polarities. Specifically, even-numbered rows of pixels should be of one polarity and odd-numbered rows of pixels should be of the second polarity. As explained above, the dot polarities of the pixels switch with each frame. Thus, for example FIG. 14(b) shows pixels in row 0 and row 2 (i.e. the even-numbered rows) with negative dot polarity, while pixels in row one (i.e. the odd-numbered rows) have positive dot polarity. However, during the next frame, the pixels in even-numbered rows would have positive dot polarity and the pixels in odd numbered rows would have negative dot polarity. Using the same principles described above one skilled in the art can adapt the teachings presented herein or use with displays using other interleaving schemes with multiple pixel designs.

Figure 15:
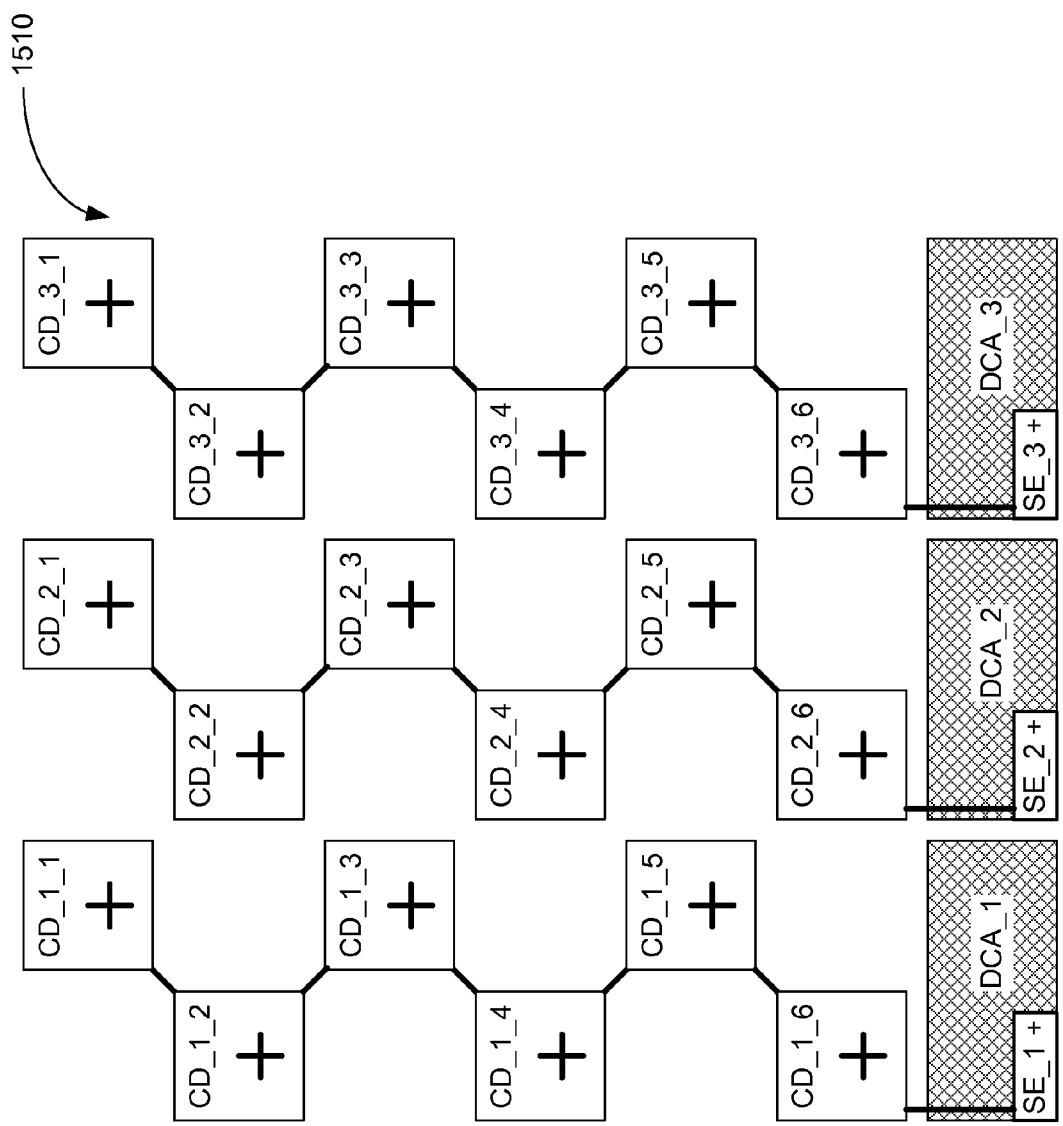
FIG. 15 illustrates a spread pixel design in accordance with one embodiment of the present invention.

FIG. 15 shows a spread pixel design in accordance with another embodiment of the present invention. Specifically, FIG. 15 shows a spread pixel 1510, in which each of the three color components of pixel 1510 is divided into 6 color dots. Color dots CD_1_1 (i.e., the first color dot of color component 1), CD_2_1 (i.e., the first color dot of the second color component), and CD_3_1 (i.e., the first color dot of the third color component) form the first row of pixel 1510. However, these color dots are separated from each other by at least the width of a color dot to allow interleaving with color dots of other pixels. Color dots CD_1_2, CD_2_2, and CD_3_2 form a second row of pixel 1510. Like the first row of color dots, color dots CD_1_2, CD_2_2, and CD_3_2, are separated from each other by at least the width of a color dot. Furthermore, the second row of spread pixel 1510 is offset from the first row so that color dot CD_2_2 is adjacent to the space between color dots CD_1_1 and CD_2_1. Color dots CD_1_3, CD_2_3, and CD_3_3, form the third row of pixel 1510, and are separated from each other by at least the width of a color dot. However the third row is aligned with the first row so that color dot CD_1_3 is adjacent to the space between color dots CD_1_2 and CD_2_2. Color dots CD_1_4, CD_2_4, and CD_3_4, form the fourth row of pixel 1510, and are separated from each other by at least the width of a color dot. However the fourth row is aligned with the second row so that color dot CD_2_4 is adjacent to the space between color dots CD_1_3 and CD_2_3. Color dots CD_1_5, CD_2_5, and CD_3_5, form the fifth row of pixel 1510, and are separated from each other by at least the width of a color dot. However the fifth row is aligned with the first row so that color dot CD_1_5 is adjacent to the space between color dots CD_1_4 and CD_2_4. Color dots CD_1_6, CD_2_6, and CD_3_6, form the sixth row of pixel 1510, and are separated from each other by at least the width of a color dot. However the sixth row is aligned with the fourth row so that color dot CD_2_6 is adjacent to the space between color dots CD_1_5 and CD_2_5. Pixel design 150 includes device component areas DCA_1, DCA_2, and DCA_3 forming a device component area row as the seventh row. Device component areas DCA_1, DCA_2 and DCA_3 have a width equal to two times the color dot width plus the horizontal dot spacing. The device component area row (i.e. the seventh row) is horizontally aligned with the second, fourth and sixth row. Switching elements SE_1, SE_2, and SE_3 are located within device component areas DCA_1, DCA_2, and DCA_3, respectively. Switching element SE_1 is coupled to the electrodes of the color dots CD_1_1, CD_1_2, CD_1_3, CD_1_4, CD_1_5 and CD_1_6. Switching element SE_2 is coupled to the electrodes of the color dots CD_2_1, CD_2_2, CD_2_3, CD_2_4, CD_2_5 and CD_2_6. Switching element SE_3 is coupled to the electrodes of the color dots CD_3_1, CD_3_2, CD_3_3, CD_3_4, CD_3_5 and CD_3_6.

In other words, the first color component of spread pixel 1510 has six color dots CD_1_1, CD_1_2, CD_1_3, CD_1_4, CD_1_5, and CD_1_6 in a right-left-right-left-right-left (RL-RLRL) zigzag pattern (as used herein a right-left-right-left-right-left (RLRLRL) zigzag pattern includes a first color dot, a second color dot to the left and below the first color dot, a third color dot to the right and below the second color dot, a fourth color to the left and below the third color dot, a fifth color dot the right and below the fourth color dot, and a sixth color dot to the left and below the fifth color dot). Similarly, the second color component and third color component of pixel 1510 each has 6 color dots in a RLRLRL zigzag pattern. The color components are vertically aligned in pixel 1510 but offset horizontally by at least one pixel width. Each color component has a device component area (DCA_1, DCA_2, and DCA_3, respectively) located below and horizontally aligned with the color component. A switching element for each color component, which is coupled to the electrodes of the color dots of the color component, is located within each device component area.

Like the color dots of spread pixel 1310, the color dots of spread pixel 1510 occupy one color of a checkerboard pattern, i.e., none of color dots of spread pixel 1510 share a common side. The primary advantage of this arrangement is that the polarity of all the color dots of spread pixel 1510 can be the same. Thus, as shown in FIG. 15, the positive dot polarity pattern of spread pixel 1510 has positive polarity for all the color dots and switching elements. Conversely, the negative dot polarity pattern for spread pixel 1510 would have negative polarity for all the color dots and switching elements. A checkerboard pattern for color dot polarity for a display is formed by interleaving spread pixels as described above.

Figure 16:
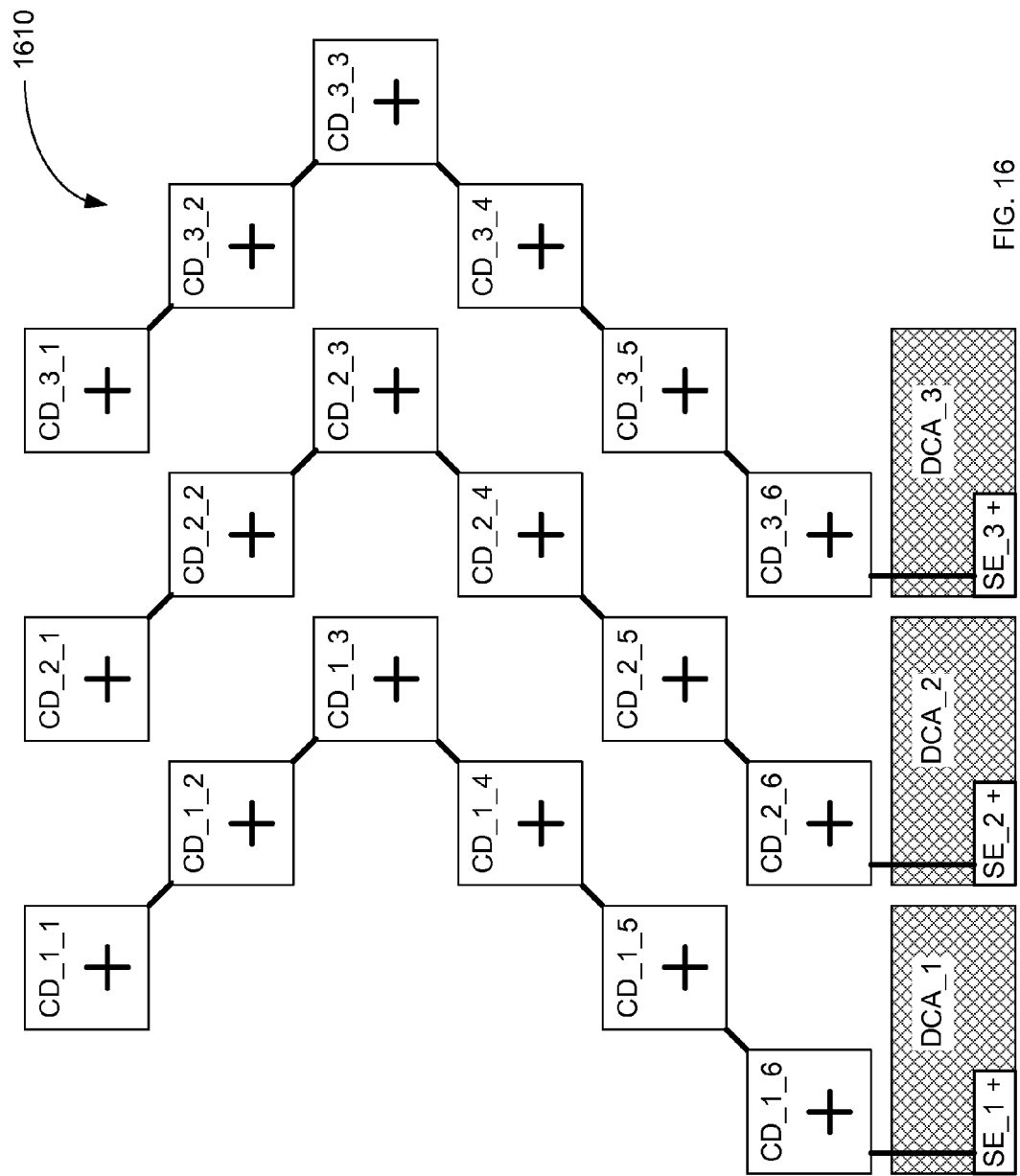
FIG. 16 illustrates a spread pixel design in accordance with one embodiment of the present invention.

FIG. 16 shows a spread pixel design in accordance with another embodiment of the present invention. Specifically, FIG. 16 shows a spread pixel design 1610, in which each of the three color components of pixel 1610 is divided into 6 color dots. Color dots CD_1_1 (i.e., the first color dot of color component 1), CD_2_1 (i.e., the first color dot of the second color component), and CD_3_1 (i.e., the first color dot of the third color component) form the first row of pixel 1610. However, these color dots are separated from each other by at least the width of a color dot to allow interleaving with color dots of other pixels. Color dots CD_1_2, CD_2_2, and CD_3_2 form a second row of pixel 1610. Like the first row of color dots, color dots CD_1_2, CD_2_2, and CD_3_2, are separated from each other by at least the width of a color dot. Furthermore, the second row of spread pixel 1610 is offset from the first row so that color dot CD_1_2 is adjacent to the space between color dots CD_1_1 and CD_2_1. Color dots CD_1_3, CD_2_3, and CD_3_3, form the third row of pixel 1610, and are separated from each other by at least the width of a color dot. However the third row is offset from both the first row and the second row so that color dot CD_1_3 is adjacent to the space between color dots CD_1_2 and CD_2_2. Color dots CD_1_4, CD_2_4, and CD_3_4, form the fourth row of pixel 1610, and are separated from each other by at least the width of a color dot. However the fourth row is aligned with the second row so that color dot CD_2_4 is adjacent to the space between color dots CD_1_3 and CD_2_3. Color dots CD_1_5, CD_2_5, and CD_3_5, form the fifth row of pixel 1610, and are separated from each other by at least the width of a color dot. However the fifth row is aligned with the first row so that color dot CD_2_5 is adjacent to the space between color dots CD_1_4 and CD_2_4. Color dots CD_1_6, CD_2_6, and CD_3_6, form the sixth row of pixel 1610, and are separated from each other by at least the width of a color dot. However the sixth row is offset from the other rows so that color dot CD_2_6 is adjacent to the space between color dots CD_1_5 and CD_2_5. Pixel design 1610 includes device component areas DCA_1, DCA_2, and DCA_3 forming a device component area row as the seventh row. Device component areas DCA_1, DCA_2 and DCA_3 have a width equal to two times the color dot width plus the horizontal dot spacing. The device component area row (i.e. the seventh row) is horizontally aligned with the sixth row. Switching elements SE_1, SE_2, and SE_3 are located within device component areas DCA_1, DCA_2, and DCA_3, respectively. Switching element SE_1 is coupled to the electrodes of the color dots CD_1_1, CD_1_2, CD_1_3, CD_1_4, CD_1_5 and CD_1_6. Switching element SE_2 is coupled to the electrodes of the color dots CD_2_1, CD_2_2, CD_2_3, CD_2_4, CD_2_5 and CD_2_6. Switching element SE_3 is coupled to the electrodes of the color dots CD_3_1, CD_3_2, CD_3_3, CD_3_4, CD_3_5 and CD_3_6.

In other words, the first color component of spread pixel 1610 has six color dots CD_1_1, CD_1_2, CD_1_3, CD_1_4, CD_1_5, and CD_1_6 in a left-right-right-left-left-left (LRRLLL) zigzag pattern (as used herein a left-right-right-left-left-left (LRRLLL) zigzag pattern includes a first color dot, a second color dot to the right and below the first color dot, a third color dot to the right and below the second color dot, a fourth color to the left and below the third color dot, a fifth color dot the left and below the fourth color dot, and a sixth color dot to the left and below the fifth color dot). Similarly, the second color component and third color component of pixel 1610 each has 6 color dots in a LRRLLL zigzag pattern. The color components are vertically aligned in pixel 1610 but offset horizontally by at least one pixel width. Each color component has a device component area (DCA_1, DCA_2, and DCA_3, respectively) located below the color component. The left side of the device component area of each color component is horizontally aligned with the left side of the sixth color dot of each color component. A switching element for each color component, which is coupled to the electrodes of the color dots of the color component, is located within each device component area.

Like the color dots of spread pixel 1310, the color dots of spread pixel 1610 occupy one color of a checkerboard pattern, i.e., none of color dots of spread pixel 1610 share a common side. The primary advantage of this arrangement is that the polarity of all the color dots of spread pixel 1610 can be the same. Thus, as shown in FIG. 16, the positive dot polarity pattern of spread pixel 1610 has positive polarity for all the color dots. Conversely, the negative dot polarity pattern for spread pixel 1610 would have negative polarity for all the color dots. A checkerboard pattern for color dot polarity is formed for a display by interleaving spread pixels as described above.

Figures 17C, 17D:
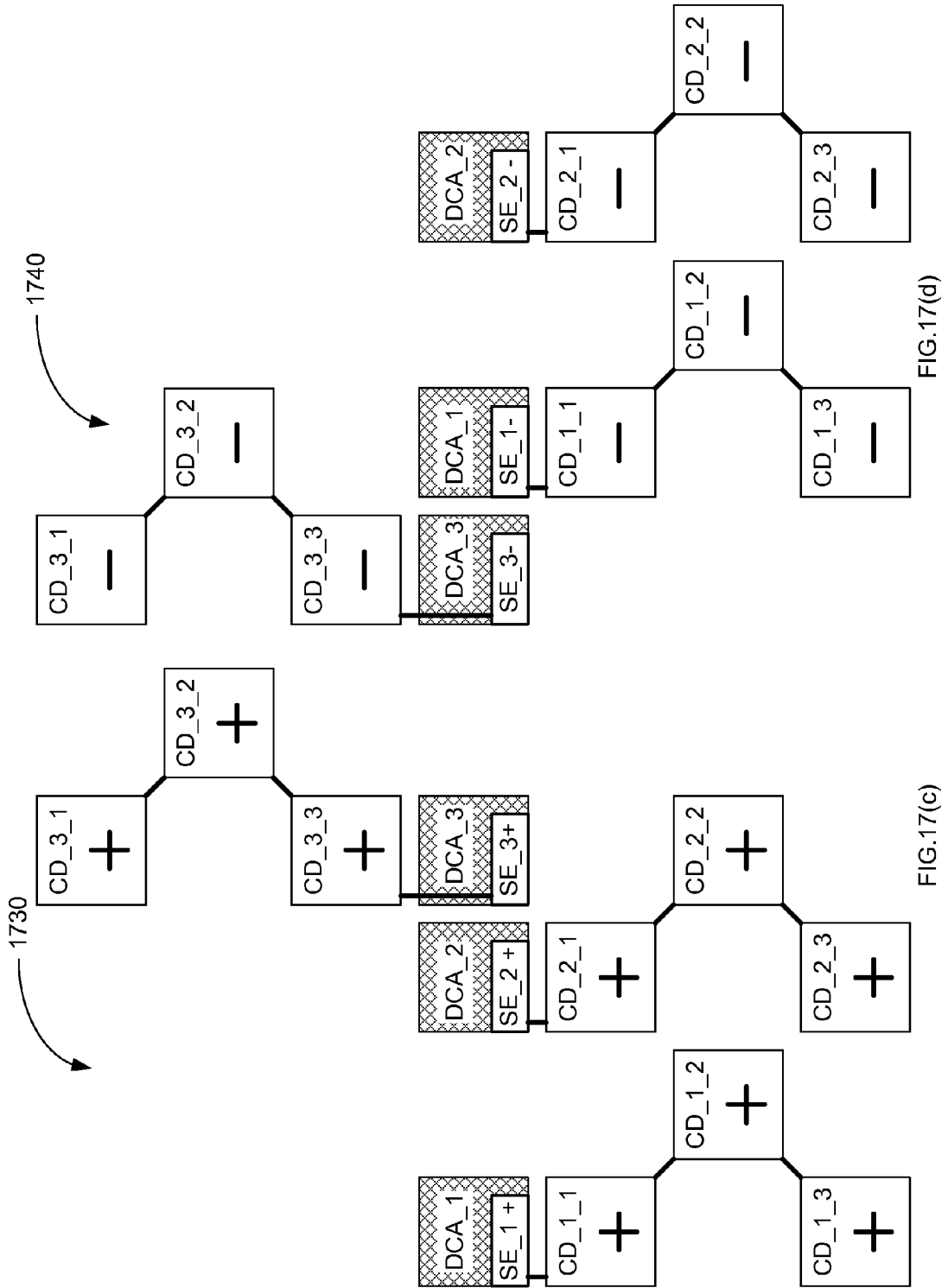
Figure 17E:
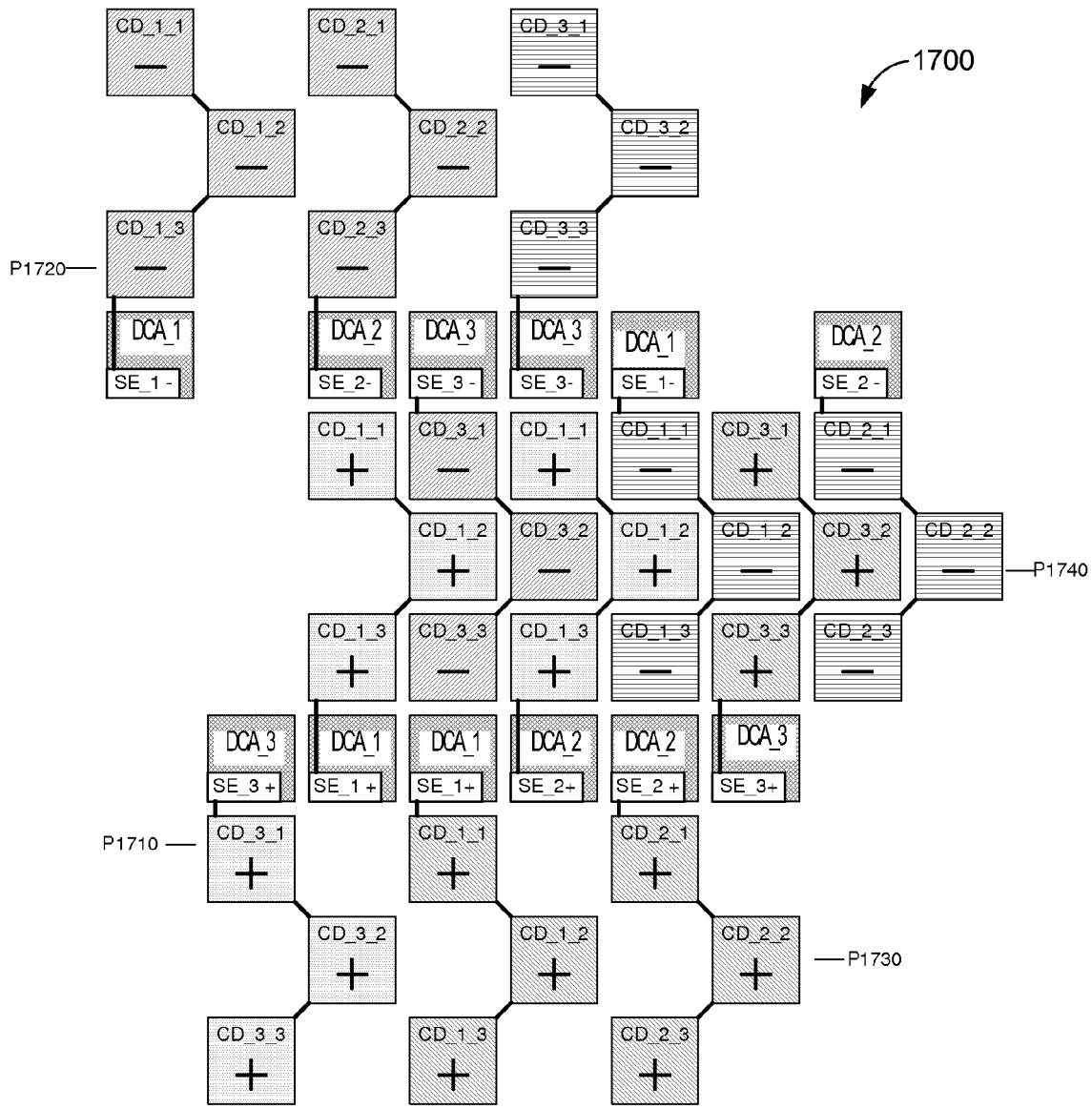
FIG. 17(e) illustrates the use of multiple spread pixel designs in a single display.

FIGS. 17(*a*)-17(*d*) show additional spread pixels in accordance with other embodiments of the present invention. In the embodiments of FIGS. 17(*a*)-17(*d*) each color component has zigzag pattern as described in detail below. The zigzag pattern of a first color component is vertically aligned with the zigzag pattern of a second color component. The zigzag pattern of the third color component offset vertically from the first and second color component.

FIG. 17(*a*) shows a spread pixel design 1710 in which each of the three color components of pixel design 1710 is divided into 3 color dots. Color dots CD_1_1 (i.e., the first color dot of color component 1) and CD_2_1 (i.e., the first color dot of the second color component) form the first row of pixel design 1710. However, these color dots are separated from each other by at least the width of a color dot to allow interleaving with color dots of other pixels. Color dots CD_1_2 and CD_2_2, form a second row of pixel 1710. Like the first row of color dots, color dots CD_1_2 and CD_2_2 are separated from each other by at least the width of a color dot. Furthermore, the second row of spread pixel 1710 is offset from the first row so that color dot CD_1_2 is adjacent to the space between color dots CD_1_1 and CD_2_1. Color dots CD_1_3 and CD_2_3 form the third row of pixel design 1710, and are separated from each other by at least the width of a color dot. However the third row is offset from the second row so that color dot CD_2_3 is adjacent to the space between color dots CD_1_2 and CD_2_2. A device component area row, having device component areas DCA_1, DCA_2, and DCA_3 forms the fourth row of pixel design 1710. Specifically, device component areas DCA_1 is horizontally aligned with and below color dot CD_1_3. Device component area DCA_2 is horizontally aligned with and below color dot CD_2_3. Device component area DCA_3 is located left of device component area DCA_1. Thus from left to right, the device component area row has device component area DCA_3, device component area DCA_1, a space, and device component area DCA_2. Color dot CD_3_1 forms the fifth row of pixel 1710 and is below device component area DCA_3. Color dot CD_3_2 forms the sixth row of pixel design 1710 and is to the left of and below color dot CD_3_1. Color dot CD_3_3 forms the seventh row of pixel design 1710 and is to the right and below color dot CD_3_2. Switching elements SE_1, SE_2, and SE_3 are located within device component areas DCA_1, DCA_2, and DCA_3, respectively. Switching element SE_1 is coupled to the electrodes of the color dots CD_1_1, CD_1_2, and CD_1_3. Switching element SE_2 is coupled to the electrodes of the color dots CD_2_1, CD_2_2, and CD_2_3. Switching element SE_3 is coupled to the electrodes of the color dots CD_3_1, CD_3_2, and CD_3_3.

In other words, the first color component of spread pixel 1710 has three color dots CD_1_1, CD_1_2, and CD_1_3 in a left-right-left zigzag pattern (as used herein a left-right-left zigzag pattern includes a first color dot, a second color dot to the right and below the first color dot, and a third color to the left of and below the second color dot); the second color component of spread pixel 1710 has three color dots CD_2_1, CD_2_2, and CD_2_3 in a left-right-left zigzag pattern; and the third color component of spread pixel 1710 has three color dots CD_3_1, CD_3_2, and CD_3_3 in a left-right-left zigzag pattern. The first color component is aligned vertically with the second color component but is offset horizontally by at least the width of two color dots. However, the third color component is offset vertically below the first and second color. A device component area row is located between the third color component and the first and second color components. Furthermore, the third color component is horizontally offset to the left of the first color component by at least the width of one color dot. The device component area row includes device component area DCA_3, which is horizontally aligned with and above the first color dot of the third color component, device component area DCA_1, which is located horizontally aligned with and below the third color dot of the first color component, and device component area DCA_2, which is located horizontally aligned with and below the third color dot of the second color component. Switching elements SE_1, SE_2, and SE_3, which are located within device component areas DCA_1, DCA_2, and DCA_3, respectively, are coupled to the electrodes of the color dots of the first, second and third color components, respectively.

Like the color dots of spread pixel 1310, the color dots of spread pixel 1710 occupy one color of a checkerboard pattern of the color dots (i.e. ignoring the device component areas). The primary advantage of this arrangement is that the polarity of all the color dots of spread pixel 1710 can be the same. Thus, as shown in FIG. 17(*a*), the positive dot polarity pattern of spread pixel 1710 has positive polarity for all the color dots and switching elements. Conversely, the negative dot polarity pattern for spread pixel 1710 would have negative polarity for all the color dots and switching elements. A checkerboard pattern for color dot polarity is formed for a display by interleaving spread pixels as described below.

FIG. 17(*b*) shows a spread pixel design 1720 in which each of the three color components of pixel design 1720 is divided into 3 color dots. Color dots CD_1_1 (i.e., the first color dot of color component 1) and CD_2_1 (i.e., the first color dot of the second color component) form the first row of pixel design 1720. However, these color dots are separated from each other by at least the width of a color dot to allow interleaving with color dots of other pixels. Color dots CD_1_2 and CD_2_2, form a second row of pixel design 1720. Like the first row of color dots, color dots CD_1_2 and CD_2_2 are separated from each other by at least the width of a color dot. Furthermore, the second row of spread pixel design 1720 is offset from the first row so that color dot CD_1_2 is adjacent to the space between color dots CD_1_1 and CD_2_1. Color dots CD_1_3 and CD_2_3 form the third row of pixel design 1720, and are separated from each other by at least the width of a color dot. However the third row is offset from the second row so that color dot CD_2_3 is adjacent to the space between color dots CD_1_2 and CD_2_2. A device component area row, having device component areas DCA_1, DCA_2, and DCA_3 forms the fourth row of pixel design 1720. Specifically, device component areas DCA_1 is horizontally aligned with and below color dot CD_1_3. Device component area DCA_2 is horizontally aligned with and below color dot CD_2_3. Device component area DCA_3 is located to the right of device component area DCA_2. Thus from left to right, the device component area row has device component area DCA_1, a space, device component area DCA_2, and device component area DCA_3. Color dot CD_3_1 forms the fifth row of pixel design 1720 and is located horizontally aligned with and below device component area DCA_3. Color dot CD_3_2 forms the sixth row of pixel design 1720 and is to the right and below color dot CD_3_1. Color dot CD_3_3 forms the seventh row of pixel design 1720 and is to the left of and below color dot CD_3_2.

In other words, the first color component of spread pixel 1720 has three color dots CD_1_1, CD_1_2, and CD_1_3 in a left-right-left zigzag pattern; the second color component of spread pixel 1720 has three color dots CD_2_1, CD_2_2, and CD_2_3 in a left-right-left zigzag pattern; and the third color component of spread pixel 1720 has three color dots CD_3_1, CD_3_2, and CD_3_3 in a left-right-left zigzag pattern. The first color component is aligned vertically with the second color component but is offset horizontally by at least the width of two color dots. However, the third color component is offset vertically below the first and second color component. A device component area row is located between the third color component and the first and second color components. Furthermore, the third color component is horizontally offset to the right of the first color component by at least the width of one color dot. The device component area row includes device component area DCA_1, which is located horizontally aligned with and below the third color dot of the first color component, device component area DCA_2, which is located horizontally aligned with and below the third color dot of the second color component, and device component area DCA_3, which is horizontally aligned with and above the first color dot of the third color component, Switching elements SE_1, SE_2, and SE_3, which are located within device component areas DCA_1, DCA_2, and DCA_3, respectively, are coupled to the electrodes of the color dots of the first, second and third color components, respectively.

Like the color dots of spread pixel 1310, the color dots of spread pixel design 1720 occupy one color of a checkerboard pattern of color dots. The primary advantage of this arrangement is that the polarity of all the color dots of spread pixel design 1720 can be the same. Thus, as shown in FIG. 17(*b*), the negative dot polarity pattern of spread pixel design 1720 has negative polarity for all the color dots and switching elements. Conversely, the positive dot polarity pattern for spread pixel design 1720 would have positive polarity for all the color dots and switching elements. A checkerboard pattern for color dot polarity is formed for a display by interleaving spread pixels as described below.

FIG. 17(*c*) shows a spread pixel 1730 in which each of the three color components of pixel 1730 is divided into 3 color dots. Color dot CD_3_1 forms the first row of pixel 1730. Color dot CD_3_2 forms the second row of pixel 1730 and is to the right and below color dot CD_3_1. Color dot CD_3_3 forms the 3rd row of pixel 1730 and is to the left of and below color dot CD_3_2. A device component area row, having device component areas DCA_1, DCA_2, and DCA_3 forms the fourth row of pixel design 1730. Specifically, device component areas DCA_3 is horizontally aligned with and below color dot CD_3_3. Device component area DCA_2 is left of device component area DCA_3. Device component area DCA_1 is located to the left of device component area DCA_2 and separated from device component area DCA_2 by at least the width of a device component area. Thus from left to right, the device component area row has device component area DCA_1, a space, device component area DCA_2, and device component area DCA_3. Color dots CD_1_1 and CD_2_1 form the fifth row of pixel design 1730. However, these color dots are separated from each other by at least the width of a color dot to allow interleaving with color dots of other pixels. The fifth row is located so that color dots CD_1_1 and CD_2_1 are horizontally aligned with device component areas DCA_1 and DCA_2, respectively. Color dots CD_1_2 and CD_2_2 form a sixth row of pixel design 1730. Like the fifth row of color dots, color dots CD_1_2 and CD_2_2 are separated from each other by at least the width of a color dot. Furthermore, the fifth row of spread pixel design 1730 is offset from the fourth row so that color dot CD_1_2 is adjacent to the space between color dots CD_1_1 and CD_2_1. Color dots CD_1_3 and CD_2_3 form the seventh row of pixel design 1730, and are separated from each other by at least the width of a color dot. However the seventh row is offset from the sixth row so that color dot CD_2_3 is adjacent to the space between color dots CD_1_2 and CD_2_2. Switching elements SE_1, SE_2, and SE_3 are located within device component areas DCA_1, DCA_2, and DCA_3, respectively. Switching element SE_1 is coupled to the electrodes of the color dots CD_1_1, CD_1_2, and CD_1_3. Switching element SE_2 is coupled to the electrodes of the color dots CD_2_1, CD_2_2, and CD_2_3. Switching element SE_3 is coupled to the electrodes of the color dots CD_3_1, CD_3_2, and CD_3_3.

In other words, the first color component of spread pixel 1730 has three color dots CD_1_1, CD_1_2, and CD_1_3 in a left-right-left zigzag pattern; the second color component of spread pixel 1730 has three color dots CD_2_1, CD_2_2, and CD_2_3 in a left-right-left zigzag pattern; and the third color component of spread pixel 1730 has three color dots CD_3_1, CD_3_2, and CD_3_3 in a left-right-left zigzag pattern. The first color component is aligned vertically with the second color component but is offset horizontally by at least the width of two color dots. However, the third color component is offset vertically above the first and second color component. A device component area row is located between the third color component and the first and second color components. Furthermore, the third color component is horizontally offset to the right of the second color component by at least the width of one color dot. The device component area row includes device component area DCA_1, which is located horizontally aligned with and above the first color dot of the first color component, device component area DCA_2, which is located horizontally aligned with and above the first color dot of the second color component, and device component area DCA_3, which is horizontally aligned with and below the third color dot of the third color component, Switching elements SE_1, SE_2, and SE_3, which are located within device component areas DCA_1, DCA_2, and DCA_3, respectively, are coupled to the electrodes of the color dots of the first, second and third color components, respectively.

As shown in FIG. 17(c), the positive dot polarity pattern of spread pixel design 1730 has positive polarity for all the color dots switching elements. Conversely, the negative dot polarity pattern for spread pixel design 1730 would have negative polarity for all the color dots and switching elements. A checkerboard pattern for color dot polarity is formed for a display by interleaving spread pixels as described below.

FIG. 17(d) shows a spread pixel design 1740 in which each of the three color components of pixel design 1740 is divided into 3 color dots. Color dot CD_3_1 forms the first row of pixel design 1740. Color dot CD_3_2 forms the second row of pixel 1740 and is to the right and below color dot CD_3_1. Color dot CD_3_3 forms the 3rd row of pixel design 1740 and is to the left of and below color dot CD_3_2. A device component area row, having device component areas DCA_1, DCA_2, and DCA_3 forms the fourth row of pixel design 1740. Specifically, device component areas DCA_3 is horizontally aligned with and below color dot CD_3_3. Device component area DCA_1 is adjacent to (on the right side of) device component area DCA_3. Device component area DCA_2 is located to the right of device component area DCA_1 and separated by at least the width of a device component area (thus forming a space between device component areas DCA_1 and DCA_2). Thus from left to right, the device component area row has device component area DCA_3, device component area DCA_1, a space, and device component area DCA_2. Color dots CD_1_1 and CD_2_1 form the fifth row of pixel design 1740. However, these color dots are separated from each other by at least the width of a color dot to allow interleaving with color dots of other pixels. The fifth row is offset from the fourth row so that color dots CD_1_1 and CD_2_1 are horizontally aligned with device component areas DCA_1 and DCA_2. Color dots CD_1_2 and CD_2_2 form a sixth row of pixel design 1740. Color dots CD_1_2 and CD_2_2 are separated from each other by at least the width of a color dot. Furthermore, the sixth row of spread pixel 1740 is offset from the fifth row so that color dot CD_1_2 is adjacent to the space between color dots CD_1_1 and CD_2_1. Color dots CD_1_3 and CD_2_3 form the seventh row of pixel 1740, and are separated from each other by at least the width of a color dot. However the seventh row is offset from the sixth row so that color dot CD_2_3 is adjacent to the space between color dots CD_1_2 and CD_2_2. Switching elements SE_1, SE_2, and SE_3 are located within device component areas DCA_1, DCA_2, and DCA_3, respectively. Switching element SE_1 is coupled to the electrodes of the color dots CD_1_1, CD_1_2, and CD_1_3. Switching element SE_2 is coupled to the electrodes of the color dots CD_2_1, CD_2_2, and CD_2_3. Switching element SE_3 is coupled to the electrodes of the color dots CD_3_1, CD_3_2, and CD_3_3.

In other words, the first color component of spread pixel 1730 has three color dots CD_1_1, CD_1_2, and CD_1_3 in a left-right-left zigzag pattern; the second color component of spread pixel 1730 has three color dots CD_2_1, CD_2_2, and CD_2_3 in a left-right-left zigzag pattern; and the third color component of spread pixel 1730 has three color dots CD_3_1, CD_3_2, and CD_3_3 in a left-right-left zigzag pattern. The first color component is aligned vertically with the second color component but is offset horizontally by at least the width of two color dots. However, the third color component is offset vertically above the first and second color component by at least the height of the color components. A device component area row is located between the third color component and the first and second color components. Furthermore, the third color component is horizontally offset to the left of the second color component by at least the width of one color dot. The device component area row includes device component area DCA_1, which is located horizontally aligned with and above the first color dot of the first color component, device component area DCA_2, which is located horizontally aligned with and above the first color dot of the second color component, and device component area DCA_3, which is horizontally aligned with and below the third color dot of the third color component, switching elements SE_1, SE_2, and SE_3, which are located within device component areas DCA_1, DCA_2, and DCA_3, respectively, are coupled to the electrodes of the color dots of the first, second and third color components, respectively.

As shown in FIG. 17(d), the negative dot polarity pattern of spread pixel design 1740 has negative polarity for all the color dots and switching elements. Conversely, the positive dot polarity pattern for spread pixel 1740 would have positive polarity for all the color dots and switching elements. A checkerboard pattern for color dot polarity is formed for a display by interleaving spread pixels as described below.

In one embodiment of the present invention, a display using spread pixels 1710, 1720, 1730 and 1740 would use row interleaving and is similar in concept to FIG. 13(b). Specifically, pixels using spread pixel designs 1710 and 1730 would have a first polarity while pixels using spread pixels design 1720 and 1740 would have the opposite polarity. The third color component of a pixel using spread pixel design 1720 is placed in between the first and second color component of a pixel using spread pixel design 1710. Similarly, the third color components of a pixel using spread pixel design 1710 is placed in between the first and second color component of a pixel using spread pixel design 1720. Pixels using spread pixel designs 1730 and 1740 have the same arrangement as pixels using spread pixel designs 1710 and 1720. The first color component of pixels using spread pixel design 1730 are vertically aligned with the third color component of pixels using spread pixel design 1710 and offset horizontally by at least the width of two color dots. Similarly, the first color component of pixels using spread pixel design 1740 are vertically aligned with the third color component of pixels using spread pixel design 1720 and offset horizontally by at least the width of two color dots. FIG. 17(*e*) illustrates this arrangement with pixels P1710, P1720, P1730, and P1740. Pixel P1710, which uses spread pixel design 1710, is shown with doted shading marks. Pixel P1720, which uses spread pixel design 1720 is shown with left to right top to bottom diagonal line shading. Pixel P1730, which uses spread pixel design 1730 is shown with right to left top to bottom diagonal line shading. Pixel P1740, which uses spread pixel design 1740, is shown with vertical line shading.

FIGS. 18(*a*) and 18(*b*) show the positive and negative dot polarities of a spread pixel design 1810 in accordance with another embodiment of the present invention. Specifically, FIG. 18(*a*) shows the positive dot polarity of spread pixel 1810+. The first color component of spread pixel 1810 has three color dots CD_1_1, CD_1_2, and CD_1_3 in a left-right-left zigzag pattern the second color component of spread pixel 1810 has three color dots CD_2_1, CD_2_2, and CD_2_3 in a left-right-let zigzag pattern; and the third color component of spread pixel 1810 has three color dots CD_3_1, CD_3_2, and CD_3_3 in a left-right-left zigzag pattern. The first color component is aligned vertically with the second color component but is offset horizontally by at least the width of two color dots. However, the third color component is offset vertically above the first and second color component by at least the height of the color components. Furthermore, the third color component is horizontally offset to the right of the first color component by at least the width of one color dot. A device component area row, having device component areas DCA_1, DCA_2, and DCA_3 separate the second color component from the first and third color component. Specifically, device component areas DCA_1 is horizontally aligned with and above color dot CD_1_1. Device component areas DCA_2 is horizontally aligned with and below color dot CD_2_3. Device component areas DCA_3 is horizontally aligned with and above color dot CD_3_1. Switching elements SE_1, SE_2, and SE_3 are located within device component areas DCA_1, DCA_2, and DCA_3, respectively. Switching element SE_1 is coupled to the electrodes of the color dots CD_1_1, CD_1_2, and CD_1_3. Switching element SE_2 is coupled to the electrodes of the color dots CD_2_1, CD_2_2, and CD_2_3. Switching element SE_3 is coupled to the electrodes of the color dots CD_3_1, CD_3_2, and CD_3_3. As shown in FIG. 18(*a*), the positive dot polarity pattern of spread pixel design 1810 has positive polarity for all the color dots and switching elements. Conversely, as shown in FIG. 18(*b*), the negative dot polarity pattern for spread pixel design 1810– would have negative polarity for all the color dots and switching elements.

FIGS. 18(*c*) and 18(*d*) show the negative and positive dot polarities of a spread pixel design 1820. The first color component of spread pixel 1820 has three color dots CD_1_1, CD_1_2, and CD_1_3 in a left-right-left zigzag pattern the second color component of spread pixel 1820 has three color dots CD_2_1, CD_2_2, and CD_2_3 in a left-right-left zigzag pattern; and the third color component of spread pixel 1820 has three color dots CD_3_1, CD_3_2, and CD_3_3 in a left-right-left zigzag pattern. The first color component is aligned vertically with the second color component but is offset horizontally by at least the width of two color dots. However, the third color component is offset vertically below the first and second color component by at least the height of the color components. Furthermore, the third color component is horizontally offset to the right of the first color component by at least the width of one color dot. A device component area row, having device component areas DCA_1, DCA_2, and DCA_3 separate the second color component from the first and third color component. Specifically, device component areas DCA_1 is horizontally aligned with and below color dot CD_1_3. Device component areas DCA_2 is horizontally aligned with and above color dot CD_2_1. Device component areas DCA_3 is horizontally aligned with and below color dot CD_3_3. Switching elements SE_1, SE_2, and SE_3 are located within device component areas DCA_1, DCA_2, and DCA_3, respectively. Switching element SE_1 is coupled to the electrodes of the color dots CD_1_1, CD_1_2, and CD_1_3. Switching element SE_2 is coupled to the electrodes of the color dots CD_2_1, CD_2_2, and CD_2_3. Switching element SE_3 is coupled to the electrodes of the color dots CD_3_1, CD_3_2, and CD_3_3. As shown in FIG. 18(*c*), the negative dot polarity pattern of spread pixel design 1820 has negative polarity for all the color dots. Conversely as shown in FIG. 18(*d*), the positive dot polarity pattern for spread pixel design 1820 would have positive polarity for all the color dots. A checkerboard pattern for color dot polarity can be formed for a display by interleaving spread pixel design 1810 and 1820 using the principles described above and shown in FIG. 18(*e*).

In one embodiment of the present invention, a display using spread pixels 1810 and 1820 would use row interleaving and is similar in concept to FIG. 13(*b*). FIG. 18(*e*) is a portion of a display 1800 using pixels of spread pixel designs 1810 and 1820. Specifically, each row of display 1800 is formed by alternating spread pixel designs 1810 and 1820 (In FIG. 18(*e*) each row begins with a pixel using spread pixel design 1820). All the pixels on a row have the same dot polarity; however, alternating rows have opposite dot polarities. The third color component of a pixel using spread pixel design 1820 in a first row is placed in between the first and second color component of a pixel using spread pixel design 1820 in the next row down from the first row (i.e. the second row). Specifically, in FIG. 18(*e*), spread pixel R1P1 (i.e., the first pixel in row R1) has a third color component that is placed in between the first and third color component of spread pixel R2P1 (i.e., the first pixel in row R2 (i.e., the second row)). Conversely, the third color components of a pixel using spread pixel design 1810 in the second row is placed in between the first and second color component of a pixel using spread pixel design 1810 in the first row (i.e. the row above). For example, in FIG. 18(*e*), spread pixel R2P2 (i.e. the second pixel in row R2) has a third color component that is placed between the first and second color components of spread pixel R1P2 (i.e. the second pixel in Row R1). The rows are horizontally aligned but vertically interleaved so that the third color component of pixels using spread pixel design 1810 in the second row are vertically aligned with the first color component of pixels using spread pixel design 1810 in the first row. Similarly, the third color component of pixels using spread pixel design 1820 in the first row is vertically aligned with the first color component of pixels using spread pixel design 1820 in the second (i.e. next row). FIG. 18(*e*) illustrates this arrangement with an instances of spread pixel 1820 at pixels R1P1, R2P1, R3P1, R1P1, R1P2, and R1P3 and instance of spread pixel 1810 at pixels R1P2, R2P2, and R3P2.

FIG. 18(*f*) shows a display 1830 with source lines (S0_1, S0_2, S0_3, S1_1, S1_2, and S1_3) and gate lines (G0, G1 and G2). In general, a source line SX_Y is used for the color component Y of pixel number X of a row and a gate line GZ is used for row Z. The source terminal of a transistor is coupled to a source line and the gate terminal of the transistor is coupled to a gate line. The drain terminal of the transistor is coupled to the electrode of the various color dots. For clarity, transistors are referenced as transistor T(SX_Y, GZ) where SX_Y is the source line coupled to the transistor and GZ is the gate line coupled to the transistor. Due to space limitations in FIG. 18(f), color dots are labeled with J_K rather than CD_J_K as in the other figures. However for consistency the description shall continue to use CD_J_K. Electrode connections are drawn in bold lines. Thus for example in Pixel 1860, which is controlled by gate line G1 and source lines S0_1, S0_2, and S_03, the drain terminal of transistor T(S0_1, G1) is coupled to color dot CD_1_3, which is coupled to color dot CD_1_2, which is coupled to color dot CD_1_1. Similarly, the drain terminal of transistor T(S0_2, G1) is coupled to color dots CD_2_1, which is coupled to color dot CD_2_2, which is coupled to color dot CD_2_1 and the drain terminal of transistor T(S0_3, G1) is coupled to color dots CD_3_3, which is coupled to color dot CD_3_2, which is coupled to color dot CD_3_1. Furthermore, the gate terminals of transistors T(S0_1, G1), T(S0_2, G1), and T(SO_3, G1) are coupled to gate line G1 and the source terminals of transistors T(S0_1, G1), T(S0_2, G1), and T(SO_3, G1) are coupled to source lines S0_1, S0_2, and S0_3, respectively. Similarly, pixel 1865 is coupled to gate line G1 and source lines S1_1, S1_2, and S1_3. Pixel 2150 is coupled to gate line G2 and source lines S0_1, S0_2, and S0_3; and Pixel 2155 is coupled to gate line G0 and source lines S1_1, S1_2, and S1_3. Pixel 1870 is coupled to gate line G0 and source lines S0_1, S0_2, and S0_3; and pixel 1875 is coupled to gate line G0 and source lines S1_1, S1_2, and S1_3.

Each gate line extends from the left side of display 1830 to the right side and controls all the pixels on one row of display 1830. Display 1830 has one gate line for each row of pixels. Each source line runs from the top to the bottom of display 1830. Display 1830 has three times the number of source lines as the number of pixels on each row (i.e. one source line for each color component of each pixel). During operation only one gate line is active at a time. All transistors in the active row are rendered conductive by a positive gate impulse from the active gate line. Transistors in other rows are blocked by grounding the non-active gate lines. All source lines are active at the same time and each source line provides video data to one transistor on the active row (as controlled by the active gate line). Therefore, gate lines are often called bus lines and source lines are often called data lines due to the way the gate lines and source lines operate. The voltage charges the liquid crystal capacitor to a desired gray scale level (color is provided by color filters). When inactive, the electrodes of the color dot are electrically isolated and thus can maintain the field to control the liquid crystals. However, parasitic leakage is unavoidable and eventually the charge will dissipate. For small screens with fewer rows, the leakage is not problematic because the row is "refreshed" quite often. However, for larger displays with more rows the there is a longer period between refreshes. Thus, some embodiments of the present invention include one or more storage capacitors for each color dot. The storage capacitors are is charged with the electrode of the color dot and provides a "maintenance" charge while the row is inactive. Generally, the data lines and bus lines are manufactured using an opaque conductor, such as Aluminum (Al) or Chromium (Cr).

Figure 18D:
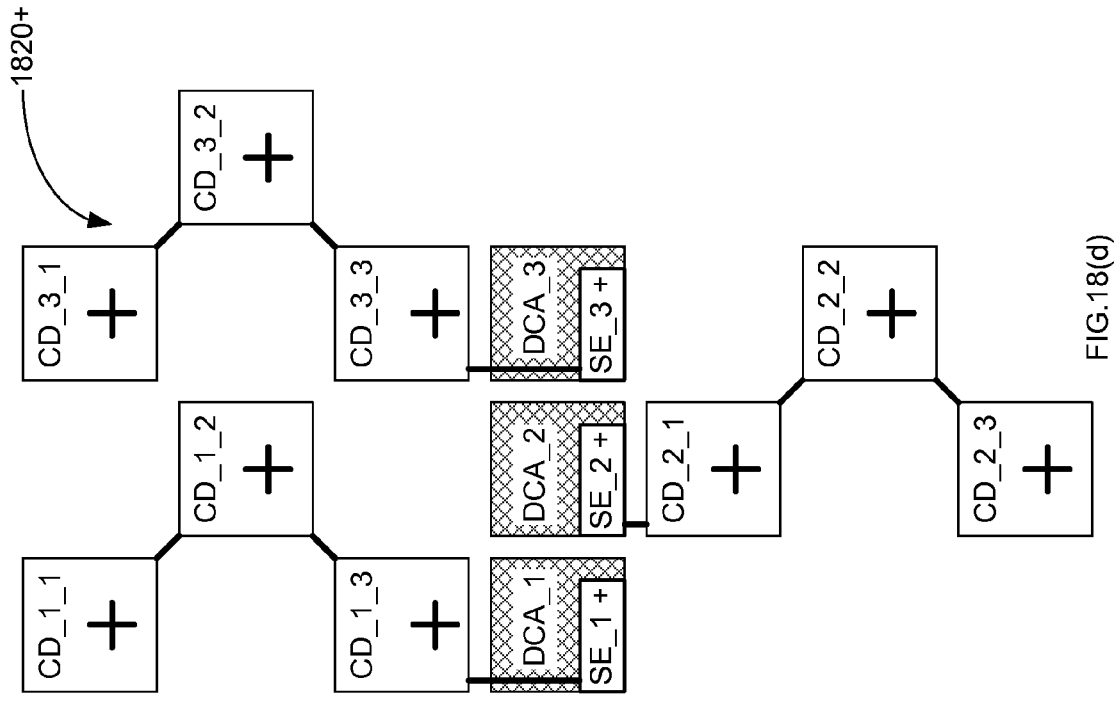
FIGS. 18(c)-18(d) illustrate spread pixel designs in accordance with different embodiments of the present invention.
Figure 18C:
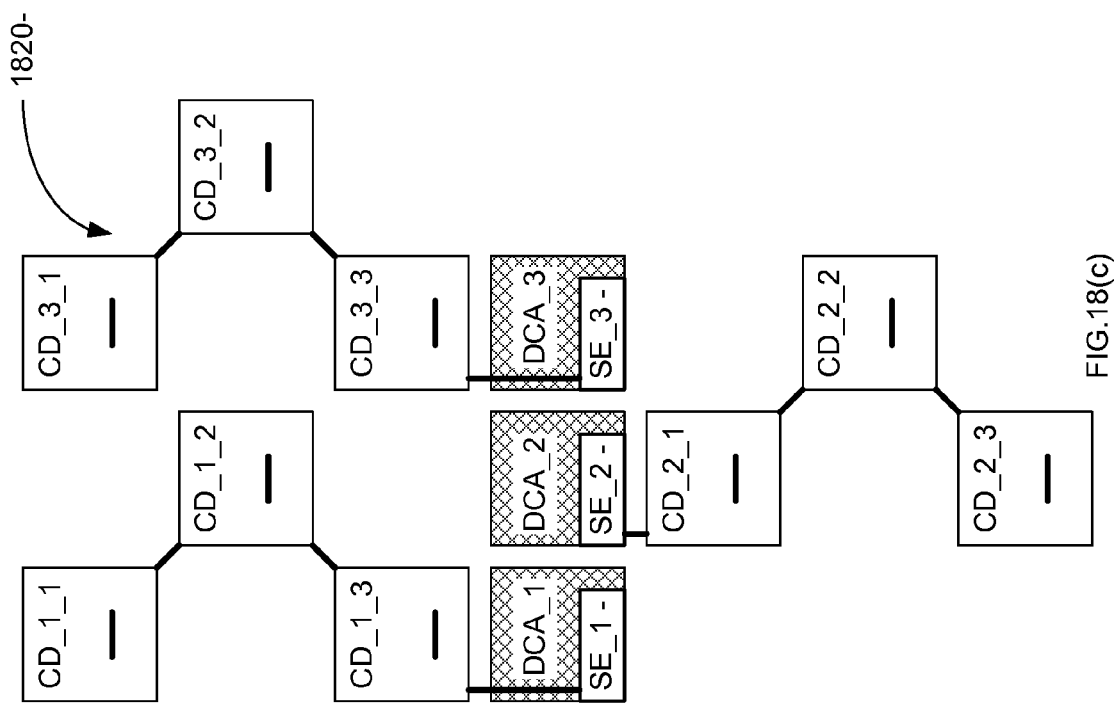
Figure 18E:
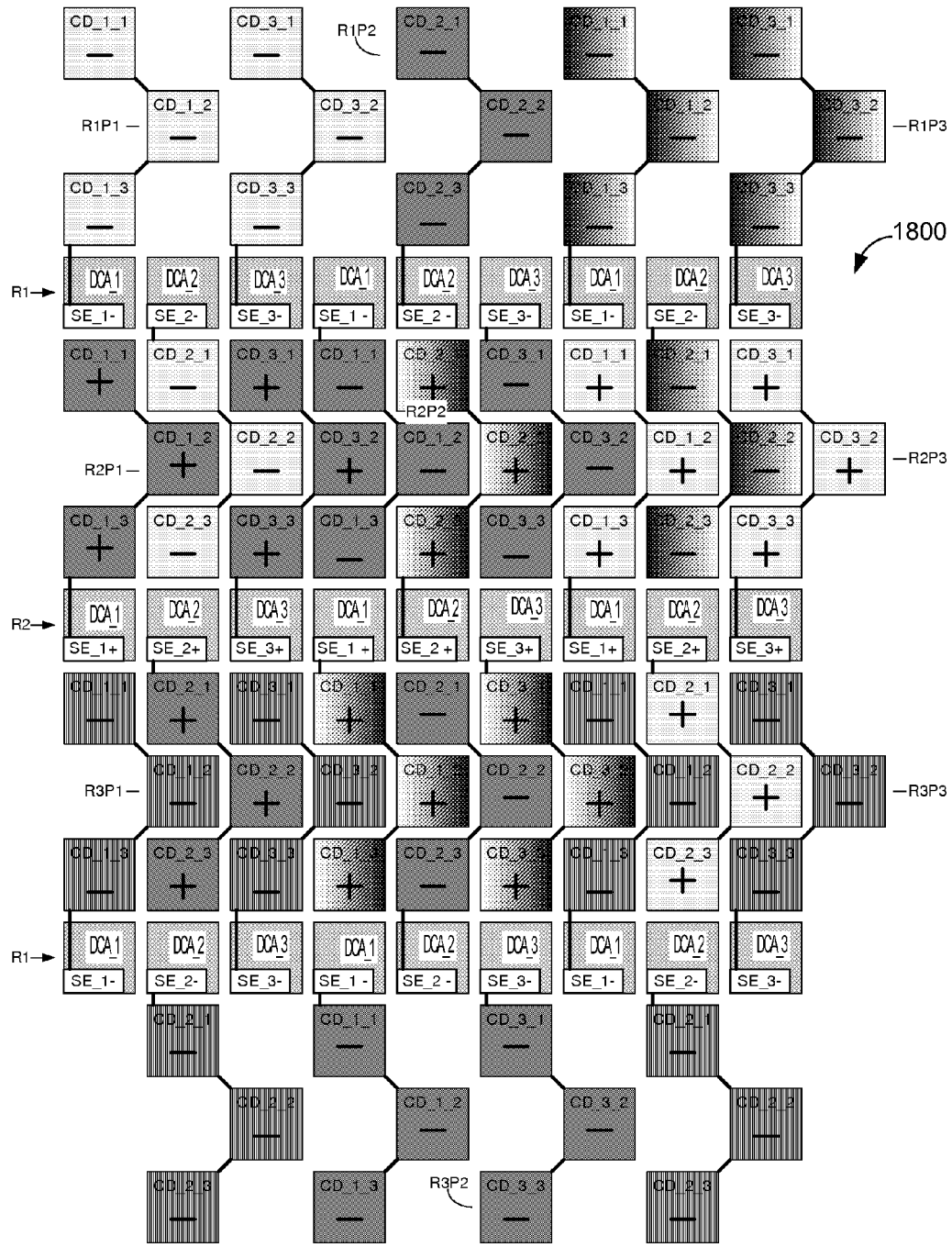
FIGS. 18(e)-18(f) illustrate the use of multiple spread pixel designs in a single display.
Figure 18F:
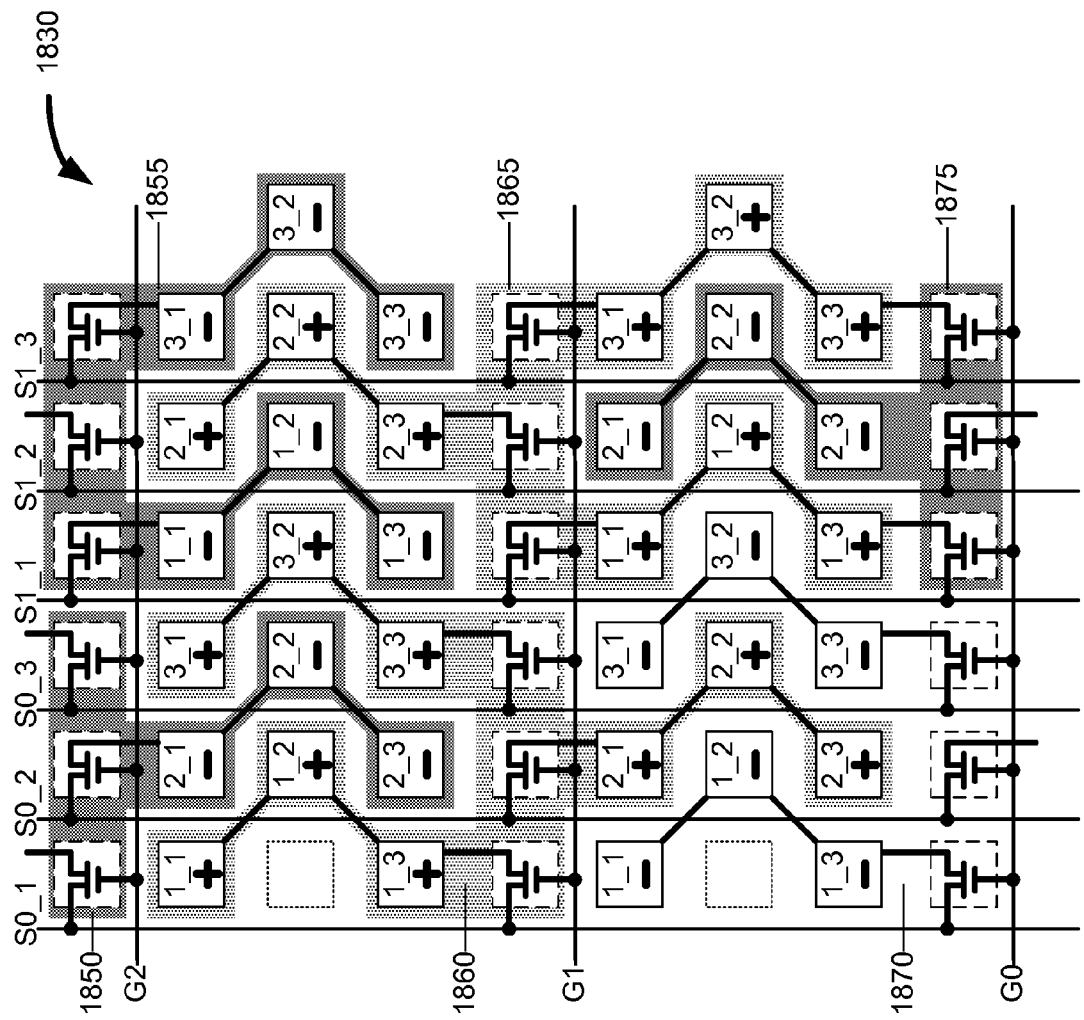

As illustrated in FIG. 18(f), the rows of transistors and device component areas segment display 1830 into regions of color dots. Within each region the color dots have a checkerboard pattern of dot polarities. As explained above, a checkerboard pattern of dot polarities is desirable to amplify the fringe fields in each color dot.

One important feature for pixel designs 1810 and 1820 is color alignment due to the vertical offset between the second color component and the first and third color components of each pixel. Therefore, pixel 1810 and 1820 are suitable for the delta type color layout which provides higher image quality than standard stripe pattern color layouts. However, stripe pattern color layout provides higher text quality than delta type color layout. For displays using the stripe pattern color layout, embodiments of the present invention include a novel driving scheme to enhance the stripe color pattern using the layouts that are used in FIGS. 14-18 for the switching element row inversion driving scheme. FIG. 19(a) illustrates a display 1900 using the novel driving scheme in accordance with one embodiment of the present invention. FIG. 19(a) is similar to FIG. 18(f) except that signals applied to some of the source lines are delayed. Thus the description is not repeated. Specifically, delayed source signal S0_2_D, S1_1_D, and S1_3_D are applied to source lines S0_2, S1_1, and S1_3, respectively. The delayed source lines can be generated using a delay line or other conventional circuits from source signals S0_2, S1_1 and S1_3 (as used in FIG. 18(f)). The delay period is equal to one row refresh period. In one embodiment of the application, the delayed source signals are generated from the normal source signals, the driving circuits and controllers do not need to modify for the use with the novel driving scheme of the present invention. In one embodiment of the application, the delayed source signals are generated from the timing controller, the driving circuits and other controllers do not need to modify for the use with the novel driving scheme of the present invention. The novel driving scheme is described in detail in copending co-owned U.S. patent application Ser. No. 11/751,469, entitled "Low Cost Switching Element Point Inversion Driving Scheme for Liquid Crystal Displays" by Hiap L. Ong.

As illustrated in FIG. 19(a), the color components of the pixels are realigned when using delayed source signals. In particular, four pixels 1950, 1955, 1960 and 1965 are illustrated in display 1900. For clarity, the area of each pixel is shaded; this shading is only for illustrative purposes in FIG. 19(a) and has no functional significance. Pixel 1950 includes transistors T(S0_1, G1), T(S0_2, G2), and T(S0_3, G1), the device component areas encompassing the transistors, as well as the color dots coupled to the transistors (in the shaded background area).

The first color component of pixel 1950 has three color dots CD_1_1, CD_1_2, and CD_1_3, arranged in a left-right-left zigzag pattern. Color dot CD_1_3 of pixel 1950 is horizontally aligned with, vertically adjacent, and above the device component area surrounding transistor T(S0_1, G1). The electrode of color dot CD_1_3 of pixel 1950 is coupled to the drain terminal of transistor T(S0_1, G1). The electrode of color dot CD_1_2 is coupled to the drain terminal of transistor T(S0_1, G1) via the electrode of color dot CD_1_3 of pixel 1950. The electrode of color dot CD_1_1 of pixel 1950 is coupled to the drain terminal of transistor T(S0_1, G1) via the electrodes of color dot CD_1_2 and CD_1_3 of pixel 1950. The second color component of pixel 1950 has three color dots CD_2_1, CD_2_2, and CD_2_3, arranged in a left-right-left zigzag pattern. Color dot CD_2_1 of pixel 1950 is horizontally aligned with, vertically adjacent, and below the device component area surrounding transistor T(S0_2, G2). The electrode of color dot CD_2_1 of pixel 1950 is coupled to the drain terminal of transistor T(S0_2, G2). The electrode of color dot CD_2_2 is coupled to the drain terminal of transistor T(S0_2, G2) via the electrode of color dot CD_2_1 of pixel 1950. The electrode of color dot CD_2_3 of pixel 1950 is coupled to the drain terminal of transistor T(S0_2, G2) via the electrodes of color dot CD_2_2 and CD_2_1 of pixel 1950. The third color component of pixel 1950 has three color dots CD_3_1, CD_3_2, and CD_3_3, arranged in a left-right-left zigzag pattern. Color dot CD_3_3 of pixel 1950 is horizontally aligned with, vertically adjacent, and above the device component area surrounding transistor T(S0_3, G1). The electrode of color dot CD_3_3 of pixel 1950 is coupled to the drain terminal of transistor T(S0_3, G1). The electrode of color dot CD_3_2 is coupled to the drain terminal of transistor T(S0_3, G1) via the electrode of color dot CD_3_3 of pixel 1950. The electrode of color dot CD_3_1 of pixel 1950 is coupled to the drain terminal of transistor T(S0_3, G1) via the electrodes of color dot CD_3_2 and CD_3_3 of pixel 1950. Pixel 1960 uses the same pixel design as pixel 1950 thus the internal connections are the same and not repeated. However, Pixel 1960 includes transistors T(S0_1, G0), T(S0_2, G1) and T(SO_3, G0) in place of transistor T(S0_1, G1), T(SO_2, G2, and T(SO_3, G1), respectively. Furthermore, in FIG. 19(*a*), pixel 1960 has negative dot polarity while pixel 1950 has positive dot polarity.

Thus, as illustrated in FIG. 19(*a*), the three color components of pixel 1950 are vertically aligned, and thus eliminate the color alignment issue of FIG. 18(*f*). However, to achieve a checkerboard pattern, the polarity of the second color component needs to be opposite the polarity of the first and third color component. However, the transistor for the second component is on a different row than the transistor for the first and third component. Furthermore, all switching elements on a row of switching elements (i.e. share a common gate line) have the same polarity, while alternating rows of switching elements use opposite polarities. Thus, display 1900 can use switching element row inversion driving scheme to achieve the checkerboard pattern of dot polarities which results in four domains per color dots.

Pixel 1955 and 1965 use a different pixel design than Pixels 1950 and 1960. The first color component of pixel 1950 has three color dots CD_1_1, CD_1_2, and CD_1_3, arranged in a left-right-left zigzag pattern. Color dot CD_1_1 of pixel 1955 is horizontally aligned with, vertically adjacent, and below the device component area surrounding transistor T(S1_1, G2). The electrode of color dot CD_1_1 of pixel 1955 is coupled to the drain terminal of transistor T(S1_1, G2). The electrode of color dot CD_1_2 is coupled to the drain terminal of transistor T(S1_1, G2) via the electrode of color dot CD_1_1 of pixel 1955. The electrode of color dot CD_1_3 of pixel 1955 is coupled to the drain terminal of transistor T(S1_1, G2) via the electrodes of color dot CD_1_2 and CD_1_1 of pixel 1955. The second color component of pixel 1955 has three color dots CD_2_1, CD_2_2, and CD_2_3, arranged in a left-right-left zigzag pattern. Color dot CD_2_3 of pixel 1955 is horizontally aligned with, vertically adjacent, and above the device component area surrounding transistor T(S1_2, G1). The electrode of color dot CD_2_3 of pixel 1955 is coupled to the drain terminal of transistor T(S1_2, G1). The electrode of color dot CD_2_2 is coupled to the drain terminal of transistor T(S1_2, G1) via the electrode of color dot CD_2_3 of pixel 1955. The electrode of color dot CD_2_1 of pixel 1955 is coupled to the drain terminal of transistor T(S1_2, G1) via the electrodes of color dot CD_2_2 and CD_2_3 of pixel 1955. The third color component of pixel 1955 has three color dots CD_3_1, CD_3_2, and CD_3_3, arranged in a left-right-left zigzag pattern. Color dot CD_3_1 of pixel 1955 is horizontally aligned with, vertically adjacent, and below the device component area surrounding transistor T(S1_3, G2). The electrode of color dot CD_3_1 of pixel 1955 is coupled to the drain terminal of transistor T(S1_3, G2). The electrode of color dot CD_3_2 is coupled to the drain terminal of transistor T(S1_3, G2) via the electrode of color dot CD_3_1 of pixel 1955. The electrode of color dot CD_3_3 of pixel 1955 is coupled to the drain terminal of transistor T(S1_3, G2) via the electrodes of color dot CD_3_2 and CD_3_1 of pixel 1955. Pixel 1965 uses the same pixel design as pixel 1955 thus the internal connections are the same and not repeated. However, Pixel 1965 includes transistors T(S1_1, G1), T(S1_2, G0) and T(S1_3, G1) in place of transistor T(S1_1, G2), T(S1_2, G1, and T(S1_3, G2), respectively. Furthermore, in FIG. 19(*a*), pixel 1965 has negative dot polarity while pixel 1955 has positive dot polarity.

Thus, as illustrated in FIG. 19(*a*), the three color components of pixel 1955 are vertically aligned, and thus eliminate the color alignment issue of FIG. 18(*f*). As explained above, to achieve a checkerboard pattern, the polarity of the second color component needs to be opposite the polarity of the first and third color component.

FIG. 19(*b*) shows the positive dot polarity pattern of a spread pixel design 1910 (e.g. pixel 1950 in FIG. 19(*a*)). In pixel design 1910, the first color component has three color dots CD_1_1, CD_1_2, and CD_1_3 arranged in a left-right-left zigzag pattern. A device component area DCA_1 is positioned aligned horizontally with color dot CD_1_3 and vertically adjacent (as used herein vertically adjacent encompasses separation by a vertical dot spacing VDS) and below CD_1_3. A switching element SE_1 is positioned within device component area DCA_1. The electrode in color dot CD_1_3 is coupled to switching element SE_1; the electrode of color dot CD_1_2 is coupled to switching element SE_1 via the electrodes of color dot CD_1_3; and the electrode of color dot CD_1_1 is coupled to switching element SE_1 via the electrodes of color dots CD_1_2 and CD_1_3. The second color component of spread pixel design 1910 has three color dots CD_2_1, CD_2_2, and CD_2_3 arranged in a left-right-left zigzag pattern. The second color component is positioned so that the second color component is vertically aligned with the first color component and offset horizontally to the right of the first color component by the color dot width CDW plus horizontal dot spacing HDS so that the first color component and the second color component are separated by horizontal dot spacing HDS. A device component area DCA_2 is positioned aligned horizontally with color dot CD_2_1 vertically adjacent and above color dot CD_2_1. A switching element SE_2 is positioned within device component area DCA_2. The electrode in color dot CD_2_1 is coupled to switching element SE_2; the electrode of color dot CD_2_2 is coupled to switching element SE_2 via the electrodes of color dot CD_2_1; and the electrode of color dot CD_2_3 is coupled to switching element SE_2 via the electrodes of color dots CD_2_2 and CD_2_1. The third color component of spread pixel design 1910 has three color dots CD_3_1, CD_3_2, and CD_3_3 arranged in a left-right-left zigzag pattern. The third color component is positioned vertically aligned with the second color component and horizontally offset to the right of the second color component by color dot width CDW plus horizontal dot spacing HDS. An device component area DCA_3 is positioned horizontally aligned with color dot CD_3_3 and vertically adjacent and below color dot CD_3_3. A switching element SE_3 is positioned within device component area DCA_3. The electrode in color dot CD_3_3 is coupled to switching element SE_3; the electrode of color dot CD_3_2 is coupled to switching element SE_3 via the electrodes of color dot CD_3_3; and the electrode of color dot CD_3_1 is coupled to switching element SE_3 via the electrodes of color dots CD_3_2 and CD_3_3.

As explained above, a checkerboard pattern of dot polarities is desirable to amplify the fringe fields in each color dot.

Figure 19C:
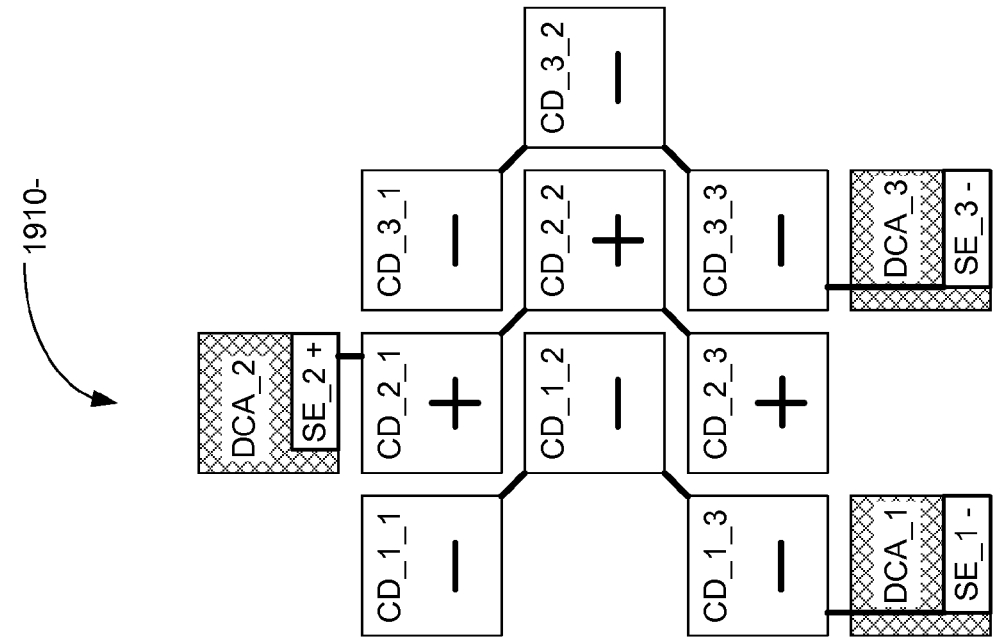
FIGS. 19(b)-(c) illustrate spread pixel designs with device component areas in accordance with different embodiments of the present invention.
Figure 19B:
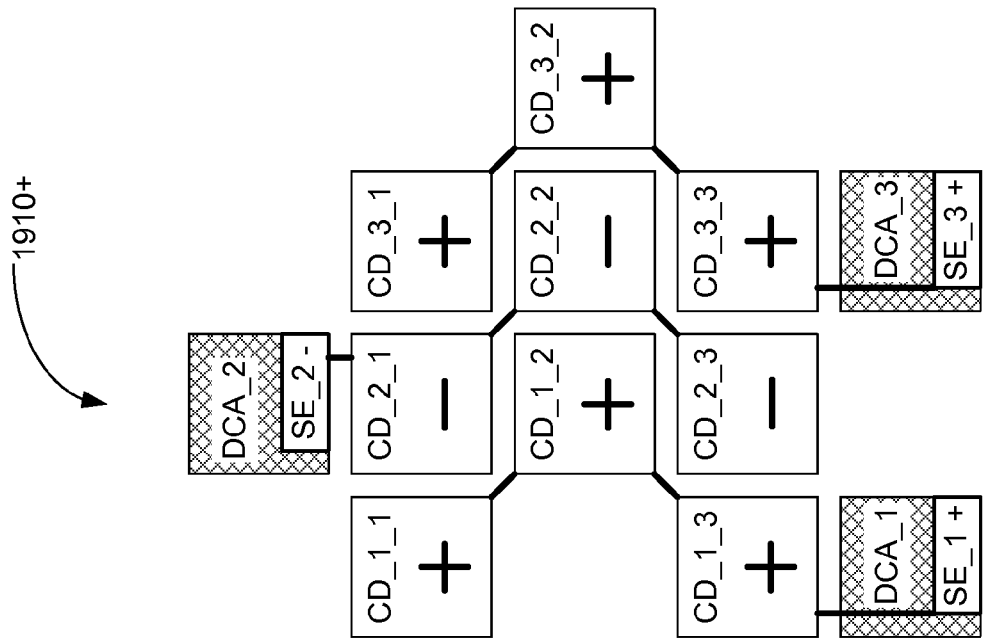

In FIG. 19(b) pixel design 1910 is in the positive dot polarity pattern. Accordingly, switching elements SE_1 and SE_3, color dots CD_1_1, CD_1_2, CD_1_3, CD_3_1, CD_3_2, and CD_3_3 have positive polarity as denoted by "+". Switching element SE_2, color dots CD_2_1, CD_2_2, and CD_2_3 have negative polarity, as denoted by "−". In FIG. 19(c) pixel design 1910 is in the negative dot polarity pattern. Accordingly, switching elements SE_1 and SE_3, color dots CD_1_1, CD_1_2, CD_1_3, CD_3_1, CD_3_2, and CD_3_3 have negative polarity as denoted by "−". Switching element SE_2, color dots CD_2_1, CD_2_2, and CD_2_3 have positive polarity, as denoted by "+".

Figure 19D:
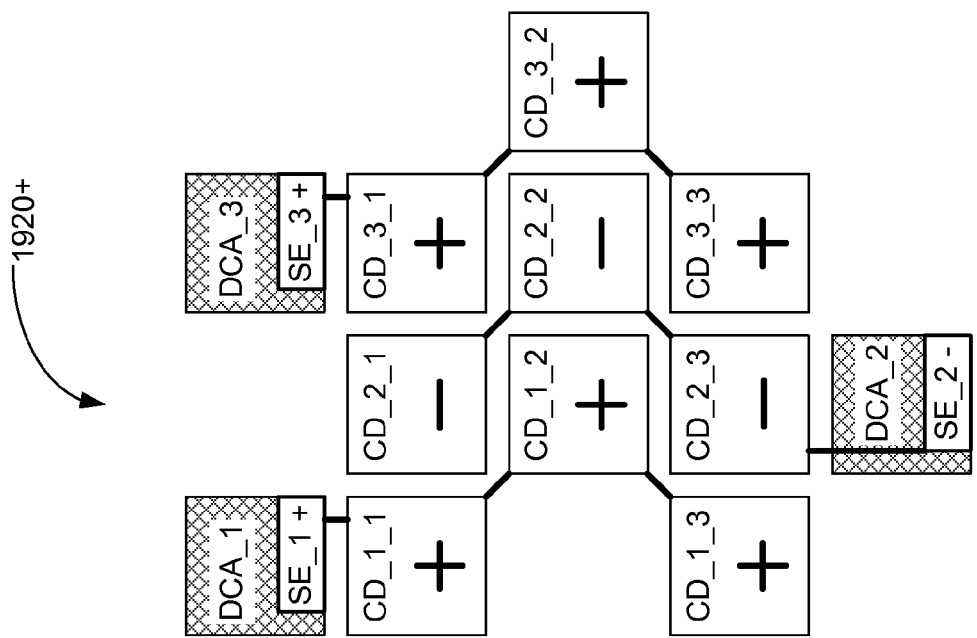
FIGS. 19(d)-(e) illustrate spread pixel designs with device component areas in accordance with different embodiments of the present invention.

FIG. 19(d) shows the positive dot polarity pattern of a spread pixel design 1920 (e.g. pixel 1965 in FIG. 19(a)). In pixel design 1920, the first color component has three color dots CD_1_1, CD_1_2, and CD_1_3 arranged in a left-right-left zigzag pattern. An device component area DCA_1 is positioned aligned horizontally with color dot CD_1_1 and vertically adjacent (as used herein vertically adjacent encompasses separation by a vertical dot spacing VDS) and above CD_1_1. A switching element SE_1 is positioned within device component area DCA_1. The electrode in color dot CD_1_1 is coupled to switching element SE_1; the electrode of color dot CD_1_2 is coupled to switching element SE_1 via the electrodes of color dot CD_1_1; and the electrode of color dot CD_1_3 is coupled to switching element SE_1 via the electrodes of color dots CD_1_2 and CD_1_1. The second color component of spread pixel design 1920 has three color dots CD_2_1, CD_2_2, and CD_2_3 arranged in a left-right-left zigzag pattern. The second color component is positioned so that the second color component is vertically aligned with the first color component and offset horizontally to the right of the first color component by the color dot width CDW plus horizontal dot spacing HDS so that the first color component and the second color component are separated by horizontal dot spacing HDS. An device component area DCA_2 is positioned aligned horizontally with color dot CD_2_3 vertically adjacent and below color dot CD_2_1. A switching element SE_2 is positioned within device component area DCA_2. The electrode in color dot CD_2_3 is coupled to switching element SE_2; the electrode of color dot CD_2_2 is coupled to switching element SE_2 via the electrodes of color dot CD_2_3; and the electrode of color dot CD_2_1 is coupled to switching element SE_2 via the electrodes of color dots CD_2_2 and CD_2_3. The third color component of spread pixel design 1920 has three color dots CD_3_1, CD_3_2, and CD_3_3 arranged in a left-right-left zigzag pattern. The third color component is positioned vertically aligned with the second color component and horizontally offset to the right of the second color component by color dot width CDW plus horizontal dot spacing HDS. An device component area DCA_3 is positioned horizontally aligned with color dot CD_3_1 and vertically adjacent and above color dot CD_3_1. A switching element SE_3 is positioned within device component area DCA_3. The electrode in color dot CD_3_1 is coupled to switching element SE_3; the electrode of color dot CD_3_2 is coupled to switching element SE_3 via the electrodes of color dot CD_3_1; and the electrode of color dot CD_3_3 is coupled to switching element SE_3 via the electrodes of color dots CD_3_2 and CD_3_1.

Figure 19E:
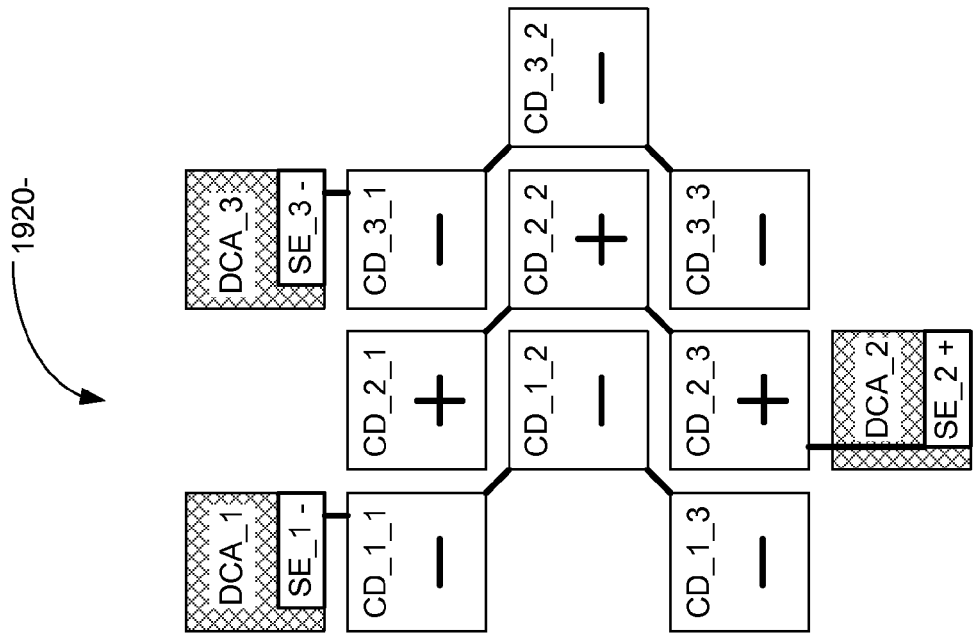

As explained above, a checkerboard pattern of dot polarities is desirable to amplify the fringe fields in each color dot. In FIG. 19(d) pixel design 1920 is in the positive dot polarity pattern. Accordingly, switching elements SE_1 and SE_3, color dots CD_1_1, CD_1_2, CD_1_3, CD_3_1, CD_3_2, and CD_3_3 have positive polarity as denoted by "+". Switching element SE_2, color dots CD_2_1, CD_2_2, and CD_2_3 have negative polarity, as denoted by "−". In FIG. 19(e) pixel design 1920 is in the negative dot polarity pattern. Accordingly, switching elements SE_1 and SE_3, color dots CD_1_1, CD_1_2, CD_1_3, CD_3_1, CD_3_2, and CD_3_3 have negative polarity as denoted by "−". Switching element SE_2, color dots CD_2_1, CD_2_2, and CD_2_3 have positive polarity, as denoted by "+".

Various embodiments of the present invention were fabricated in the form of a 2.2 inch color display with a quarter VGA resolution (QVGA, 240×320 color pixels), using a switching element row inversion driving scheme. The color pixel size is 141 um in width by 141 um in height. Each pixel consists of three color components (red, green and blue colors) using color filter materials). Thus, the display includes 720 (240×3) color components in the horizontal direction and 320 color components in the vertical direction. Each color component has a theoretical maximum size of 47 um in width by 141 um in height. However, some of this area is required for the device component areas. The display includes 720 switching elements horizontally and 320 vertically for a total of 720×320 switching elements. The device component area (DCA), which consists of the switching element (thin film transistors) and the storage capacitor, has a theoretical maximum size of about 47 um in width by 38.0 um in height. However due to horizontal and vertical dot spacing, the device component area has an actual size of about 41 um in width by 35.0 um.

In the display panel fabrication process, Merck vertical alignment liquid crystal (LC) is used with a negative dielectric anisotropy, such as MLC-6884. The Japan Nissan Chemical Industrial Limited (Nissan) polyimide SE-5300 with a non-rubbing process is used to fabricate the standard vertical LC alignment without the pretilt angle. The fabrication process is a non-rubbing process and does not require high precision top to bottom substrates alignment, which is required in the fabrication process for other MVA LCDs using the protrusion or ITO slit geometry. The width of the ITO connection lines between different color dots and different device component areas is 3 um. Top and bottom polarizers are attached to the panels. The typical LC cell gap is about 2.0 to 3.5 um.

In a particular embodiment of the present invention, the display was created using the pixel design and dot polarity patterns and the liquid crystal display in accordance with that given in FIGS. 18(a)-(f), where each color component is divided into 3 color dots. Thus each color dot has a theoretical maximum size of about 47 um in width by 34.3 um in height. However due to horizontal dot spacing and vertical dot spacing each color dot has an actual size of about 41 um in width by 31.3 um in height in the actual size. The display produced a contrast ratio greater than 600 at an applied voltage of 5 volt. Furthermore the display exhibited a very wide viewing angle of greater than ±85° in all viewing zones using the MVA wide viewing angle polarizer. Specifically, the viewing angle is greater than ±85° in the horizontal and vertical viewing zones, and greater than ±50° in the two major diagonal viewing zones, using the normal linear polarizer without the MVA wide viewing optical compensation film. The circular polarizers doubled the optical transmission compared to the transmission using linear polarizers. Moreover, both the transmission and viewing angle are enlarged using the MVA circular polarizers.

Even though, MVA LCDs in accordance with the present invention provide wide viewing angle at a low cost, some embodiments of the present invention use optical compensation methods to further increase the viewing angle. For example, some embodiments of the present invention use negative birefringence optical compensation films with vertical oriented optical axis on one or both of the top and bottom substrate to increase viewing angle. Other embodiments may use uniaxial or biaxial optical compensation films, the optical birefringence can be positive or negative birefringence. Furthermore, multiple films that include all combinations could be used. Other embodiments may use a circular polarizer to improve the optical transmission and viewing angle. Other embodiments may use a circular polarizer with the optical compensation films to further improve the optical transmission and viewing angle.

In the various embodiments of the present invention, novel structures and methods have been described for creating a multi-domain vertical alignment liquid crystal display without the use of physical features on the substrate. The various embodiments of the structures and methods of this invention that are described above are illustrative only of the principles of this invention and are not intended to limit the scope of the invention to the particular embodiments described. For example, in view of this disclosure those skilled in the art can define other pixel definitions, dot polarity patterns, pixel designs, polarities, fringe fields, electrodes, substrates, films, and so forth, and use these alternative features to create a method, or system according to the principles of this invention. Thus, the invention is limited only by the following claims.

What is claimed is:

1. A display unit comprising:
    a first pixel having a plurality of first-pixel color dots, a first first-pixel switching element, and a first first-pixel electrode;
    a second pixel having a plurality of second-pixel color dots, wherein the first pixel is interleaved with the second pixel so that the first first-pixel electrode coupled to the first first-pixel switching element is adjacent to a first second-pixel color dot, a second second-pixel color dot, and a third second-pixel color dot;
    wherein the first pixel further comprises a second first-pixel electrode adjacent to the second second-pixel color dot and wherein the second first pixel-electrode is coupled to the first first-pixel electrode.

2. The display unit of claim 1, wherein the first first-pixel electrode has a first polarity and the first second-pixel color dot has a second polarity.

3. The display unit of claim 1, wherein the first first-pixel electrode is adjacent to a fourth second-pixel color dot.

4. The display unit of claim 3, wherein a first second-pixel electrode is adjacent to a first first-pixel color dot, a second first-pixel color dot, a third first-pixel color dot, and a fourth first-pixel color dot.

5. The display of claim 1, wherein the first first-pixel electrode is located between the first second-pixel electrode and the third second-pixel electrode.

6. The display of claim 5, wherein the first first-pixel electrode is located between the second second-pixel electrode and a fourth second-pixel electrode.

7. A display unit comprising:
    a first pixel having a plurality of first-pixel color dots, a first first-pixel switching element, and a first first-pixel electrode;
    a second pixel having a plurality of second-pixel color dots, wherein the first pixel is interleaved with the second pixel so that the first first-pixel electrode coupled to the first first-pixel switching element is adjacent to a first second-pixel color dot, a second second-pixel color dot, and a third second-pixel color dot;
    wherein the second pixel further comprises a first second-pixel switching element coupled to the first second-pixel color dot and the second second-pixel color dot; and
    wherein the second pixel further comprises a second second-pixel switching element coupled to the third-second-pixel color dot.

8. The display of claim 7, wherein the first pixel further comprises a second first-pixel electrode adjacent to the second second-pixel color dot.

9. The display of claim 8, wherein the second first-pixel electrode is also adjacent to the third second-pixel color dot.

10. The display of claim 8, wherein the second first pixel-electrode is coupled to the first first-pixel electrode.

11. A display unit comprising:
    a first pixel having a plurality of first-pixel color dots, a first first-pixel switching element, a first first-pixel electrode, a second first-pixel electrode, and a third first-pixel electrode; and
    a second pixel having a plurality of second-pixel color dots, wherein the first pixel is interleaved with the second pixel so that
        the first first-pixel electrode is adjacent to a first side of a first second-pixel color dot;
        the second first-pixel electrode is adjacent to a second side of the first second-pixel color dot; and
        the third first-pixel electrode is adjacent to a third side of the first second-pixel color dot.

12. The display of claim 11, wherein the first first pixel switching element is coupled to the first first-pixel electrode, the second first-pixel electrode, and the third first-pixel electrode.

13. The display of claim 12, wherein the first first-pixel switching element is configured to have a first polarity when the first second-pixel color dot has a second polarity.

14. The display of claim 11, wherein the first first-pixel electrode is located between the first second pixel color dot and a second second-pixel color dot.

15. The display of claim 14, wherein the first first-pixel electrode is adjacent to a third second-pixel color dot.

16. The display of claim 15, wherein the first first-pixel electrode is adjacent to a fourth second-pixel color dot.

17. The display of claim 11, wherein the first second-pixel color dot is located between the first first-pixel electrode and the second first-pixel electrode.

* * * * *